US012586051B1

(12) United States Patent (10) Patent No.: US 12,586,051 B1
Duane et al. (45) Date of Patent: Mar. 24, 2026

(54) CUSTOMIZED GENERATION AND SECURE AUTHENTICATED PROCESSING OF TRANSFER INSTRUMENT

(71) Applicant: Block, Inc., Oakland, CA (US)

(72) Inventors: Michael Duane, San Francisco, CA (US); Matthew Hickman, San Francisco, CA (US); Kyle Fletcher, Briarcliff, NY (US)

(73) Assignee: Block, Inc., Oakland, CA (US)

( * ) Notice: Subject to any disclaimer, the term of this patent is extended or adjusted under 35 U.S.C. 154(b) by 15 days.

(21) Appl. No.: 17/698,801

(22) Filed: Mar. 18, 2022

(51) Int. Cl.
　　*G06Q 20/32* (2012.01)
　　*G06Q 20/40* (2012.01)
(52) U.S. Cl.
　　CPC ....... *G06Q 20/3221* (2013.01); *G06Q 20/401* (2013.01)
(58) Field of Classification Search
　　CPC ...................................................... G06Q 40/00
　　USPC ........................................................... 705/35
　　See application file for complete search history.

(56) References Cited

U.S. PATENT DOCUMENTS

| | | | | | |
|---|---|---|---|---|---|
| 6,997,378 | B2 * | 2/2006 | Phillips | .................. | G06Q 30/04 |
| | | | | | 705/30 |
| 7,107,243 | B1 * | 9/2006 | McDonald | ............. | G06Q 20/10 |
| | | | | | 705/40 |
| 7,685,024 | B2 * | 3/2010 | Ofer | .................. | G06Q 30/0641 |
| | | | | | 705/26.7 |

| | | | | | |
|---|---|---|---|---|---|
| 7,958,050 | B2 * | 6/2011 | Finch | ................... | G06Q 20/102 |
| | | | | | 705/40 |
| 7,962,424 | B1 * | 6/2011 | Colosso | ................. | G06Q 30/06 |
| | | | | | 705/901 |
| 8,606,714 | B1 * | 12/2013 | Cameo | .............. | G06Q 20/4037 |
| | | | | | 705/40 |
| 11,270,279 | B1 * | 3/2022 | Rozovski | ............... | G06Q 20/14 |
| 11,308,480 | B2 * | 4/2022 | Gosalia | ............. | G06Q 20/3276 |
| 11,599,862 | B1 * | 3/2023 | Hecht | ................. | G06Q 20/102 |
| 2001/0051919 | A1 * | 12/2001 | Mason | .............. | G06Q 30/0601 |
| | | | | | 705/40 |
| 2002/0004770 | A1 * | 1/2002 | Phillips | ................ | G06Q 20/202 |
| | | | | | 705/30 |
| 2002/0072944 | A1 * | 6/2002 | Artinger | ............. | G06Q 10/063 |
| | | | | | 705/28 |

(Continued)

OTHER PUBLICATIONS

Wayback machine Paypal 2021 (Year: 2021).*

*Primary Examiner* — Kirsten S Apple
(74) *Attorney, Agent, or Firm* — Lee & Hayes, P.C.

(57) ABSTRACT

A payment service system receives an indication of an interaction between a payee device associated with a payee and an interactive element of a transfer instrument. The payment service system determines, based on an identifier received in association with the indication, a user account of the payee associated with the payment service. The payment service system determines, based on context data associated with the indication, an allocation of one or more asset types. The payment service system facilitates a transfer of one or more transfer amounts of the one or more asset types to the user account of the payee based on the allocation. The one or more transfer amounts are based on an amount of at least one asset type indicated by the transfer instrument. In some examples, the payment service system generates the interactive element and the transfer instrument in response to a request from the payor.

20 Claims, 12 Drawing Sheets

(56) References Cited

U.S. PATENT DOCUMENTS

| | | | |
|---|---|---|---|
| 2002/0091634 A1* | 7/2002 | Eubanks | G06Q 30/02 705/39 |
| 2003/0023550 A1* | 1/2003 | Lee | H04L 12/1453 705/40 |
| 2003/0040990 A1* | 2/2003 | Lee | G06Q 40/02 705/30 |
| 2003/0065616 A1* | 4/2003 | O'Donnell, Jr. | G06Q 30/02 705/40 |
| 2003/0163397 A1* | 8/2003 | Mayo | G06Q 30/02 705/34 |
| 2005/0144130 A1* | 6/2005 | Staniar | G06Q 20/102 705/40 |
| 2005/0149544 A1* | 7/2005 | Bishop | G06Q 20/04 |
| 2005/0160038 A1* | 7/2005 | Albornoz | G06Q 20/108 705/42 |
| 2005/0192833 A1* | 9/2005 | Artinger | G06Q 40/08 705/4 |
| 2005/0283434 A1* | 12/2005 | Hahn-Carlson | G06Q 10/10 707/999.1 |
| 2005/0283437 A1* | 12/2005 | McRae | G06Q 20/102 705/40 |
| 2006/0206425 A1* | 9/2006 | Sharma | G06Q 20/02 705/40 |
| 2007/0083459 A1* | 4/2007 | Eubanks | G06Q 30/06 705/38 |
| 2007/0100745 A1* | 5/2007 | Keiser | G06Q 20/403 705/38 |
| 2007/0219900 A1* | 9/2007 | MacGuire | G06Q 40/00 705/38 |
| 2008/0015945 A1* | 1/2008 | Goldstein | G06Q 30/0633 705/26.8 |
| 2008/0177581 A1* | 7/2008 | Artinger | G06Q 40/08 705/4 |
| 2008/0270293 A1* | 10/2008 | Fortune | G06Q 20/102 705/40 |
| 2009/0063276 A1* | 3/2009 | Ekechukwu | G06Q 30/0277 705/14.73 |
| 2010/0036769 A1* | 2/2010 | Winters | G06Q 20/10 705/40 |
| 2010/0174644 A1* | 7/2010 | Rosano | G06Q 20/14 705/40 |
| 2010/0179837 A1* | 7/2010 | Artinger | G06Q 40/08 715/708 |
| 2010/0299230 A1* | 11/2010 | Patterson | G06Q 20/10 705/30 |
| 2010/0299253 A1* | 11/2010 | Patterson | G06Q 40/02 705/40 |
| 2011/0145111 A1* | 6/2011 | Ljunggren | G06Q 20/10 705/30 |
| 2012/0116963 A1* | 5/2012 | Klein | G06Q 20/102 705/40 |
| 2013/0346302 A1* | 12/2013 | Purves | G06Q 20/102 705/40 |
| 2014/0012706 A1* | 1/2014 | Foerster | G06Q 30/04 705/26.81 |
| 2014/0156448 A1* | 6/2014 | Grigg | G06Q 30/0631 705/26.7 |
| 2014/0279459 A1* | 9/2014 | Weiss | G06Q 20/26 705/40 |
| 2014/0304186 A1* | 10/2014 | Brown | G06Q 30/0279 705/329 |
| 2014/0358783 A1* | 12/2014 | Mansur | G06Q 20/10 705/44 |
| 2016/0092874 A1* | 3/2016 | O'Regan | G06Q 20/3221 705/44 |
| 2016/0180302 A1* | 6/2016 | Bagot, Jr. | G06Q 20/102 705/40 |
| 2023/0141912 A1* | 5/2023 | Moring | G06Q 20/381 705/41 |

* cited by examiner

CUSTOMIZED GENERATION AND SECURE AUTHENTICATED PROCESSING OF TRANSFER INSTRUMENT

TECHNICAL FIELD

A negotiable payment instrument typically directs a bank to pay a specific sum of a specified currency from a payor to a payee. When the payee presents that instrument to a bank or other financial institution, the funds are drawn from the payor's bank account and paid into the payee's bank account. Negotiable payment instruments and the technology to process such instruments has been limited to applications associated with banks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

DETAILED DESCRIPTION

Figure 1:
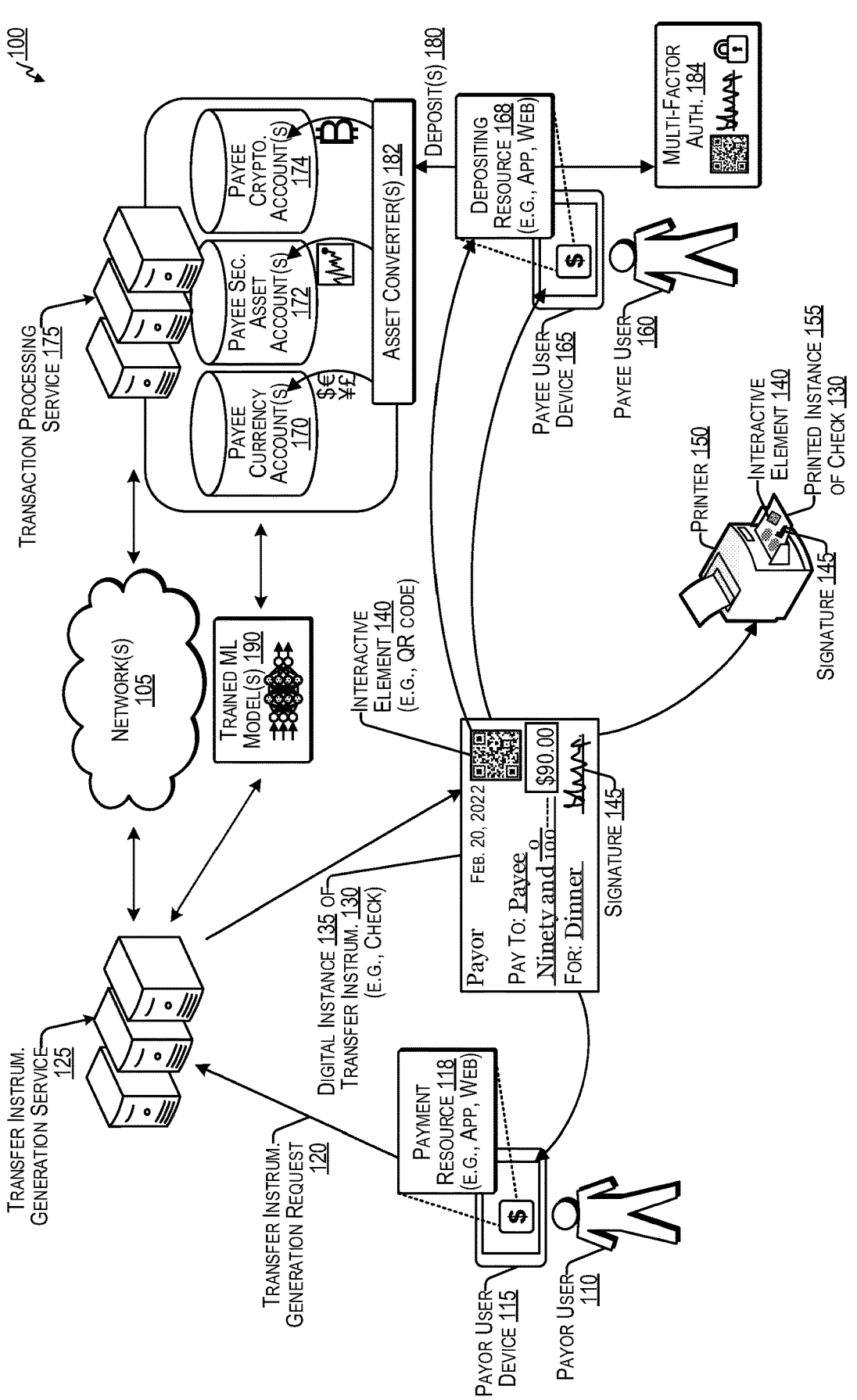
FIG. 1 is a block diagram illustrating an architecture of a transfer instrument generation and processing system, in accordance with some examples.

Customized generation and secure, authenticated processing of transfer instruments is described herein. A "transfer instrument," as used herein, can refer to a digital or physical instrument that facilitates transfer of one or more assets of one or more asset types from one or more asset accounts associated with a payor to one or more asset accounts associated with a payee (e.g., payment of funds from an account of the payor to an account of the payee). In some examples, such a transfer instrument can be a negotiable payment instrument, such as a check (e.g., digital or physical), that facilitates transfer of one or more assets of one or more asset types from one or more asset accounts associated with a payor to one or more asset accounts associated with a payee. In some examples, the transfer instrument can be a promissory note, a bill of exchange, an invoice, a smart contract with payment terms, or a combination thereof.

Systems and methods described herein include generation of a customized transfer instrument (e.g., a check) with an interactive element. That is, in some examples, the transfer instrument may be customized based on information encoded in the interactive element and/or otherwise included as part of the transfer instrument. The interactive element may encode data that can be used to facilitate a transfer of assets between users. In some examples, context data associated with an interaction with the interactive element can be used to intelligently and dynamically determine the allocation of one or more assets into one or more user accounts of the payee or one or more asset types among the one or more user accounts of the payee. The interactive element may also encode data that can be used for secure, authenticated processing of the transfer instrument as discussed further herein.

While techniques described herein are with reference to checks, techniques can be applicable to any type of transfer instrument, which may also be referred to as a transfer object, a transfer medium, a transaction object, a transaction instrument, a transaction medium, a payment object, a payment instrument, a payment medium, or a combination thereof. Examples of a transfer instrument include, but are not limited to, a check, a promissory note, bill of exchange, invoice, receipt of transaction, a smart contract with payment terms, another type of transaction instrument described herein, or a combination thereof.

In an illustrative example, a system associated with a payment service receives a transfer instrument generation request from a payor instance of a payment resource. The payment resource can be a payment software application, a payment website, a portion thereof, or a combination thereof. A payor instance can be an instance thereof executing on a payor device and/or otherwise accessed by the payor. The system generates an interactive element that encodes a resource identifier identifying a transfer instrument depositing resource. The resource identifier can direct the payee device to access the transfer instrument depositing resource, and may include, for example, a uniform resource identifier (URI), a uniform resource locator (URL), and/or a different type of identifier associated with the transfer instrument depositing resource. In some examples, the transfer instrument depositing resource can be a transfer instrument depositing software application, a transfer instrument depositing website, a portion thereof, or a combination thereof. In some examples, the transfer instrument depositing resource can be a payee instance of the payment resource. As described above, the payment resource can be a payment software application, a payment website, a portion thereof, or a combination thereof. A payee instance can be an instance thereof executing on a payee device and/or otherwise accessed by the payee. In some examples, the transfer instrument depositing resource can be associated with the payment service or a third-party service, such as another payment service, a bank, another financial institution, or the like.

As described above, the interactive element can encode data. In some examples, the interactive element optically, or otherwise, encodes at least the resource identifier, for instance where the interactive element includes a quick response (QR) code, a bar code, a data matrix, an Aztec code, Maxicode, a CodaBlock-F code, a Maxicode, a MicroPDF417 code, a PDF417 code, a Han Xin code, a DotCode, and/or a snaptag. In some examples, the interactive element can encode one or more of a user account of a payor, a user account of a payee, an amount to be transferred from the payor to the payee, one or more asset types to be transferred from the payor to the payee, a network or platform to facilitate the transfer, or the like. In some examples, the interactive element also encodes an encrypted security verification dataset that can be used for authenticated processing as described herein.

In an example, the system causes a digital or physical transfer instrument (e.g., check) to be generated. In some examples, the system generates the transfer instrument. In some examples, the system instructs a separate transfer instrument generation system to generate the transfer instrument. The transfer instrument includes the interactive element and indicates an amount of at least one asset type to be transferred from a payor to a payee. In some examples, the transfer instrument identifies the payor, the payee, the at least one asset type, an institution (e.g., payment service, bank, or other financial institution) associated with the user account of the payor, the user account of the payor, or a combination thereof. In some examples, when the transfer instrument is a physical transfer instrument (e.g., a physical check), the interactive element is caused to be printed on or in association with the transfer instrument. The transfer instrument is to be provided to the payee. In some examples, the transfer instrument also includes a signature of the payor and/or a signature of the payee (e.g., applied by the payee after the payee receives the transfer instrument).

The system receives an indication of an interaction between a payee device associated with the payee and the interactive element. In some examples, the interaction between the payee device and the interactive element includes the payee device optically scanning the interactive element (e.g., using a camera or other optical scanner sensor) to decode information (e.g., the resource identifier) that is optically encoded in the interactive element. In some examples, the indication of the interaction may include at least a subset of the information that the payee device decodes from the information that is optically, or otherwise, encoded in the interactive element (e.g., at least the resource identifier) by optically scanning the interactive element. In some examples, the indication initiates the transfer of one or more assets of one or more asset types from one or more asset accounts associated with the payor to one or more asset accounts associated with the payee. In some examples, the indication includes the encrypted security verification dataset that is encoded in the interactive element, and the system authenticates the transfer instrument by decrypting the encrypted security verification dataset and comparing the decrypted security verification dataset to a previously-stored reference instance of the security verification dataset. In some examples, the system authenticates the transfer instrument by comparing a signature of the payor on the transfer instrument to a previously-stored reference instance of the signature of the payor. In some examples, the system authenticates the transfer instrument by comparing a signature of the payee on the transfer instrument to a previously-stored reference instance of the signature of the payee.

In some examples, the indication of the interaction is associated with an identifier and/or other data, such as context data. In such examples, the system determines, based at least in part on the identifier received in association with the indication, a user account of the payee associated with the payment service. The identifier may be specific to, and/or may identify, for instance, the payee, the payee device, a browser application running on the payee device, a payment service application running on the payee device, another application running on the payee device, a transfer instrument depositing resource, the user account of the payee, a username of the payee, a metadata tag or unique identifier of the payee, an email address of the payee, a password of the payee, a personal identification number (PIN) of the payee, a user-provided identifier, an encoded identifier, or a combination thereof.

In some examples, the indication of the interaction is associated with context data and/or context data can be determined based at least in part on the indication of the interaction. Context data can include, but is not limited to, an identity of the payor user, an identity of the payee user, a device type of a payor device of the payor, a device type of a payee device of the payee, data stored on the payor device of the payor, data stored on the payee device of the payee, a relationship between the payor and the payee (e.g., friends, family, employer and employee, contractor and contractee, merchant and customer, and the like), information to be encoded into the interactive element, information to be otherwise included as part of the transfer instrument, information to be included as part of the transfer instrument generation request, information included in the transfer instrument generation request, information read from the interactive element, information read from the transfer instrument (e.g., via optical character recognition (OCR)), a signature of the payor user, a signature of the payee user, available account(s) and/or account type(s) associated with the payor (e.g., that the payor could withdraw the funds for the transfer instrument from), available asset(s) and/or asset type(s) associated with the payor (e.g., that the payor could withdraw the funds for the transfer instrument as), available accounts and/or account types associated with the payee that the funds from the transfer instrument can be transferred into, asset types that the payee possesses, record(s) of which account(s) or account type(s) the payor has withdrawn funds for previous transfer instrument(s) from, record(s) of which asset(s) or asset type(s) the payor has withdrawn funds for previous transfer instrument(s) as, record(s) of which account(s) or account type(s) the payee has deposited previous transfer instrument(s) into, record(s) of which asset(s) or asset type(s) the payee has deposited previous transfer instrument(s) as, a location of the payor user and/or payor user device when the transfer instrument is generated, a location of the payee user and/or the payee user device when the transfer instrument is received by the payee user and/or the payee user device, a location of the payee user and/or the payee user device is when the transfer instrument is deposited, a transfer history of the payor user, a transfer history of the payee user, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, transaction activity involving one or more social contacts associated with the payee, any information discussed herein as a possible input to the one or more trained machine learning models described herein, or a combination thereof.

In sone examples, the system determines, based at least in part on context data associated with the indication, an allocation (e.g., a composition or ratio(s)) of one or more asset types. That is, the system utilizes context data to intelligently and dynamically determine which user accounts and which asset types in which to deposit assets associated with the transfer instrument. The system facilitates a transfer of one or more transfer amounts of the one or more asset types to the user account of the payee based on the allocation. In some examples, the one or more transfer amounts match the amount of the at least one asset type indicated by the transfer instrument. In some examples, the one or more transfer amounts are different from, but are based on, the amount of the at least one asset type indicated by the transfer instrument. For instance, the one or more transfer amounts may be equivalent to the amount of the at least one asset type indicated by the transfer instrument if the amount of the at least one asset type is converted into one or more different asset types, and in some examples if one or more fees (e.g., conversion fees, taxes, tariffs, etc.) are deducted. The one or more asset types—and/or the at least one asset type—can include, for instance, fiat currencies, security assets (e.g., stocks, bonds, investments, debt, equity, warrants, futures, shorts), cryptocurrencies, non-fungible tokens (NFTs), or combinations thereof.

In some examples, the interactive element can be encoded to enable deposits or withdrawals over different resources, such as networks, payment systems, or accounts. In some examples, one or more resources can be configured in a hierarchical order such that if a first resource isn't available or is sub-optimal (e.g., based on performance metrics, connectivity, expense, or the like), a second, "fallback" resource can be used to facilitate a deposit and/or withdrawal. For instance, the interactive element can be encoded such that an interaction with the interactive element initiates a transaction (e.g., a withdrawal from a payor and a deposit for the payee) over a first resource, such as the Lightning Network, and if the Lightning Network isn't available, to use a second resource, such as a particular blockchain network, and if the particular blockchain network isn't available, to a third resource, such as a payment system having one or more internal ledgers to facilitate one or more transactions using one or more currencies, or the like. In some examples, the system described herein can utilize context data to determine which resource to use to facilitate a deposit and/or withdrawal. For instance, if a transfer using the Lightning Network is predicted, based on context data, to be the fastest and/or least expensive resource for facilitating a deposit and/or withdrawal, the Lightning Network can be selected for use. That is, in addition to enabling allocations of asset types into different asset accounts, in some examples, techniques described herein enable intelligent determination of resources for facilitating transfers associated with transfer instrument.

While techniques described herein relate to an electronic deposit of assets associated with a transfer instrument, when a transfer instrument is a printed, physical transfer instrument, the transfer instrument can be deposited at any financial institution, such as a bank, in-person, via an automated teller machine (ATM), an application, or the like. That is, while techniques described herein relate to associating an interactive element with transfer instruments, techniques described herein can further relate to the generation of transfer instruments that can be deposited using traditional channels. In this way, techniques described herein relate to the generation of transfer instruments that can be deposited or otherwise redeemed in different depositing resources which, in some examples, can determine which account(s) and/or asset type(s) the transfer instruments can be deposited as. Further, particular depositing resources can determine the timing associated with when funds are availed and accessible to payee users. That is, techniques described herein relate to a transfer instrument that can represent different assets that are accessible at different time depending on where and/or how the transfer instrument is deposited or otherwise redeemed.

The systems and methods described herein overcome a variety of technical problems with a variety of technical solutions. One such technical problem is a lack of security with traditional transfer instrument processing technologies. Traditional transfer instrument processing technologies generally provide little or no verification as to the authenticity of a transfer instrument before the transfer instrument is processed. The systems and methods described herein provide a technical solution for this technical problem by providing multiple factors of authentication (e.g., two-factor authentication or N-factor authentication, where N is greater than or equal to two) to verify the authenticity of the transfer instrument and/or to authenticate the user(s) (e.g., the payor and/or the payee) involved in a transaction or transfer to the transaction or transfer. For instance, the systems and methods described herein generate a transfer instrument (e.g., a check) with an interactive element. The interactive element can encode information that may be used to authenticate the transfer instrument, such as an encrypted security verification dataset that may be authenticated by decrypting the encrypted security verification dataset and comparing the decrypted security verification dataset to a previously-stored reference instance of the security verification dataset. This may serve as an additional factor of authentication on top of signature authentication and/or code authentication.

For signature authentication, the systems and methods described herein can also authenticate the transfer instrument by authenticating a signature of the payor on the transfer instrument and/or by authenticating a signature of the payee on the transfer instrument, for instance by comparing the signature(s) to be authenticated to previously-stored reference instance(s) of the signature(s) to be authenticated. In some examples, the systems and methods described herein use manual signatures (e.g., input via a pen/pencil or touch-sensitive surface). In some examples, the systems and methods described herein use digital signatures instead of or in addition to, which can provide more secure and rapid authentication with higher confidence. For code authentication, the systems and methods described herein can also authenticate the transfer instrument by authenticating one or more code(s) printed and/or displayed on the transfer instrument, which may be associated with an institution of the payor, the account(s) of the payor, the payor device, the payor themselves, an institution of the payee, the account(s) of the payee, the payee device, the payee themselves, or a combination thereof. This multifactor authentication provides a specific improvement to authentication that increases security, prevents unauthorized transfer instruments and transfers, can be easy for end users (e.g., the payor and the payee) to implement, and, in some examples, can be performed using low-complexity payor devices and/or payee devices, since the majority of the complexity is performed at the server level. This authentication is also more secure than use of an image of a transfer instrument that does not include an interactive element as described herein, as the improvements to the authentication here use the interactive element to add additional authentication factors and capabilities.

In addition to additional authentication factors and capabilities, techniques described herein streamline transfer instrument depositing processes by encoding data in interactive elements. As such, when a user (e.g., payee) deposits a transfer instrument having an interactive element, the user need not enter, or confirm, information associated with the transfer instrument. The interactive element may encode information associated with the transfer instrument, the payor, the payee, and/or a depositing resource for depositing the transfer instrument. Because of this, the user's device, upon interacting with the interactive element, may automatically access the depositing resource (e.g., using a resource identifier for the depositing resource encoded into the interactive element), may automatically propagate the information encoded in the interactive element into fields associated with the depositing resource (e.g., payor, payee, transfer amount(s), asset type(s), and/or account information), and/or may automatically deposit the transfer instrument. These automatic operations can be performed by the payee device and/or by transaction processing service system(s) without user interaction. These automatic operations can reduce the quantity (e.g., frequency and/or volume) of back-and-forth communications between the payee device and the transaction processing service system(s) that might otherwise be needed between the payee device and the transaction processing service system(s), improving efficiency in depositing the transfer instrument, reducing bandwidth usage in depositing the transfer instrument, and reducing complexity for the user interface for depositing the transfer instrument. Further, in some examples, interactive elements can have data encoded therein that can provide "fallback" resources to facilitate transfers at the time of interaction, thereby offering improvements to conventional transaction processing techniques.

Another technical problem that the systems and methods described herein overcome is the lack of flexibility in traditional transfer instrument depositing and transfer instrument processing technologies. For instance, traditional checks are limited to withdrawing funds in the fiat currency listed on the check itself from the payor's checking account, and providing the funds in the same fiat currency to the payee. In part, this lack of flexibility is caused by technical challenges with payment rails. The technical solution presented by the systems and methods described herein includes generation and/or use of one or more interactive element(s) on the transfer instrument that provide the payee device with resource identifier(s) to transfer instrument depositing resource(s) that allow intelligent determination, using context data as described above, of one or more accounts (savings, checking, retirement, stocks, cryptocurrency, etc.) that the funds from the payor should be deposited into, and/or one or more asset types (e.g., fiat currencies, security assets, cryptocurrencies, NFTs, etc.) that the funds from the payor should be deposited in the form of. Further, in some examples, interactive elements can have data encoded therein that can provide "fallback" resources (e.g., networks, payment systems, payment accounts, or the like) or intelligent selection of optimal resources, thereby offering improvements to conventional transaction processing techniques.

In some examples, the systems and methods described herein further provide multiple customized interactive elements that each automate depositing of the transfer instrument in different ways (e.g., into different accounts, as different asset types, through different institutions and/or transfer instrument depositing resources, etc.). For instance, a first interactive element of the interactive elements can include a resource identifier associated with a first depositing resource, a second interactive element of the interactive elements can include a resource identifier associated with a second depositing resource, a third interactive element of the interactive elements can include a resource identifier associated with a third depositing resource, and so forth. Each of the interactive elements can be associated with depositing funds from the transfer instrument as a different allocation of asset type(s), for instance by identifying the asset type(s) in the information encoded in the interactive element. Each of the interactive elements can be associated with depositing funds from the transfer instrument into a different allocation of payee asset account(s), for instance by identifying the payee asset account(s) (or asset account types thereof) in the information encoded in the interactive element. In this way, the systems and methods described herein describe a more customized, personalized, automated, and flexible transfer technology than traditional checking and transfer technologies, which are limited.

In some examples, an interactive element can encode data to automate depositing of the transfer instrument in different ways (e.g., into different accounts, as different asset types, through different institutions and/or transfer instrument depositing resources, etc.). In some examples, context data can be used to determine which depositing resource(s) is/are accessible to the payee device (e.g., which deposit application(s) have been stored and/or installed on the payee device, whether a browser application has been stored and/or installed on the payee device to access deposit website(s)). The payee device can trigger accessing and/or launching a depositing resource that is indicated by a resource identifier encoded in the interactive element and/or that the context data indicates is accessible to the payee device. In this way, the systems and methods described herein describe a more customized, automated, and flexible transfer technology than traditional checking and transfer technologies, which are limited.

In some examples, the systems and methods described herein intelligently and automatically select the one or more accounts that the funds from the payor should be deposited into and/or to select one or more asset types that the funds from the payor should be deposited in the form of, for instance based on context data, as described above, automatically and without further input from the payee. For instance, the deposit can be performed with one or even zero inputs from the payee once the payee device interacts with the interactive element.

In some examples, the systems and methods described herein use one or more trained machine learning (ML) models that automatically select asset type(s) to deposit the funds from the transfer instrument as, and/or that automatically select account(s) to deposit the funds the transfer instrument into. The inputs to the trained ML model(s) can include, for instance, an identity of the payor user, an identity of the payee user, a device type of a payor device of the payor, a device type of a payee device of the payee, data stored on the payor device of the payor, data stored on the payee device of the payee, a relationship between the payor and the payee (e.g., friends, family, employer and employee, contractor and contractee, merchant and customer, and the like), information to be encoded into the interactive element, information to be otherwise included as part of the transfer instrument, information to be included as part of the transfer instrument generation request, information included in the transfer instrument generation request, information read from the interactive element, information read from the transfer instrument (e.g., via OCR), a signature of the payor user, a signature of the payee user, available account(s) and/or account type(s) associated with the payor (e.g., that the payor could withdraw the funds for the transfer instrument from), available asset(s) and/or asset type(s) associated with the payor (e.g., that the payor could withdraw the funds for the transfer instrument as), available accounts and/or account types associated with the payee that the funds from the transfer instrument can be transferred into, asset types that the payee possesses, record(s) of which account(s) or account type(s) the payor has withdrawn funds for previous transfer instrument(s) from, record(s) of which asset(s) or asset type(s) the payor has withdrawn funds for previous transfer instrument(s) as, record(s) of which account(s) or account type(s) the payee has deposited previous transfer instrument(s) into, record(s) of which asset(s) or asset type(s) the payee has deposited previous transfer instrument(s) as, a location of the payor user and/or payor user device when the transfer instrument is generated, a location of the payee user and/or the payee user device when the transfer instrument is received by the payee user and/or the payee user device, a location of the payee user and/or the payee user device is when the transfer instrument is deposited, a transfer history of the payor user, a transfer history of the payee user, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, transaction activity involving one or more social contacts associated with the payee, any of the types of context data described herein, or a combination thereof.

The systems and methods described herein can train the trained ML model(s) using training data. The training data can include selection(s) of which account(s) one or more payee(s) have deposited one or more transfer instruments into along with any of the previously-listed inputs corresponding to that transfer, selection(s) of which asset types(s) one or more payee(s) have deposited one or more transfer instruments as along with any of the previously-listed inputs corresponding to that transfer, or a combination thereof. The trained ML model(s) can be trained using the training data using supervised learning, unsupervised learning, or a combination thereof. The trained ML model(s) can include, for instance, or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more trained support vector machines (SVMs), one or more trained random forests (RFs), one or more encoders, one or more decoders, one or more deep learning systems, or combinations thereof. The training of the trained ML model(s) can be based on loss functions indicating when predicted selections differ from actual selections by the payee(s) in various conditions identified by the various inputs to the trained ML model(s). The loss functions can be measured using means square error (MSE), mean absolute error (MAE), mean bias error (MBE), hinge loss, cross entropy loss (CEL), or combinations thereof. In these ways, the systems and methods described herein describe a more customized, automated, and flexible transfer technology than traditional checking and transfer technologies, which are limited.

Another technical problem that the systems and methods described herein overcome is the lack of speed in traditional transfer instrument depositing and transfer instrument processing technologies, which typically involve a settlement delay and/or holding period before the funds association with the transfer instrument deposit are transferred. Similarly, conversions between different asset types (e.g., between fiat currency, security assets, cryptocurrencies, and/or NFTs) can likewise involve a settlement delay and/or holding period before the conversion takes place. The technical solution presented by the systems and methods described herein includes advancing funds stored in holding account(s) associated with the payment service, automatically and/or rapidly indicating transfers using one or more internal ledgers, and refunding the holding account(s) associated with the payment service for the advance from the payee's account(s) instantly or once any settlements, delays, and/or holding periods have passed. The payment service systems described herein can bypass slow systems associated with securities exchanges to bypass these settlements, delays, and/or holding periods. In some examples, settlements, delays, and/or holding periods can be used by such systems to check if a transfer potentially violates any rules or laws before allowing the transfer to go through, whether the transfer is high or low risk, and/or whether the transfer or includes any errors. The payment service systems described herein can, in some examples, quickly perform error checking, perform risk analysis, and/or check if a transfer potentially violates any rules or laws. If the check by the payment service systems described herein finds no errors and/or no rule or law violations, the payment service systems described herein can proceed with the transfer as described, saving time over traditional systems. In some examples, the payment service systems described herein can advance funds prior to or during such settlements, delays, and/or holding periods thereby enabling payees access to funds instantly. That is, in some examples, the payment service system described herein can enable payees to access funds instantly (e.g., when the transfer instrument is deposited) instead of causing the payees to wait for settlement, delay, or holding periods to pass. In some examples, the technical solution presented by the systems and methods described herein includes processing the transfer(s) as peer-to-peer (P2P) transfers or point-of-sale (POS) transactions without involving third-party middleman systems.

Another technical problem that the systems and methods described herein overcome is the lack of speed and security in check generation for traditional checks. For instance, once a user requests a traditional check, it often takes days or weeks before the user receives the check, since traditional checks are generally printed on paper and mailed to the user. During this mailing, the checks represent a security risk as noted herein. The technical solution presented by the systems and methods described herein includes rapid (e.g., instantaneous) generation and sending of a digital instance and/or a printed instance of the transfer instrument to a recipient device (e.g., payor device, payee device, point of sale (POS) device, printer, fax machine, etc.) that is customized with a customized interactive element that can encode information for pre-filling depositing information to speed up depositing the transfer instrument and/or that can encode information (e.g., encrypted security verification data) for secure authentication of the transfer instrument. The recipient device can be a device capable of printing the transfer instrument (e.g., POS device, printer, fax machine, etc.) if a printed instance of the transfer instrument is required or desired to process the particular transfer, if a wet signature (e.g., using a real pen or pencil rather than a touch-sensitive surface) is required or desired to process the particular transfer, or some combination thereof. In some examples, use of a wet signature in addition to the interactive element and the various other security elements described herein can further increase security, as the wet signature can be compared to reference instance(s) of the user's (e.g., payor's or payee's) signature. The systems and methods described herein can efficiently and quickly provide a flexibly customized digital instance and/or printed instance of the transfer instrument, with the interactive element(s) of the transfer instrument customized to direct the payor device to a transfer instrument depositing resource chosen by the payee, the payor, the payment service, or a combination thereof. As such, techniques described herein can provide technical solutions to technical problems with traditional check generation and processing techniques. As described above, such techniques can be useful for providing more security.

Another technical problem that the systems and methods described herein overcome is provision for asynchronous peer-to-peer (P2P) payments. Traditional P2P payments are made in real-time, while use of transfer instruments such as checks to effect P2P payments allows for delayed, asynchronous P2P payments and/or P2P payment processing. This further adds to customization and flexibility provided using the systems and methods described herein.

Another technical problem that the systems and methods described herein overcome is to increase efficiency and reduce bandwidth usage by processing multiple transactions at a time through batched transaction processing. In some examples, the payment service system is configured to, and can, create or activate specific or customized payment rails in real-time (or near real-time) based on the payment resource, the resource identifier for the depositing resource, the depositing resource itself, the indication of the interaction, the context data, or a combination thereof. The different payment rails can include, for example, a credit card rail, a debit card rail, a cryptocurrency payment rail or network, a rail for payment made in the United States, a rail for payment made in Europe, a rail for payment made in Asia, rails for different financial institutions, rails for different relationships between payor and payee, and so forth. In some examples, transactions and/or transfers related to multiple transfer instruments, accounts, and/or asset types may be batched to increase efficiency. These batched transactions and/or transfers may be related or unrelated to each other, but may be batched based on use of the same payment rails. Processing of these batched transactions and/or transfers together may provide further increases to transaction processing efficiency, reductions in bandwidth usage (e.g., due to less repetition of redundant information that is consistent across transactions under the same payment rail), increase in throughput related to how may transactions can be processed at a time, or a combination thereof. For instance, all transfer instruments for which a deposit is requested (e.g., in response to interaction with the corresponding interactive element of the respective transfer instrument) in a specific geographic territory or location (e.g., continent, country, state, county, city, zip code, and/or area code) can be batched at the end of the day and processed via a shared payment rail.

Various aspects of the application will be described with respect to the figures. FIG. 1 is a block diagram illustrating an architecture of a transfer instrument generation and processing system 100. The transfer instrument generation and processing system 100 includes a payor user device 115 associated with a payor user 110 and a payee user device 165 associated with a payee user 160. The payor user 110 may be referred to as a payor, a user, a transferor, or a transferor user. In some examples, the payor user 110 can be a merchant in a POS transaction or a peer in a P2P transaction. The payee user 160 may be referred to as a payee, a user, a transferee, or a transferee user. In some examples, the payee user 160 can be a customer in a POS transaction or a peer in a P2P transaction. Examples of the payor user 110 and/or the payee user 160 include any of the users 814 (e.g., the merchants 816(A)-816(N), the customers 820, etc.) described below with reference to FIG. 8 or the users 914 (e.g., the users 916(A)-916(B)) described below with reference to FIG. 9, any other users or persons discussed herein, or combinations thereof. Examples of the payor user device 115 and/or the payee user device 165 include any of the user devices 806, the merchant devices 808(A)-808(N), the reader device 822, the POS system 824, the user devices 906, the user devices 908(A)-908(B), the user device 1202, the reader device 1226, a computing system, any other devices described in FIG. 8, 9, and 12 or any other place herein or a combination thereof. In some examples, the payor user device 115 and/or the payee user device 165 can include a reader device, which can include a camera, optical scanner sensor, NFC reader, RFID reader, PAN receiver, or other device that can be used by the payee user device 165 (and/or the payor user device 115) to interact with the interactive element 140, the interactive element 210, and/or the interactive elements 605.

The transfer instrument generation and processing system 100 includes a transfer instrument generation service 125 with one or more servers. The transfer instrument generation and processing system 100 includes a transaction processing service 175 with one or more servers. The transfer instrument generation service 125 and the transaction processing service 175 may be communicatively coupled to each other and/or to one or more user devices (e.g., the payor user device 115, the payee user device 165, and/or the printer 150) through one or more networks 105, which may include one or more local area networks (LAN), one or more wireless local area networks (WLAN), one or more intranets, the Internet, one or more cellular networks, or a combination thereof.

The transfer instrument generation and processing system 100 performs a transfer instrument generation and processing process that is illustrated in FIG. 1. The transfer instrument generation and processing process begins with the payor user device 115 accessing a payor instance of the payment resource 118. In some examples, the payment resource 118 is a software application associated with a payment service (e.g., with the transfer instrument generation service 125 and/or the transaction processing service 175), as in the POS application 818, the payment application

918, the user interface 1220, or a combination thereof. The payor user device 115 may access (e.g., download from an application repository, install, launch, run, start, execute, transition from running as a background process to running as a foreground process, and/or otherwise access) the payor instance of the payment resource 118. In some examples, the payment resource 118 is a website or other online portal associated with a payment service (e.g., with the transfer instrument generation service 125 and/or the transaction processing service 175) and accessible to the payor user device 115 through a browser software application running on the payor user device 115, as in the user interface 1220.

A transfer of one or more assets from the payor user 110 to the payee user 160 using a transfer instrument 130 (e.g., a check) may be desired. The payor user device 115 uses the payor instance of the payment resource 118 to send a transfer instrument generation request 120 to the server(s) of the transfer instrument generation service 125 to request that the server(s) of the transfer instrument generation service 125 generate the transfer instrument 130. The server(s) of the transfer instrument generation service 125 receive the transfer instrument generation request 120 from the payor user device 115 (e.g., from the payor instance of the payment resource 118). In response to receipt of the transfer instrument generation request 120, the server(s) of the transfer instrument generation service 125 generate an interactive element 140, or cause other server(s) to generate the interactive element 140. In response to receipt of the transfer instrument generation request 120, the server(s) of the transfer instrument generation service 125 generate the transfer instrument 130, or cause other server(s) to generate the transfer instrument 130. The transfer instrument 130 includes the interactive element 140.

Figure 2:
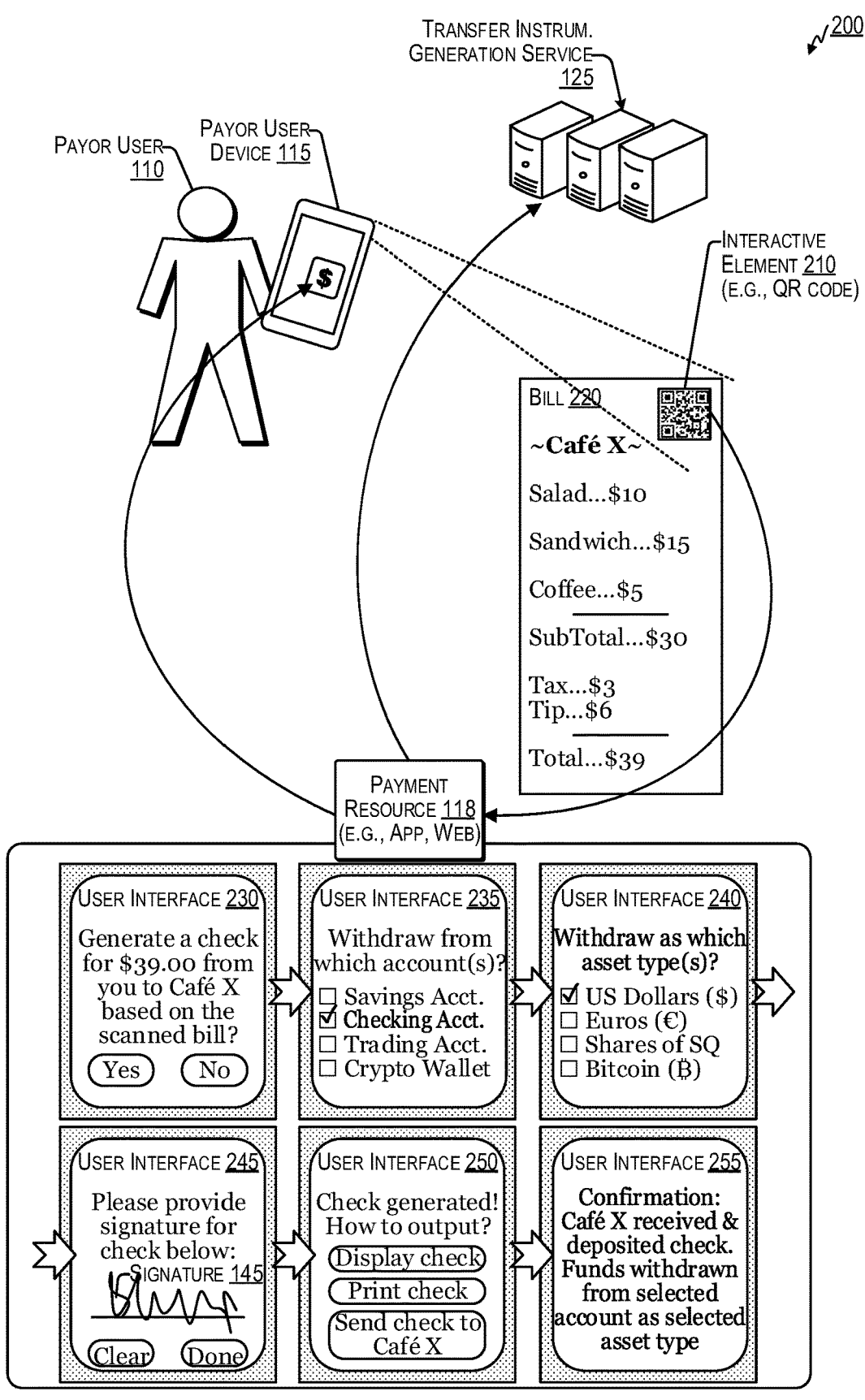
FIG. 2 is a conceptual diagram illustrating a payor user device interacting with an interactive element on a bill to trigger generation of a transfer instrument using a payment resource, in accordance with some examples.

In some examples, the payor user device 115 and/or the payor instance of the payment resource 118 sends the transfer instrument generation request 120 to the server(s) of the transfer instrument generation service 125 in response to the payor user device 115 interacting with an interactive element 210 on a bill 220, invoice, receipt, or other object, for instance as illustrated in FIG. 2.

The transfer instrument generation request 120, and/or further communications from the payor user device 115 (e.g., from the payor instance of the payment resource 118) to the transfer instrument generation service 125, may include any of the information described herein that is included as part of the transfer instrument 130 and/or that is encoded in the interactive element 140 of the transfer instrument 130. For instance, information that may be part of the transfer instrument 130, that may be encoded in the interactive element 140, and/or that may be included in the transfer instrument generation request 120, may include: information identifying the payor user 110, the payor user device 115, the payor instance of the payment resource 118, one or more amounts of one or more assets to withdraw from the using the transfer instrument 130, one or more user accounts to withdraw from the using the transfer instrument 130, one or more asset types to withdraw the one or more assets as using the transfer instrument 130, one or more institutions (e.g., banks or other financial institutions) associated with the payor user 110, the payee user 160, the payee user device 165, the payee instance of the payment resource 118, the payee instance of the transfer instrument depositing resource 168, a resource identifier for the payee instance of the payment resource 118, a resource identifier for the payee instance of the transfer instrument depositing resource 168, one or more amounts of one or more assets to deposit the using the transfer instrument 130, one or more user accounts to deposit into the using the transfer instrument 130, one or more asset types to deposit the one or more assets as using the transfer instrument 130, one or more institutions (e.g., banks or other financial institutions) associated with the payee user 160, a signature input (e.g., signature 145), any information input using any of the user interfaces 230-255 of FIG. 2, any information input using any of the user interfaces 330-355 of FIG. 3, any security verification data (e.g., the encrypted security verification dataset 410), any of the information 420 of FIG. 4, any other information described herein as included in the transfer instrument 130, any other information described herein as encoded in the interactive element 140, any other information described herein as part of the transfer instrument generation request 120, or any combination thereof. The transfer instrument 130 includes the interactive element 140 and indicates an amount of at least one asset type to be transferred from the payor user 110 to a payee user 160 and/or any of the above-listed types of information. In some examples, the transfer instrument 130 also includes a signature of the payor user 110 (e.g., signature 145), a signature of the payee user 160 (e.g., applied by the payee after the payee receives the transfer instrument 130), or both. These signature(s) may each be handwritten signatures, for instance written using a pen or pencil on the printed instance 155 of the transfer instrument 130, or written using a mouse or stylus or finger (e.g., using a touch-sensitive surface such as a trackpad or touchscreen) for use on the digital instance 135 of the transfer instrument 130.

The interactive element 140 encodes a resource identifier identifying a transfer instrument depositing resource 168. The resource identifier can direct the payee user device 165 to access the transfer instrument depositing resource 168, and may include, for example, a uniform resource identifier (URI), a uniform resource locator (URL), a hyperlink, and/or a different type of identifier associated with access to the transfer instrument depositing resource 168. In some examples, the transfer instrument depositing resource 168 is a software application associated with a payment service (e.g., with the transfer instrument generation service 125 and/or the transaction processing service 175), as in the POS application 818, the payment application 918, the user interface 1220, or a combination thereof. The payee user device 165 may access (e.g., download from an application repository, install, launch, run, start, execute, transition from running as a background process to running as a foreground process, and/or otherwise access) the transfer instrument depositing resource 168 in response to accessing the resource identifier by interacting with the interactive element 140. In some examples, the transfer instrument depositing resource 168 is a website or other online portal associated with a payment service (e.g., with the transfer instrument generation service 125 and/or the transaction processing service 175) and accessible to the payee user device 165 through a browser software application running on the payee user device 165, as in the user interface 1220. In some examples, the transfer instrument depositing resource 168 is a payee instance of the payment resource 118.

In some examples, the resource identifier can cause the payee user device 165 to perform other actions in addition to accessing the transfer instrument depositing resource 168, such as causing the payee user device 165 to automatically fill in (e.g., pre-fill) information into the transfer instrument depositing resource 168 corresponding to the transfer instrument 130 (e.g., any of the information described herein as part of the transfer instrument 130 or encoded in the interactive element 140), causing the payee user device 165 to request that the transfer instrument 130 be authenticated (e.g., using the multi-factor authenticator 184), causing the payee user device 165 to request that the transfer instrument 130 be deposited (e.g., using the transaction processing service 175), or a combination thereof.

In some examples, the interactive element 140 includes a glyph that optically, or otherwise, encodes information (e.g., including at least the resource identifier, any of the information 420, and/or any other information discussed herein as encoded in the interactive element 140). Examples of such a glyph include a quick response (QR) code, a bar code, a data matrix, an Aztec code, Maxicode, a CodaBlock-F code, a Maxicode, a MicroPDF417 code, a PDF417 code, a Han Xin code, a DotCode, a snaptag, a color variant of any of the previously-listed glyph types (increasing storage capacity by using color as an additional dimension), or a combination thereof. The payee user device 165 can interact with the interactive element 140 by optically scanning the glyph using a camera, image sensor, and/or optical scanner sensor of the payee user device 165 (or coupled to the payee user device 165), and optically decoding the information that is optically encoded in the glyph.

In some examples, the interactive element 140 includes a link, such as a hypertext link or an image-based link. The link can encode information (e.g., including at least the resource identifier, any of the information 420, and/or any other information discussed herein as encoded in the inter-active element 140). A user viewing the digital instance 135 of the transfer instrument 130 can click, touch, or otherwise interact with the link to interact with the interactive element 140. For instance, if the payee user device 165 receives the digital instance 135 of the transfer instrument 130, the payee user device 165 can interact with the interactive element 140 by having the payee user 160 click, touch, or otherwise interact with the link. The link can encode the resource identifier for the transfer instrument depositing resource 168 (e.g., among other information), so the payee user 160 interacting with the link through the payee user device 165 can cause the payee user device 165 to access the transfer instrument depositing resource 168. In some examples, the interactive element 140 includes an image depicting the glyph, and includes an image link corresponding to the image, so that a user (e.g., the payee user 160) clicking, touching, or interacting with the image that depicts the glyph can cause the payee user device 165 to access the transfer instrument depositing resource 168.

In some examples, the interactive element 140 includes a near-field communication (NFC) tag or transceiver that encodes information (e.g., including at least the resource identifier, any of the information 420, and/or any other information discussed herein as encoded in the interactive element 140) in the memory of the NFC tag. The payee user device 165 can interact with the interactive element 140 by bringing an NFC reader of the payee user device 165 (or that is coupled to the payee user device 165) in proximity to the NFC tag, causing the NFC tag to transmit the information encoded in the NFC tag wirelessly to the NFC reader, and causing the NFC reader to wirelessly receive the information encoded in the NFC tag from the NFC tag. In some examples, the interactive element 140 includes a radio-frequency identification (RFID) tag or transceiver that encodes information in the memory of the RFID tag. The payee user device 165 can interact with the interactive element 140 by bringing a RFID reader of the payee user device 165 (or that is coupled to the payee user device 165) in proximity to the RFID tag, causing the RFID tag to transmit the information encoded in the RFID tag wirelessly to the RFID reader, and causing the RFID reader to wire-lessly receive the information encoded in the RFID tag from the RFID tag. In some examples, the interactive element 140 includes a personal area network (PAN) beacon or trans-ceiver (e.g., Bluetooth® beacon or transceiver) that encodes information in the memory of the PAN beacon. The payee user device 165 can interact with the interactive element 140 by bringing a PAN receiver of the payee user device 165 (or that is coupled to the payee user device 165) in proximity to the PAN beacon or transceiver, causing the PAN beacon or transceiver to transmit the information encoded in the PAN beacon or transceiver wirelessly to the PAN receiver, and causing the PAN receiver to wirelessly receive the informa-tion encoded in the PAN beacon or transceiver from the PAN beacon or transceiver.

The server(s) of the transfer instrument generation service 125 output the transfer instrument 130 by outputting a digital instance 135 of the transfer instrument 130, a printed instance 155 of the transfer instrument 130, or both. A digital instance 135 of the transfer instrument 130 is illustrated in FIG. 1, can include the interactive element 140, an identi-fication of the payor, an identification of the payee, a date (Feb. 20, 2022), an amount and corresponding asset type (ninety dollars), a memo ("for dinner"), and a signature 145 of the payor user 110. The server(s) of the transfer instru-ment generation service 125 can output the transfer instru-ment 130 by sending the digital instance 135 of the transfer instrument 130 to one or more recipient devices. In some examples, the recipient device(s) include the payor user device 115. For instance, the payor user device 115 can receive the digital instance 135 of the transfer instrument 130 and can display the digital instance 135 of the transfer instrument 130 on a display of the payor user device 115. The payor user 110 can show the displayed digital instance 135 of the transfer instrument 130 to the payee user 160 so that the payee user 160 can use the payee user device 165 to interact with the digital instance 135 of the transfer instru-ment 130 as displayed by the payor user device 115, for instance through optical scanning. In some examples, a component of the payor user device 115 can be used as part of the interactive element 140 in connection with output of the digital instance 135 of the transfer instrument 130 by the payor user device 115. For example, an NFC transceiver of the payor user device 115 can act as an NFC transceiver of the interactive element 140, an RFID transceiver of the payor user device 115 can act as an RFID transceiver of the interactive element 140, a PAN transceiver of the payor user device 115 can act as a PAN transceiver of the interactive element 140, or a combination thereof.

In some examples, the recipient device(s) include the payee user device 165. For instance, the payee user device 165 can receive the digital instance 135 of the transfer instrument 130 and can display the digital instance 135 of the transfer instrument 130 on a display of the payee user device 165. In some examples, the payee user device 165 can interact with the interactive element 140 automatically upon receipt of the transfer instrument 130. In some examples, the payee user 160 can interact with the interac-tive element 140 through a user interface of the payee user device 165, for example by clicking on, touching, or other-wise interacting with the interactive element 140 while the digital instance 135 of the transfer instrument 130 is dis-played on a display of the payee user device 165. In some examples, the payee user device 165 can receive the digital instance 135 of the transfer instrument 130 and can display the digital instance 135 of the transfer instrument 130 on a display of the payee user device 165. A different component of the payee user device 165, such as a sensor, camera or optical scanner, can be used to interact with the digital instance 135 of the transfer instrument 130 as displayed by the payee user device 165, for instance through optical scanning. In some examples, a component of the payee user device 165 can be used as part of the interactive element 140 in connection with output of the digital instance 135 of the transfer instrument 130 by the payee user device 165. For example, an NFC transceiver of the payee user device 165 can act as an NFC transceiver of the interactive element 140, an RFID transceiver of the payee user device 165 can act as an RFID transceiver of the interactive element 140, a PAN transceiver of the payee user device 165 can act as a PAN transceiver of the interactive element 140, or a combination thereof. Another component of the payee user device 165 can then act as an NFC, RFID, and/or PAN reader or receiver to interact with the interactive element 140. In some examples, the payor user device 115 can receive the digital instance 135 of the transfer instrument 130 from the server(s) of the transfer instrument generation service 125, and the payor user device 115 can send the digital instance 135 of the transfer instrument 130 to the payee user device 165.

In some examples, the recipient device(s) include the printer 150. In some examples, the printer 150 is a printing device. In some examples, the printer 150 is a device that includes a printer, such as a fax machine, a POS terminal that includes a printer (e.g., a receipt printer), a copy machine, and the like. The printer 150 can receive the digital instance 135 of the transfer instrument 130 and print the digital instance 135 of the transfer instrument 130 to create a printed instance 155 of the transfer instrument 130. The printed instance 155 of the transfer instrument 130 is also illustrated as including a printed instance of the interactive element 140, a printed instance of the signature 145, and printed instances of the other elements of the transfer instrument 130. In some examples, the server(s) of the transfer instrument generation service 125 can send the digital instance 135 of the transfer instrument 130 directly to the printer 150. In some examples, the server(s) of the transfer instrument generation service 125 can send the digital instance 135 of the transfer instrument 130 to the payor user device 115 and/or to the payee user device 165, one or both of which can in turn send the digital instance 135 of the transfer instrument 130 to the printer 150. In some examples, the printer 150 is part of the payor user device 115. In some examples, the printer 150 is part of the payee user device 165. In some examples, the printer 150 is selected (e.g., by the server(s) of the transfer instrument generation service 125, by the payor user device 115, by the payee user device 165, by the payor user 110, and/or by the payee user 160) for sending the digital instance 135 of the transfer instrument 130 to because the printer is in a proximity (e.g., same building, same room, same wireless network, and/or within direct wireless communication range of) of the payor user device 115, the payee user device 165, the payor user 110, the payee user 160, or a combination thereof. In some examples, the printer 150 is associated with the transfer instrument generation service 125, and the transfer instrument generation service 125 mails the printed instance 155 of the transfer instrument 130 to the payor user 110, the payee user 160, and/or the transaction processing service 175 once the printer 150 prints the printed instance 155 of the transfer instrument 130.

In some examples, the recipient device(s) include the server(s) of the transaction processing service 175. In some examples, the server(s) of the transfer instrument generation service 125 can send the digital instance 135 of the transfer instrument 130 as part of authenticating the transfer instrument 130 (e.g., using multi-factor authenticator 184), depositing the transfer instrument 130 (e.g., deposit(s) 180), and/or processing the transfer(s) associated with the deposit(s) 180 (e.g., in some examples including asset conversion(s) by the asset converter(s) 182).

The transfer instrument 130 and/or the interactive element 140 is to be provided to the payee user 160 and/or to the payee user device 165. The digital instance 135 of the transfer instrument 130 and/or the printed instance 155 of the transfer instrument 130 can be provided to the payee user 160 and/or to the payee user device 165. For instance, the digital instance 135 of the transfer instrument 130 and/or the interactive element 140 can be sent and/or transmitted to the payee user device 165 as a recipient device as described above.

The digital instance 135 of the transfer instrument 130 and/or the interactive element 140 can be sent and/or transmitted to the payor user device 115 as a recipient device as described above, and displayed and/or sent to payee user 160 and/or to the payee user device 165 from the payor user device 115. The digital instance 135 of the transfer instrument 130 and/or the interactive element 140 can be sent and/or transmitted to the printer 150 to cause the printer 150 to print a printed instance 155 of the transfer instrument 130, which can be provided to the payee user 160, to the payee user device 165, and/or to the payor user 110 (e.g., to hand to the payee user 160 or input into the payee user device 165). In some examples, the printed instance 155 of the transfer instrument 130 can be mailed to the payee user 160 and/or to the payor user 110 (e.g., to hand to the payee user 160 or input into the payee user device 165).

The payee user device 165 interacts with the interactive element 140 as described above, for example by optically scanning a glyph, interacting with a link, receiving data from an NFC tag, receiving data from an RFID tag, or receiving data from a PAN beacon. The server(s) of the transfer instrument generation service 125 and/or the server(s) of the transaction processing service 175 receive an indication of the interaction between the payee user device 165 and the interactive element 140 of the transfer instrument 130. In an illustrative example, the interaction between the payee user device 165 and the interactive element 140 includes the payee user device 165 optically scanning the glyph of the interactive element 140 (e.g., using a camera or other optical scanner sensor) to decode information (e.g., the resource identifier) that is optically encoded in the glyph of the interactive element 140. In some examples, the indication of the interaction includes an indication that the payee user device 165 accessed the transfer instrument depositing resource 168. In some examples, the indication of the interaction may include at least a subset of the information that the payee user device 165 decodes from the information that is encoded in the interactive element 140 (e.g., at least the resource identifier and/or any other information encoded in the interactive element 140) and/or the transfer instrument 130. In some examples, the indication can be used for multi-factor authentication by the multi-factor authenticator 184, as illustrated in and discussed further with respect to FIG. 4.

The server(s) of the transaction processing service 175 determine an allocation of one or more asset types and/or one or more user accounts associated with the payee user 160 based at least in part on the indication, an identifier received in association with the indication, and/or context data associated with the indication. The identifier may be specific to, and/or may identify, for instance, the payee, the payee device, a browser application running on the payee device, a payment service application running on the payee device, another application running on the payee device, the user account of the payee, a username of the user, a metadata tag or unique identifier of the user, an email address of the user, a password of the user, a personal identification number (PIN) of the user, a user-provided identifier, an encoded identifier, or a combination thereof. The allocation of one or more asset types may identify how much (e.g., an amount) of the funds from the payor user 110 are to be apportioned to which of the asset type(s), and/or into which of the one or more user accounts associated with the payee user 160, when the transfer instrument 130 is deposited by the payee user 160. The allocation may be referred to as a composition of asset type(s) and/or account(s). The allocation may be referred to as one or more ratio(s) of asset type(s) and/or account(s).

In some examples, the transaction processing service 175 can use context data to determine the allocation of the funds associated with the transfer instrument 130. The context data can refer to, for instance, an identity of the payor user 110, an identity of the payee user 160, a location of the payor user 110 and/or payor user device 115 when the transfer instrument 130 is generated, a location of the payee user 160 and/or the payee user device 165 when the transfer instrument 130 is received by the payee user 160 and/or the payee user device 165, a location of the payee user 160 and/or the payee user device 165 is when the transfer instrument 130 is deposited, a transfer history of the payor user 110, a transfer history of the payee user 160, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, transaction activity involving one or more social contacts associated with the payee, any information discussed herein as a possible input to the one or more trained machine learning models 190 described herein, or a combination thereof. For instance, the allocation can match one or more allocation(s) that were previously selected by the payee user 160. The allocation can match one or more allocation(s) that are commonly selected by the payee user 160 (e.g., the "favorites" of the payee user 160). The allocation can be different depending on whether the transfer instrument 130 was generated, received, and/or deposited at work, at home, at school, at a merchant location, at an office, or at another location. The allocation can be different depending on who the transfer instrument 130 is from.

Figure 3:
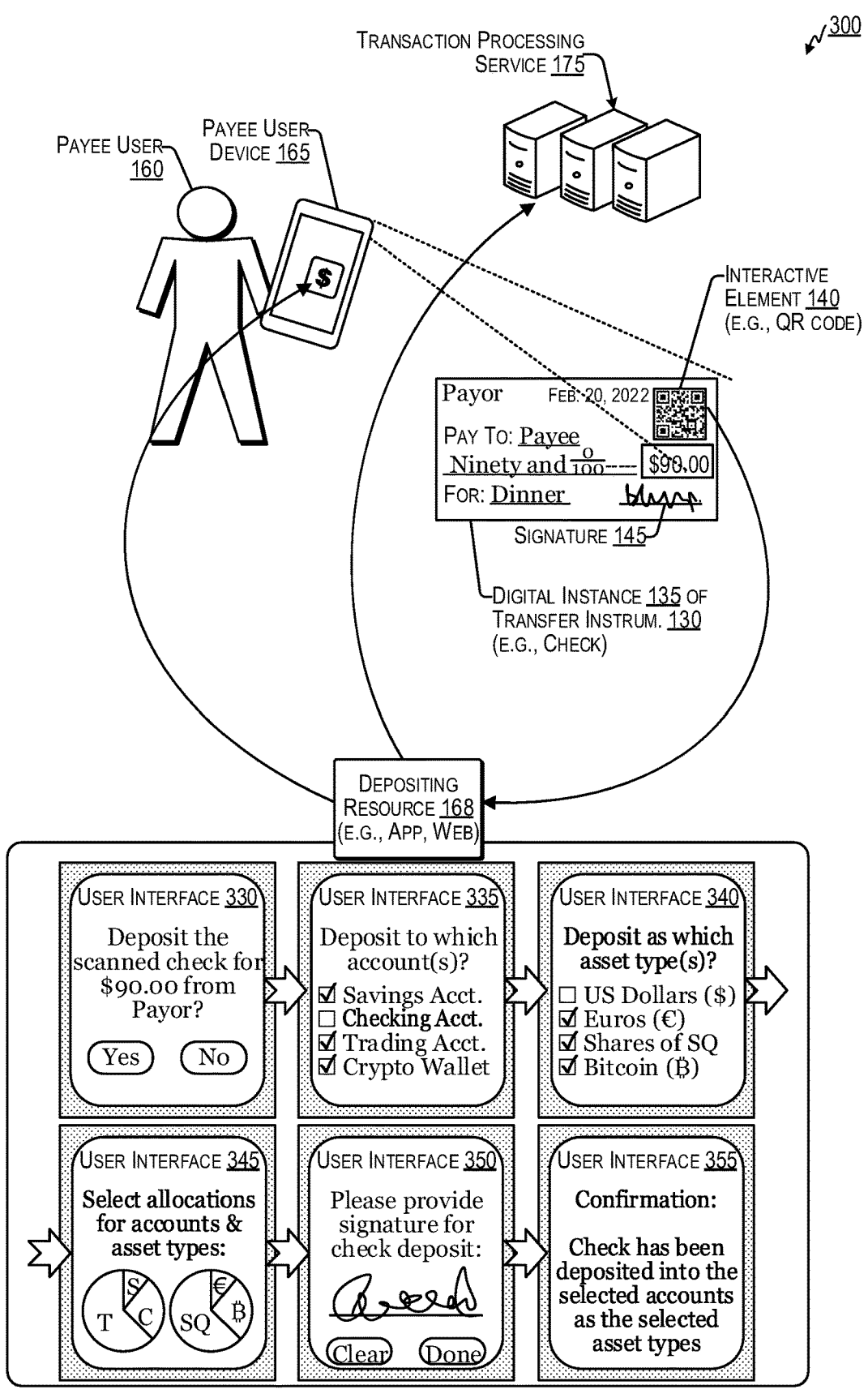
FIG. 3 is a conceptual diagram illustrating a payee user device interacting with an interactive element on a transfer instrument to trigger depositing of the transfer instrument using a transfer instrument depositing resource, in accordance with some examples.

In some examples, the allocation may be selected by the payee user 160 through a user interface of the payee user device 165 and/or the transfer instrument depositing resource 168, as illustrated in the user interface 335, the user interface 340, and/or the user interface 345 of FIG. 3. The context data can refer to these user interface selections and/or interactions.

The server(s) of the transaction processing service 175 facilitate a transfer of one or more transfer amounts of the one or more asset types to the one or more user accounts associated with the payee user 160 based on the allocation. Examples of the one or more user accounts associated with the payee user 160 include the payee currency account(s) 170, the payee security asset account(s) 172, and the payee cryptocurrency account(s) 174. In some examples, individual of the user accounts can be dedicated savings accounts, for example, associated with a particular event, purchase, goal (e.g., savings goals, spending goals), or the like. In some examples, the one or more user accounts can be physically or logically separated. In some examples, any two of the user accounts can each be associated with different institutions (e.g., banks, credit unions, merchants (for store credit), stockbrokers, stock exchanges, stock trading platforms, currency exchange platforms, retirement account institutions, payment processors, financial institutions, lending institutions, credit institutions, securities institutions, and the like) or with the same institution. The payee currency account(s) 170 can store and/or receive fiat currencies and/or cryptocurrencies as their associated asset type(s). The payee security asset account(s) 172 can store and/or receive security assets (e.g., stocks, bonds, investments, debt, equity, warrants, futures, shorts) as their associated asset type(s). In some examples, security assets can be used as currency. The payee cryptocurrency account(s) 174 can store and/or receive cryptocurrencies and/or NFTs as their associated asset type(s). Examples of fiat currencies can include the US Dollar ($), the Canadian Dollar, the Euro (€), the Yen (¥), the British Pound (£), and the like. Examples of cryptocurrencies can include Bitcoin (₿), Ethereum (ETH), Litecoin (LTC), Cardano (ADA), Dogecoin (DOGE), and the like.

In some examples, the one or more transfer amounts of the deposit(s) 180 match on the amount of the at least one asset type indicated by the transfer instrument 130. For instance, the transfer instrument 130 indicates an amount and asset type of ninety U.S. dollars ($90). The one or more transfer amounts of the deposit(s) 180 can match this amount and asset type, for instance meaning that the deposit(s) 180 would deposit the same ninety U.S. dollars ($90) into one or more accounts associated with the payee user 160, such as the payee currency account(s) 170.

In some examples, the one or more transfer amounts of the deposit(s) 180 are different from, but are based on, the amount of the at least one asset type indicated by the transfer instrument 130. For instance, the one or more transfer amounts of the deposit(s) 180 may be equivalent to the amount of the at least one asset type indicated by the transfer instrument 130 if the amount of the at least one asset type is converted into one or more different asset types using asset converter(s) 182, and in some examples if one or more fees (e.g., conversion fees, taxes, tariffs, etc.) are deducted. The one or more asset types—and/or the at least one asset type—can include, for instance, fiat currencies, security assets (e.g., stocks, bonds, investments, debt, equity, warrants, futures, shorts), cryptocurrencies, non-fungible tokens (NFTs), or combinations thereof. Examples of asset conversion using the asset converter(s) 182, and example transfer amounts of the deposit(s) 180, is illustrated in and discussed with respect to FIG. 5.

In an illustrative example, the transfer instrument 130 is used for a customer-to-merchant transfer, the payor user 110 is a customer (e.g., one of the users 814 and/or the customers 820), the payor user device 115 is a customer device (e.g., one of the user devices 806), the payee user 160 is a merchant or a representative of a merchant (e.g., one of the merchants 816(A)-816(N)), and the payee user device 165 is a merchant device (e.g., one of the merchant devices 808 (A)-808(N), the reader device 822, and/or the POS system 824). In another illustrative example, the transfer instrument 130 is used for a peer-to-peer transfer, the payor user 110 is a first peer user (e.g., the user 916(A)), the payor user device 115 is a first peer user device (e.g., the user device 908(A)), the payee user 160 is a second peer user (e.g., the user 916(B)), and the payee user device 165 is a second peer user device (e.g., the user device 908(B)).

While FIG. 1 illustrates an electronic deposit of assets associated with the transfer instrument 130, when the transfer instrument 130 is a printed, physical transfer instrument, the transfer instrument 130 can be deposited at any financial institution, such as a bank, in-person, via an automated teller machine (ATM), an application, or the like. That is, while techniques described herein relate to associating an interactive element with checks or other transaction instruments, techniques described herein can further relate to the generation of checks that can be deposited using traditional channels. In some examples, checks deposited via traditional channels can take longer to process such that the payee user 160 does not have access to the funds at the time of the deposit. Techniques described herein relate to the generation of transfer instruments that can be deposited or otherwise redeemed in different depositing resources which, in some examples, can determine which account(s) and/or asset type(s) the transfer instruments can be deposited as. Further, particular depositing resources can determine the timing associated with when funds are availed and accessible to the payee user 160. In examples where the transfer instrument 130 is deposited via a more traditional channel, or is deposited as a single asset type in a single account, the payee user 160 can manually allocate the deposited funds into one or more accounts and/or request to convert at least a portion of the deposited funds into other asset types.

In some examples, the transfer instrument generation and processing system 100 includes one or more trained machine learning (ML) models 190. The trained ML model(s) 190 can run on, and/or be a part of, the server(s) of the transfer instrument generation service 125, the server(s) of the transaction processing service 175, the payor user device 115, the payee user device 165, one or more network server(s) of the network(s) 105, or a combination thereof. The trained ML model(s) 190 can include, for instance, or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more trained support vector machines (SVMs), one or more trained random forests (RFs), one or more encoders, one or more decoders, one or more deep learning systems, or combinations thereof. The trained ML model(s) 190 can be trained using the training data using supervised learning, unsupervised learning, or a combination thereof. The training data can include selections made in various situations, along with corresponding information (e.g., see examples of input information to the trained ML model(s) 190 and/or context information described herein) about the situations. An illustration of the trained ML model(s) 190 in FIG. 1 illustrates the input layer(s) of the trained ML model(s) 190 as a column of white circles on the left-hand side of the illustration, the output layer(s) of the trained ML model(s) 190 as another column of white circles on the right-hand side of the illustration, and the hidden layers of the trained ML model(s) 190 as two columns of grey-shaded circles in between the input layer(s) and the output layer(s). The circles can represent neurons, channels, layers, filters, pooling layers, normalization layers, maps, parameters, other elements of the trained ML model(s) 190, or combinations thereof. In some examples, the trained ML model(s) 190 include one or more trained ML models that are personalized to a specific user (e.g., the payor user 110 or the payee user 160) by being trained based on data that is specific to that specific user. In some examples, the trained ML model(s) 190 include one or more trained ML models that are generalized for multiple users by being trained based on data specific to various users and/or simulated data for simulated users.

In some examples, the trained ML model(s) 190 are used by the payor user device 115 and/or the server(s) of the transfer instrument generation service 125 to automatically generate the transfer instrument generation request 120. In some examples, the payor user device 115 uses the trained ML model(s) 190 to generate the transfer instrument generation request 120 before the payor user device 115 sends the transfer instrument generation request 120 to the server(s) of the transfer instrument generation service 125. In some examples, the server(s) of the transfer instrument generation service 125 receive the transfer instrument generation request 120 from the trained ML model(s) 190 rather than from the payor user device 115.

The trained ML model(s) 190 can be used by the payor user device 115 and/or the server(s) of the transfer instrument generation service 125 to automatically generate the transfer instrument generation request 120 at least in part by providing input information to input layer(s) of the trained ML model(s) 190 from the payor user device 115 and/or the server(s) of the transfer instrument generation service 125. The input information that is input to the input layer(s) of the trained ML model(s) 190 can include, for instance, an identity of the payor, an identity of the payee, a device type of a payor device of the payor, a device type of a payee device of the payee, data stored on the payor device of the payor, data stored on the payee device of the payee, a relationship between the payor and the payee (e.g., friends, family, employer and employee, contractor and contractee, merchant and customer, and the like), information to be encoded into the interactive element 140, information to be otherwise included as part of the transfer instrument 130, information to be included as part of the transfer instrument generation request 120, a signature of the payor user 110, a signature of the payee user 160, available account(s) and/or account type(s) associated with the payor (e.g., that the payor could withdraw the funds for the transfer instrument from), available asset(s) and/or asset type(s) associated with the payor (e.g., that the payor could withdraw the funds for the transfer instrument as), available accounts and/or account types associated with the payee that the funds from the transfer instrument can be transferred into, asset types that the payee possesses, record(s) of which account(s) or account type(s) the payor has withdrawn funds for previous transfer instrument(s) from, record(s) of which asset(s) or asset type(s) the payor has withdrawn funds for previous transfer instrument(s) as, record(s) of which account(s) or account type(s) the payee has deposited previous transfer instrument(s) into, record(s) of which asset(s) or asset type(s) the payee has deposited previous transfer instrument(s) as, a location of the payor user 110 and/or payor user device 115 when the transfer instrument 130 is generated, a location of the payee user 160 and/or the payee user device 165 when the transfer instrument 130 is received by the payee user 160 and/or the payee user device 165, a location of the payee user 160 and/or the payee user device 165 is when the transfer instrument 130 is deposited, a transfer history of the payor user 110, a transfer history of the payee user 160, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, transaction activity involving one or more social contacts associated with the payee, any of the types of context data described herein, or a combination thereof.

The trained ML model(s) 190 can output the transfer instrument generation request 120 using the output layer(s) of the trained ML model(s) 190. In some examples, the trained ML model(s) 190 can include various hidden layers between the input layer(s) and the output layer(s), each of which can be associated with making specific selection(s) for the transfer instrument generation request 120, such as any of the selections illustrated in the user interfaces 230-250 of FIG. 2.

The training data used to train the trained ML model(s) 190 can include examples of transfer instrument generation requests 120 that have been generated in various situations, as well as corresponding information describing those situations. The corresponding information describing those situations can include any of the types of information listed above with respect to input information provided to the input layer(s) of the trained ML model(s) 190.

In some examples, the trained ML model(s) 190 are used by the server(s) of the transfer instrument generation service 125 to automatically generate the interactive element 140 and/or the transfer instrument 130. For instance, in some examples, the server(s) of the transfer instrument generation service 125 input context information into the trained ML model(s) 190, and the trained ML model(s) 190 output the interactive element 140 and/or the transfer instrument 130 in response. The input information that is input to input layer(s) of the trained ML model(s) 190 can include information that is part of the transfer instrument generation request 120, any of the types of input information described above, or a combination thereof.

The trained ML model(s) 190 can output the interactive element 140 and/or the transfer instrument 130 using the output layer(s) of the trained ML model(s) 190. In some examples, the trained ML model(s) 190 can include various hidden layers between the input layer(s) and the output layer(s), each of which can be associated with making specific selection(s) for the interactive element 140 and/or the transfer instrument 130, such as any of the selections illustrated in the user interfaces 230-250 of FIG. 2, any of the information to be included in the transfer instrument 130 and/or the interactive element 140 (e.g., the information 420), or a combination thereof.

In some examples, the trained ML model(s) 190 are used by the payee user device 165 and/or the server(s) of the transaction processing service 175 to automatically deposit the transfer instrument 130 and/or to automatically make various selections associated with how to deposit the transfer instrument 130. For instance, in some examples, the trained ML model(s) 190 are used by the payee user device 165 and/or the server(s) of the transaction processing service 175 to automatically select asset type(s) to deposit the funds from the transfer instrument as, and/or that automatically select account(s) to deposit the funds the transfer instrument into. The input information that is input to input layer(s) of the trained ML model(s) 190 can include any information that is encoded into and read from the interactive element 140, any information that is otherwise part of and that is read from the transfer instrument 130 (e.g., via OCR), information that is part of the transfer instrument generation request 120, any of the types of input information described above, or a combination thereof.

The trained ML model(s) 190 can output the selections (e.g., of account(s), account type(s), asset(s), and/or asset type(s)) associated with depositing the transfer instrument 130 using the output layer(s) of the trained ML model(s) 190. In some examples, the trained ML model(s) 190 can include various hidden layers between the input layer(s) and the output layer(s), each of which can be associated with making specific selection(s) associated with depositing the transfer instrument 130, such as any of the selections illustrated in the user interfaces 330-350 of FIG. 3, selection(s) of account(s), selection(s) of account type(s), selection(s) of asset(s), selection(s) of asset type(s), other selection(s) regarding how the transfer instrument 130 is to be deposited, or a combination thereof.

FIG. 2 is a conceptual diagram 200 illustrating a payor user device 115 interacting with an interactive element 210 on a bill 220 to trigger generation of a transfer instrument 130 using the payment resource 118. The interactive element 210 is illustrated as a QR code, but can include any type of interactive element(s) discussed with respect to the interactive element 140 (e.g., glyph, link, NFC tag, RFID tag, and/or PAN beacon). The bill 220 is illustrated as a bill or receipt for "Café X." The bill 220 identifies a total amount to be paid to be $39. The $39 total is broken out as $10 for a salad, $15 for a sandwich, $5 for a coffee, $3 for tax, and $6 for tip.

Interacting with the interactive element 210 on the bill 220 causes the payor user device 115 to access (e.g., to download from an application repository, install, launch, run, start, execute, transition from running as a background process to running as a foreground process, and/or otherwise access) the payment resource 118. Several example user interfaces are illustrated in FIG. 2 through which the payor user 110 provides inputs to the payor user device 115. These inputs can influence the transfer instrument generation request 120 and/or other communication(s) between payor user device 115 and the server(s) of the check generation service 125. These inputs can influence the transfer instrument 130 that is ultimately generated by the server(s) of the transfer instrument generation service 125.

The example user interfaces of the payment resource 118 include the user interface 230, the user interface 235, the user interface 240, the user interface 245, the user interface 250, and the user interface 255. One or more of the example user interfaces may be omitted or presented in an alternative order. In some examples, additional or alternative user interfaces can be presented via the payment resource 118.

The user interface 230 asks the payor user 110 to confirm whether to generate a transfer instrument 130 for $39.00 from the payor user 110 to Café X based on the scanned bill 220, and allows the payor user 110 to select yes or no. Note that certain parameters, such as the amount and asset type ($39.00) and the payee (Café X) may be automatically filled in, as the information to fill in these parameters may be encoded in the interactive element 210, and/or may be stored at a network location that a resource indicator encoded in the interactive element 210 points to.

The user interface 235 includes a menu allowing the payor user 110 to select one or more of their user accounts to withdraw asset(s) from when processing the transfer for the transfer instrument 130. The user interface 235 is automatically filled in with information identifying multiple of the payor user 110's accounts, which include a savings account, a checking account, a trading account (e.g., for stock market trading), and a crypto wallet (e.g., for crypto-currencies and/or NFTs). The information identifying multiple of the payor user 110's accounts may be stored at a network location that a resource indicator encoded in the interactive element 210 points to, may be based on the payor user 110 having logged into the payment resource 118 and/or previously provided this information via the payment resource 118, and/or may be based on the payor user 110 having logged into the transfer instrument generation service 125 and/or previously provided this information via the transfer instrument generation service 125. The payor user 110 has selected his/her checking account in the illustrated example of the user interface 235.

In examples where the payor user 110 is not associated with an existing user account, the payment service system can initiate an onboarding process to create a new account for the payor user 110. The onboarding process can facilitate account linking and configuration.

The user interface 240 includes a menu allowing the payor user 110 to select one or more of asset types to withdraw asset(s) as when processing the transfer for the transfer instrument 130. The user interface 240 is automatically filled in with information identifying different asset type(s) that the payor user 110 holds in one or more of their accounts, and/or that the asset converter(s) 182 are able to convert the asset(s) of the payor user 110 into. The asset types here include U.S. Dollars ($), Euros (€), shares of Block, Inc. (SQ), and Bitcoin (₿). The information identifying the different asset type(s) that the payor user 110 holds in one or more of their accounts, and/or that the asset converter(s) 182 are able to convert the asset(s) of the payor user 110 into, may be stored at a network location that a resource indicator encoded in the interactive element 210 points to, may be based on the payor user 110 having logged into the payment resource 118 and/or previously provided this information via the payment resource 118, may be based on the payor user 110 having logged into the transfer instrument generation service 125 and/or previously provided this information via the transfer instrument generation service 125, and/or may be based on the capabilities of the asset converter(s) 182. The payor user 110 has selected U.S. Dollars ($) in the illustrated example of the user interface 240.

The user interface 245 includes a signature input interface through which the payor user 110 is able to provide a signature input of their signature 145, for instance using a mouse, touchscreen, trackpad, or other interface of the payor user device 115. In some examples, the payment resource 118 can automatically fill in the signature 145 based on authorization from the payor user 110 to do so, using a previously-drawn instance of the signature 145. The user interface 255 provides a "clear" button allowing the payor user 110 to clear the signature input and a "done" button allowing the payor user 110 to use the signature input (the signature 145) to authorize generation of the transfer instrument 130, and in some examples to be a part of the transfer instrument 130 (e.g., see the signature 145 on the transfer instrument 130 as illustrated in FIGS. 1, 3, 4, 5, and 6). In some examples, a digital signature input interface may be used, which may insert a digital signature that is encrypted via a private key, and that can be decrypted and compared to a reference instance of the signature (e.g., via comparison of hashes of the decrypted instance of the signature to the reference instance of the signature). This can also increase security, providing an additional factor of authentication for the resulting transfer instrument. In some examples, the signature 145 (and thus user interface 245) is not necessary because the inclusion of the encrypted security verification dataset 410 in the interactive element 140 allows for secure authentication via the security verification authenticator 430 of FIG. 4, allowing the process for generating the transfer instrument 130 to be made faster and more efficient while remaining secure.

The user interface 250 asks the payor user 110 to confirm how to output the transfer instrument 130, for instance allowing the payor user 110 to display the transfer instrument 130 (e.g., using a display of the payor user device 115 and/or a display of the payee user device 165), print the transfer instrument 130 (e.g., using a printer 150 near the payor user 110 and/or near the payee user 160), and/or to send the transfer instrument 130 to the payee user 160 (Café X) (e.g., send digital instance 135 of the transfer instrument 130 to the payee user device 165 and/or send printed instance 155 of the transfer instrument 130 by maul to the payee user 160). Certain parameters, such as the payee (Café X), are automatically filled in, as the information to fill in these parameters may be encoded in the interactive element 210, and/or may be stored at a network location that a resource indicator encoded in the interactive element 210 points to. In some examples, the user interface 250 may selectively offer to print the transfer instrument 130 based on a determination of whether a printer 150 is available and identified, on the payor side and/or on the payee side.

The user interface 255 confirms for the payor user 110 that Café X (e.g., the payee user 160 and/or payee user device 165) received the transfer instrument 130 and/or deposited the transfer instrument 130, and that funds for the depositing of the transfer instrument 130 were withdrawn as the payor user 110 indicated (e.g., using user interface 235 and/or user interface 240).

In some examples, the payment resource 118 may include one or more additional user interfaces. For instance, if the payor user 110 selects multiple accounts through the user interface 235 and/or multiple asset types through the user interface 240, the payment resource 118 may also include one or more additional user interfaces similar to the user interface 345 of FIG. 3, which may allow the payor user 110 to select an allocation of how the funds are to be withdrawn from the multiple accounts and/or to select an allocation of what asset types the funds are to be withdrawn as.

In some examples, the transfer instrument generation request 120 may be sent from the payor instance of the payment resource 118 (as accessed using the payor user device 115) to the server(s) of the transfer instrument generation service 125 in response to interaction with one or more of the user interfaces 230-255 of FIG. 2. For instance, the payor user device 115 may send the transfer instrument generation request 120 to the server(s) of the transfer instrument generation service 125 in response to a "yes" button press in the user interface 230, in response to the selections in either or both of user interfaces 235-240, in response to the signature input of user interface 245, and/or in response to the selection in the user interface 250. Any of the information selected, input, and/or otherwise provided using the user interfaces 230-255 of FIG. 2 may be included in the transfer instrument generation service 125, including the selections of user interfaces 235-240, the signature 145 input using the user interface 245, any allocation(s) of account(s) to withdraw from and/or asset type(s) to withdraw as using user interface(s) similar to the user interface 345 of FIG. 3 as discussed above, the selection of the user interface 250, or a combination thereof.

While FIG. 2 illustrates a bill, the interactive element 210 may be associated with any type of object indicating that payment is due. For instance, in some examples, the interactive element 210 may be placed on a receipt, an invoice, part of a POS terminal, a check-in or check-out area, or another object. The object with which the interactive element 210 is associated can be a physical object (e.g., a printed bill, invoice, etc.) and/or a digital object, for example, presented via a display of a display device (e.g., a POS device), or the like.

In some examples, a transfer instrument generation request 120 can be sent by the payment user device 115 and/or received by the transfer instrument generation service 125 automatically, periodically, in response to a payment schedule, for a recurring payment, or some combination thereof. For instance, the transfer instrument generation service 125 can retrieve (e.g., from calendar application(s) of the payor user device 115) and/or store indications of subscriptions, recurring payments, or the like. In some examples, the transfer instrument generation service 125 can monitor due dates, balances, inflows, outflows, etc. and intelligently determine when to recommend to the payor user 110 that a transfer instrument be generated, to automatically generate and send the transfer instrument generation request 120, to automatically generate the transfer instrument 130, and/or to automatically send the transfer instrument 130 to the payee user 160 and/or payee user device 165 to be deposited.

In some examples, transfer instruments can be associated with dates and/or times. Dates and/or times can be used as a mechanism to regulate when transfer instruments can be deposited. In some examples, a payor user 110 can associate one or more dates with a transfer instrument 130 to delay when the transfer instrument 130 can validly be deposited, and/or when the transfer instrument 130 cannot validly be deposited. For example, a transfer instrument 130 can be associated with a date threshold and/or a time threshold. In some examples, the transfer instrument 130 can only be validly deposited before the date threshold and/or the time threshold and can no longer be validly deposited after the date threshold and/or the time threshold, for instance to give the transfer instrument 130 an expiration date and/or time. In some examples, the transfer instrument 130 can only be validly deposited after the date threshold and/or the time threshold and cannot be validly deposited before the date threshold and/or the time threshold, for instance to help ensure that the transfer instrument 130 is deposited at a time when the payor user 110 has sufficient funds in his/her account(s) (e.g., after the payor user 110's next paycheck comes in). A transfer instrument 130 can be associated with a date range and/or a time range. In some examples, the transfer instrument 130 can only be validly deposited during the date range and/or the time range and cannot be validly deposited outside of the date range and/or the time range. In some examples, the transfer instrument 130 cannot be validly deposited during the date range and/or the time range and can only be validly deposited outside of the date range and/or the time range. In some examples, the thresholds and/or ranges of date(s) and/or time(s) can recur or be periodic. For instance, the thresholds and/or ranges can specify that the transfer instrument 130 can be deposited on certain days of the week (e.g., weekdays) but not other days of the week (e.g., weekends). The thresholds and/or ranges can specify that the transfer instrument 130 can be deposited on at certain times of the day (e.g., 9 am to 5 pm) but not during other times of day. The thresholds and/or ranges of date(s) and/or time(s) can ensure that the transfer instrument 130 is deposited at a time when the payor user 110 has sufficient funds in his/her account(s) to be able to draw the deposit from the account(s), that the transfer instrument 130 is deposited at a time when one or more institutions (e.g., banks, credit unions, merchants (for store credit), stockbrokers, stock exchanges, stock trading platforms, currency exchange platforms, retirement account institutions, financial institutions, lending institutions, credit institutions, securities institutions, and the like) are open for business, or a combination thereof. In some examples, a transfer instrument 130 can be associated with one or more dates and/or times that are set in the future, which may delay depositing to cause a delayed depositing of the payment until at least one of the one or more dates and/or times are reached. In such examples, such a delayed payment can be a delayed peer-to-peer (P2P) payment.

In some examples, interaction between the payor user device 115 and the interactive element 210 can automatically cause the payor user device 115 and/or the transfer instrument generation service 125 to make the types of selections illustrated with respect to the user interfaces 230-255 and/or otherwise described with respect to FIG. 2, without showing one or more of the user interfaces 230-255 to the payor user 110 (e.g., via the payor user device 115 and/or the payment resource 118) and/or without receiving further input from the payor user 110 (e.g., via the user interfaces 230-255 or otherwise). For instance, the payor user device 115 and/or the transfer instrument generation service 125 can automatically make these selections without input from the payor user 110 by inputting context information into one or more trained ML model(s) as discussed herein. The input context information can include, for examples, information read and/or decoded from the interactive element 210, information read and/or decoded from the bill 220 (e.g., using optical character recognition (OCR)), information about the payor user 110, information about the payor user device 115, information stored on the payor user device 115, information about asset account(s) of the payor user 110, information about asset(s) of the payor user 110, information about prior transfer(s) to or from the payor user 110, information about prior transfer instruments to or from the payor user 110, or a combination thereof.

FIG. 3 is a conceptual diagram 300 illustrating a payee user device 165 interacting with an interactive element 140 on a transfer instrument 130 to trigger depositing of the transfer instrument 130 using the transfer instrument depositing resource 168. The interactive element 140 is illustrated as a QR code, but can include any type of interactive element(s) discussed with respect to the interactive element 140 (e.g., glyph, link, NFC tag, RFID tag, and/or PAN beacon). The digital instance 135 of the transfer instrument 130 is illustrated, and includes the interactive element 140, an identification of the payor, an identification of the payee, a date (Feb. 20, 2022), an amount and corresponding asset type (ninety dollars), a memo ("for dinner"), and a signature 145 of the payor user 110

Interacting with the interactive element 140 on the transfer instrument 130 causes the payee user device 165 to access (e.g., to download from an application repository, install, launch, run, start, execute, transition from running as a background process to running as a foreground process, and/or otherwise access) the transfer instrument depositing resource 168. Several exemplary user interfaces are illustrated in FIG. 3 through which the payee user 160 provides inputs to the payee user device 165. These inputs can influence how the transfer instrument is deposited using the transfer instrument depositing resource 168 and/or the transaction processing service 175.

The example user interfaces of the transfer instrument depositing resource 168 include the user interface 330, the user interface 335, the user interface 340, the user interface 345, the user interface 350, and the user interface 355. One or more of the example user interfaces may be omitted or presented in an alternative order. In some examples, additional or alternative user interfaces can be presented via the depositing resource 168.

The user interface 330 asks the payee user 160 to confirm whether to deposit the transfer instrument for $90.00 from the payor user 110 based on the scanned interactive element 140 from the transfer instrument 130, and allows the payee user 160 to select yes or no. Note that certain parameters, such as the amount and asset type ($90.00) and the payor's identity (Payor) are automatically filled in, as the information to fill in these parameters may be encoded in the interactive element 140 and/or read from the transfer instrument 130 (e.g., via OCR). This information, once read from the interactive element 140 and/or the transfer instrument 130 may be stored at a network location that a resource indicator encoded in the interactive element 140 points to, or that the transfer instrument 130 otherwise suggests (e.g., a network location associated with a financial institution whose logo appears on the transaction instrument). This information, once read from the interactive element 140 and/or the transfer instrument 130, can be automatically input into the transfer instrument depositing resource 168, which a resource indicator encoded in the interactive element 140 can point to, or which can be otherwise suggested via the transfer instrument 130 (e.g., a transfer instrument depositing resource 168 associated with a financial institution whose logo appears on the transaction instrument).

The user interface 335 includes a menu allowing the payee user 160 to select or confirm one or more of their user accounts to deposit asset(s) into when processing the transfer for the transfer instrument 130. The user interface 340 is automatically filled in with information identifying multiple of the payee user 160's accounts, which include a savings account, a checking account, a trading account (e.g., for stock market trading), and a crypto wallet (e.g., for cryptocurrencies and/or NFTs). The information identifying multiple of the payee user 160's accounts may be stored at a network location that a resource indicator encoded in the interactive element 140 points to, may be based on the payee user 160 having logged into the transfer instrument depositing resource 168 and/or previously provided this information via the transfer instrument depositing resource 168, and/or may be based on the payee user 160 having logged into the transaction processing service 175 and/or previously provided this information via the transaction processing service 175. The payee user 160 has selected his/her savings account (e.g., payee currency account(s) 170), trading account (e.g., payee security asset account(s) 172), and crypto wallet (e.g., payee cryptocurrency account(s) 174) in the illustrated example of the user interface 335. In some examples, the selected account(s) can be selected intelligently and/or dynamically, and without input from the payee user 160, based at least in part on context data, as described above. Additional details are provided below.

In examples where the payee user 160 is not associated with an existing user account, the payment service system can initiate an onboarding process to create a new account for the payee user 160. The onboarding process can facilitate account linking and configuration.

The user interface 340 includes a menu allowing the payee user 160 to select one or more of asset types to deposit asset(s) as when processing the transfer for the transfer instrument 130. The user interface 340 is automatically filled in with information identifying different asset type(s) that the payee user 160 holds in one or more of their accounts, and/or that the asset converter(s) 182 are able to convert the asset(s) associated with the transfer instrument 130 into. The asset types here include U.S. Dollars ($), Euros (€), shares of Block, Inc. (SQ), and Bitcoin (₿). The information identifying the different asset type(s) that the payee user 160 holds in one or more of their accounts, and/or that the asset converter(s) 182 are able to convert the asset(s) of the payee user 160 into, may be stored at a network location that a resource indicator encoded in the interactive element 140 points to, may be based on the payee user 160 having logged into the transfer instrument depositing resource 168 and/or previously provided this information via the transfer instrument depositing resource 168, may be based on the payee user 160 having logged into the transaction processing service 175 and/or previously provided this information via the transaction processing service 175, and/or may be based on the capabilities of the asset converter(s) 182. The payee user 160 has selected Euros (€), shares of Block, Inc. (SQ), and Bitcoin (₿) in the illustrated example of the user interface 345. In some examples, the selected asset type(s) can be selected intelligently and/or dynamically, and without input from the payee user 160, based at least in part on context data, as described above. Additional details are provided below.

The user interface 345 includes a menu allowing the payee user 160 to select an allocation of which user accounts to deposit asset(s) into when processing the transfer for the transfer instrument 130, and/or an allocation of asset types to deposit asset(s) as when processing the transfer for the transfer instrument 130. The two allocations are illustrated as two pie charts. The left pie chart indicates an allocation of the accounts to deposit the assets associated with the transfer instrument 130 into, with the most going into the trading account (T), then the crypto wallet (C), then the savings account(S). The right pie chart indicates an allocation of the asset types to deposit the assets associated with the transfer instrument 130 as, with the most being deposited as shares of Block, Inc. (SQ), then as Bitcoin (₿), then as Euros (€). In some examples, the allocations can be determined based at least in part on allocations of other users. For example, if the payee user 160 is a member of a family or friend group (e.g., a child), the payee user 160 can automatically select an allocation that mirrors, or is otherwise substantially similar to, an allocation of another member of a family or friend group (e.g., a parent of the child). In some examples, the payee user 160 can select an allocation that mirrors, or is substantially similar to, a celebrity, influencer, community member (e.g., another user within a same group or community), social media friend, a user that the transaction processing service 175 determines to be similar to the payee user 160 (e.g., based on transfer instruments 130 sent and/or received and/or other transaction information), or another user. In some examples, the allocations can be automatically determined using trained ML model(s) 190 as discussed with respect to FIG. 1.

The user interface 350 includes a signature input interface through which the payee user 160 is able to provide a signature input of their signature, for instance using a mouse, touchscreen, trackpad, or other interface of the payee user device 165. In some examples, the transfer instrument depositing resource 168 can automatically fill in the signature based on authorization from the payee user 160 to do so, using a previously-drawn instance of the signature. The user interface 355 provides a "clear" button allowing the payee user 160 to clear the signature input and a "done" button allowing the payee user 160 to use the signature input (the signature) to authorize depositing of the transfer instrument 130, and in some examples to be a part of the transfer instrument 130 (e.g., in a space on the back of the transfer instrument 130 reserved for the payee user 160's signature). In some examples, a digital signature input interface may be used, which may insert a digital signature that is encrypted via a private key, and that can be decrypted and compared to a reference instance of the signature (e.g., via comparison of hashes of the decrypted instance of the signature to the reference instance of the signature). This can also increase security, providing an additional factor of authentication for the resulting transfer instrument. In some examples, the signature (and thus user interface 350) is not necessary because the inclusion of the encrypted security verification dataset 410 in the interactive element 140 allows for secure authentication via the security verification authenticator 430 of FIG. 4, allowing the process for depositing the transfer instrument 130 to be made faster and more efficient while remaining secure.

The user interface 355 confirms for the payee user 160 that the transfer instrument 130 has been deposited according to the selections and/or allocations identified in the user interface 335, the user interface 340, and/or the user interface 345. In some examples, the funds deposited from the transfer instrument can be made available instantly to the payee user 160, so that the payee user 160 can instantly use the funds for other transfer instrument(s), transfer(s), and/or transaction(s). In some examples, such "instant" availability is due to the use of internal ledgers managed or otherwise accessible by the transaction processing service. This can make transfers more efficient and rapid than traditional check depositing technologies and techniques.

In some examples, interaction between the payee user device 165 and the interactive element 140 can automatically cause the payee user device 165 and/or the transaction processing service 175 to make the types of selections illustrated with respect to the user interfaces 330-355 and/or otherwise described with respect to FIG. 3, without showing one or more of the user interfaces 330-355 to the payee user 160 (e.g., via the payee user device 165 and/or the depositing resource 168) and/or without receiving further input from the payor user 110 (e.g., via the user interfaces 330-355 or otherwise). For instance, the payee user device 165 and/or the transaction processing service 175 can automatically make these selections without input from the payee user 160 by inputting context information into one or more trained ML model(s) as discussed herein. The input context information can include, for examples, information read and/or decoded from the interactive element 140, information read and/or decoded from the bill transfer instrument 135 (e.g., using optical character recognition (OCR)), information about the payor user 110, information about the payee user device 165, information stored on the payee user device 165, information about asset account(s) of the payee user 160, information about asset(s) of the payee user 160, information about prior transfer(s) to or from the payee user 160, information about prior transfer instruments to or from the payee user 160, or a combination thereof.

Figure 4:
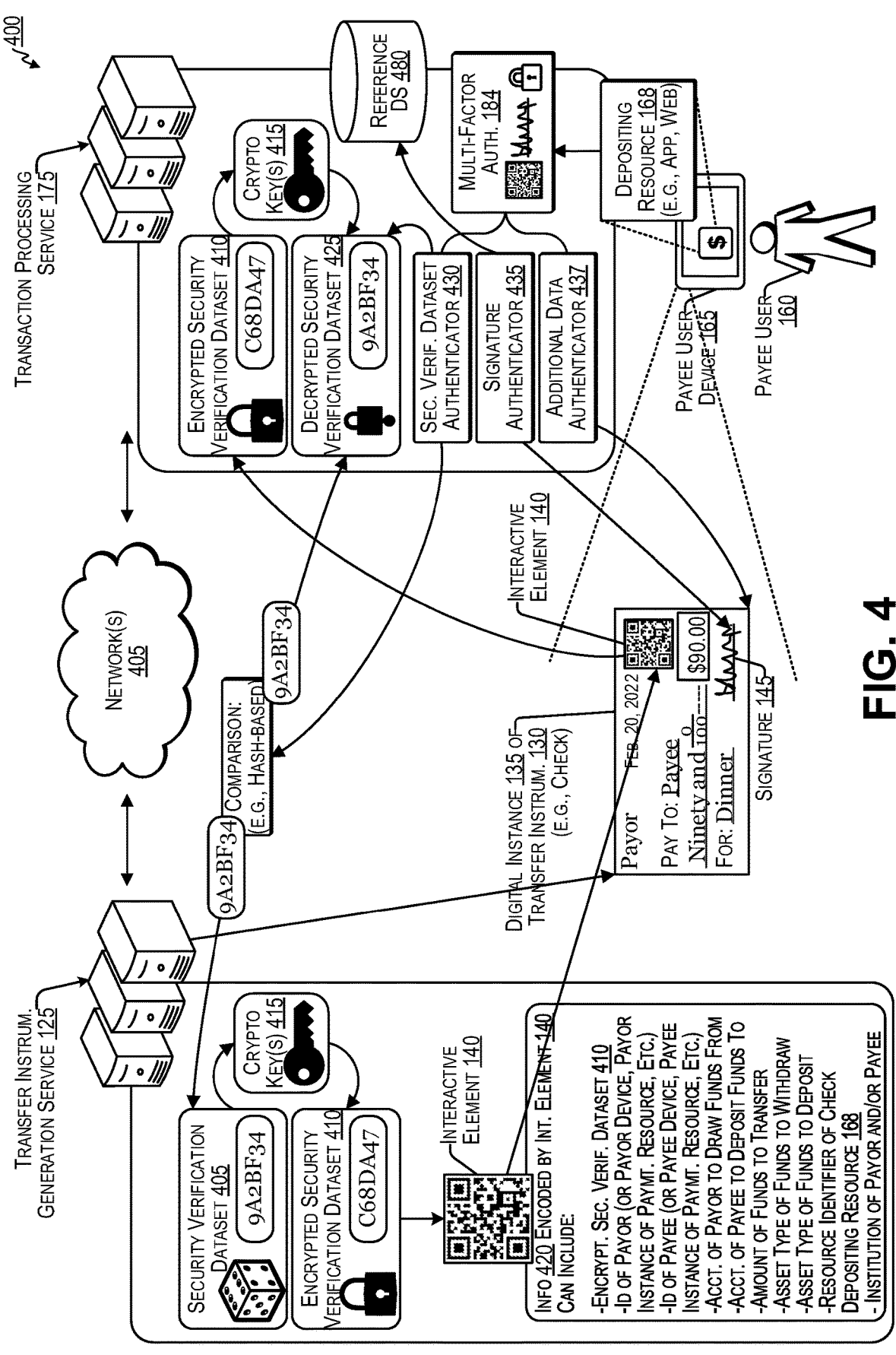
FIG. 4 is a block diagram illustrating aspects of a multi-factor authentication of a transfer instrument using the interactive element and a multi-factor authenticator, in accordance with some examples.

FIG. 4 is a block diagram 400 illustrating aspects of a multi-factor authentication of a transfer instrument 130 using the interactive element 140 and a multi-factor authenticator 184. The multi-factor authenticator 184 can include, for instance, a security verification dataset authenticator 430, a signature authenticator 435, and/or an additional data authenticator 437.

The server(s) of the transfer instrument generation service 125 generate a security verification dataset 405. The server(s) of the transfer instrument generation service 125 can generate the security verification dataset 405 to be unique to the transfer instrument 130, to the payor user 110, to the payee user 160, to one or more institutions (e.g., banks or other financial institutions), to one or more payment services, a combination thereof. An exemplary security verification dataset 405 illustrated in FIG. 4 includes the alphanumeric code "9A2BF34." In some examples, the security verification dataset 405 can include random numbers, characters, and/or strings. In some examples, the security verification dataset 405 can be based on information relevant to the transfer associated with the transfer instrument 130, for instance based on a hash of such information generated using a secure hash algorithm or other hash function. The information can be part of the transfer instrument 130 or associated with the transfer instrument 130, such as the payor user 110, the payee user 160, any other information discussed herein as being part of the transfer instrument 130, any other information discussed herein as being associated with the transfer instrument, any other information discussed herein as being encoded in the interactive element 140, and/or any other information discussed herein as being part of the transfer instrument generation request 120.

The server(s) of the transfer instrument generation service 125 can store one or more cryptographic keys 415. The cryptographic key(s) 415 can be symmetric or asymmetric (e.g., public key and private key, encryption key and decryption key, etc.). The server(s) of the transfer instrument generation service 125 can generate the cryptographic key(s) 415. The server(s) of the transfer instrument generation service 125 can generate the cryptographic key(s) 415 security verification dataset 405 to be unique to the transfer instrument 130, to the payor user 110, to the payee user 160, to one or more institutions (e.g., banks or other financial institutions), to one or more payment services, a combination thereof. The server(s) of the transfer instrument generation service 125 can generate an encrypted security verification dataset 410 by encrypting the security verification dataset 405 using at least one of the cryptographic key(s) 415 (e.g., the private key and/or the encryption key). An exemplary encrypted security verification dataset 410 illustrated in FIG. 4 includes the alphanumeric code "C68DA47," which is distinct from the alphanumeric code ("9A2BF34") of the exemplary security verification dataset 405.

In some examples, the payor user device 115 generates and/or stores the cryptographic key(s) 415 instead of or in addition to the server(s) of the transfer instrument generation service 125, and the payor user device 115 can generate the encrypted security verification dataset 410 by encrypting the security verification dataset 405 using at least one of the cryptographic key(s) 415, and can send the encrypted security verification dataset 410 to the server(s) of the transfer instrument generation service 125. In some examples, the server(s) of the transaction processing service 175 generate and/or store the cryptographic key(s) 415 instead of or in addition to the server(s) of the transfer instrument generation service 125, and the server(s) of the transaction processing service 175 can generate the encrypted security verification dataset 410 by encrypting the security verification dataset 405 using at least one of the cryptographic key(s) 415, and can send the encrypted security verification dataset 410 to the server(s) of the transfer instrument generation service 125.

The server(s) of the transfer instrument generation service 125 generate the interactive element 140 to encode information 420. The information 420 can include the encrypted security verification dataset 410, among other information (e.g., the resource identifier for the transfer instrument depositing resource 168). In some examples, the information 420 can include, for instance, information identifying the payor user 110, the payor user device 115, the payor instance of the payment resource 118, one or more amounts of one or more assets to withdraw from the using the transfer instrument 130, one or more user accounts to withdraw from the using the transfer instrument 130, one or more asset types that the payor user 110 wishes to withdraw the one or more assets as using the transfer instrument 130, one or more institutions (e.g., banks or other financial institutions) associated with the payor user 110, the payee user 160, the payee user device 165, the payee instance of the payment resource 118, the payee instance of the transfer instrument depositing resource 168, a resource identifier for the payee instance of the payment resource 118, a resource identifier for the payee instance of the transfer instrument depositing resource 168, one or more amounts of one or more assets to deposit the using the transfer instrument 130, one or more user accounts to deposit into the using the transfer instrument 130, one or more asset types to deposit the one or more assets as using the transfer instrument 130, one or more institutions (e.g., banks or other financial institutions) associated with the payee user 160, a signature input (e.g., signature 145), any information input using any of the user interfaces 230-255 of FIG. 2, any information input using any of the user interfaces 330-355 of FIG. 3, the encrypted security verification dataset 410, one of the cryptographic key(s) 415 (e.g., a public key and/or a decryption key), any other information described herein as included in the transfer instrument 130, any other information described herein as encoded in the interactive element 140, any other information described herein as part of the transfer instrument generation request 120, or any combination thereof.

As discussed with respect to FIG. 1, the server(s) of the transfer instrument generation service 125 and/or the server(s) of the transaction processing service 175 receive an indication of the interaction between the payee user device 165 and the interactive element 140 of the transfer instrument 130. For instance, the interaction between the payee user device 165 and the interactive element 140 includes the payee user device 165 interacting with the interactive element 140 (e.g., using a camera or other optical scanner sensor to scan a glyph) to decode the information 420 that is encoded in the interactive element 140. Through the interaction between the payee user device 165 and the interactive element 140, the payee user device 165 can receive the encrypted security verification dataset 410 and/or convey the encrypted security verification dataset 410 to the transaction processing service 175.

In some examples, the indication includes an encrypted security verification dataset 410 that is encoded in the interactive element 140. The security verification dataset authenticator 430 (which may be part of the server(s) of the transaction processing service 175 and/or the server(s) of the transfer instrument generation service 125) authenticates the transfer instrument 130 by decrypting the encrypted security verification dataset 410 using at least one of the cryptographic key(s) 415 (e.g., a public key and/or a decryption key) to generate a decrypted security verification dataset 425, and comparing the decrypted security verification dataset 425 to a previously-stored reference instance of the security verification dataset 405. An exemplary decrypted security verification dataset 425 illustrated in FIG. 4 includes the alphanumeric code "9A2BF34," which matches the alphanumeric code ("9A2BF34") of the exemplary security verification dataset 405 and is distinct from the alphanumeric code ("C68DA47") of the exemplary encrypted security verification dataset 410. In some examples, the server(s) of the transaction processing service 175 and/or the transfer instrument generation service 125 can use a hash algorithm to generate a hash (or hash digest) of the decrypted security verification dataset 425 and/or to generate a hash (or hash digest) of a previously-stored reference instance of the security verification dataset 405. A match between the decrypted security verification dataset 425 (or a hash thereof) and a previously-stored reference instance of the security verification dataset 405 (or a hash thereof) indicates to the security verification dataset authenticator 430 that the transfer instrument 130 is authentic, and can permit the transfer instrument 130 to be deposited. A disparity or mismatch between the decrypted security verification dataset 425 (or a hash thereof) and the previously-stored reference instance of the security verification dataset 405 (or a hash thereof) indicates to the security verification dataset authenticator 430 that the transfer instrument 130 is not authentic, can prohibit the transfer instrument 130 from being deposited, and/or can void the transfer instrument 130.

In some examples, the security verification dataset authenticator 430 (which may be part of the server(s) of the transaction processing service 175 and/or the server(s) of the transfer instrument generation service 125) may lack access to at least one of the cryptographic key(s) 415, and may send the encrypted security verification dataset 410 to a specific device (e.g., the server(s) of the transaction processing service 175, the server(s) of the transfer instrument generation service 125, the payor user device 115, the payee user device 165) that does have access to the cryptographic key(s) 415 so that device can decrypt the encrypted security verification dataset 410 to generate the decrypted security verification dataset 425.

In some examples, the indication includes an instance of the signature 145 that is encoded in the interactive element 140 and/or that is part of the transfer instrument 130. The signature authenticator 435 (which may be part of the server(s) of the transaction processing service 175 and/or the server(s) of the transfer instrument generation service 125) authenticates the transfer instrument 130 by comparing the signature 145 of the payor user 110 on the transfer instrument 130 to a previously-stored reference instance of the signature of the payor user 110 that is stored in a reference data structure 480. In some examples, the signature authenticator 435 authenticates the transfer instrument 130 by comparing at east one or more aspects (e.g., letters, shapes, curvatures) of a signature of the payee user 160 (or a hash thereof) on the transfer instrument 130 to at least one or more corresponding aspects of a previously-stored reference instance of the signature of the payee user 160 (or a hash thereof) that is stored in a reference data structure 480. If either or both these signatures pairs match, the signature authenticator 435 indicates that the transfer instrument 130 is authentic, and can permit the transfer instrument 130 to be deposited. If either or both these signatures pairs do not match or otherwise correspond (e.g., they include a disparity), the signature authenticator 435 indicates that the transfer instrument 130 is not authentic, can prohibit the transfer instrument 130 from being deposited, and/or can void the transfer instrument 130. In some examples, the signature authenticator 435 can check whether signature(s) of the payor user 110 and/or payor user 160 are included on or applied to the transfer instrument 130, in addition to or instead of checking whether the signature(s) are valid as described above. In some examples, the signature authenticator 435 can ensure that the transfer instrument is signed or otherwise properly endorsed prior to the transaction processing service 175 accepting a request for a mobile deposit from the payee device 165 and/or payor user 160 using the transfer instrument.

In some examples, the indication includes additional data that is encoded in the interactive element 140 and/or that is part of the transfer instrument 130. The additional data authenticator 437 (which may be part of the server(s) of the transaction processing service 175 and/or the server(s) of the transfer instrument generation service 125) authenticates the transfer instrument 130 by comparing the additional data that is encoded in the interactive element 140 and/or that is part of the transfer instrument 130 (e.g., as read from the transfer instrument 130 itself using OCR) to a previously-stored reference instance of the additional data that is stored in a reference data structure 480, to information about the payee user device 165 that interacts with the interactive element 140, to information about the payee user 160, to information about the payor user device 115 that requested the transfer instrument 130 be generated, to information about the payor user 110, or a combination thereof. If the compared additional data matches, the additional data authenticator 437 indicates that the transfer instrument 130 is authentic, and can permit the transfer instrument 130 to be deposited. If compared additional data does not match (e.g., includes a disparity), the additional data authenticator 437 indicates that the transfer instrument 130 is not authentic, can prohibit the transfer instrument 130 from being deposited, and/or can void the transfer instrument 130.

For instance, the additional data can include the information identifying the payee (e.g., in a "pay to:" field of the transfer instrument 130), which the additional data authenticator 437 can read from the information 420 encoded in the interactive element 140 and/or from the transfer instrument 130 (e.g., using OCR). The additional data authenticator 437 can compare this additional data that identifies the payee (or a hash thereof) to information identifying the payee user 160 (e.g., on the payee user device 165 and/or through the depositing resource 168) (or a hash thereof) to verify that the transfer instrument 130 is being deposited to the correct payee user 160. In this way, the additional data authenticator 437 can ensure that the payee indicated by the transaction instrument 130 matches a user who is attempting to deposit the transaction instrument 130.

The multi-factor authentication 184 described above includes the security verification dataset authentication performed using the security verification dataset authenticator 430, the signature authentication performed using the signature authenticator 435, the additional data authentication performed using the additional data authenticator 437, or a combination thereof. The multi-factor authentication 184 described above provides increased security through increase authentication of the transaction instrument 130, for instance ensuring that the transaction instrument 130 itself is valid, that payee indicated by the transaction instrument 130 matches a user who is attempting to deposit the transaction instrument 130, that an amount of funds indicated by the transaction instrument 130 matches an amount of funds that a user who is attempting to deposit the transaction instrument 130 is attempting to transfer, or a combination thereof.

Figure 5:
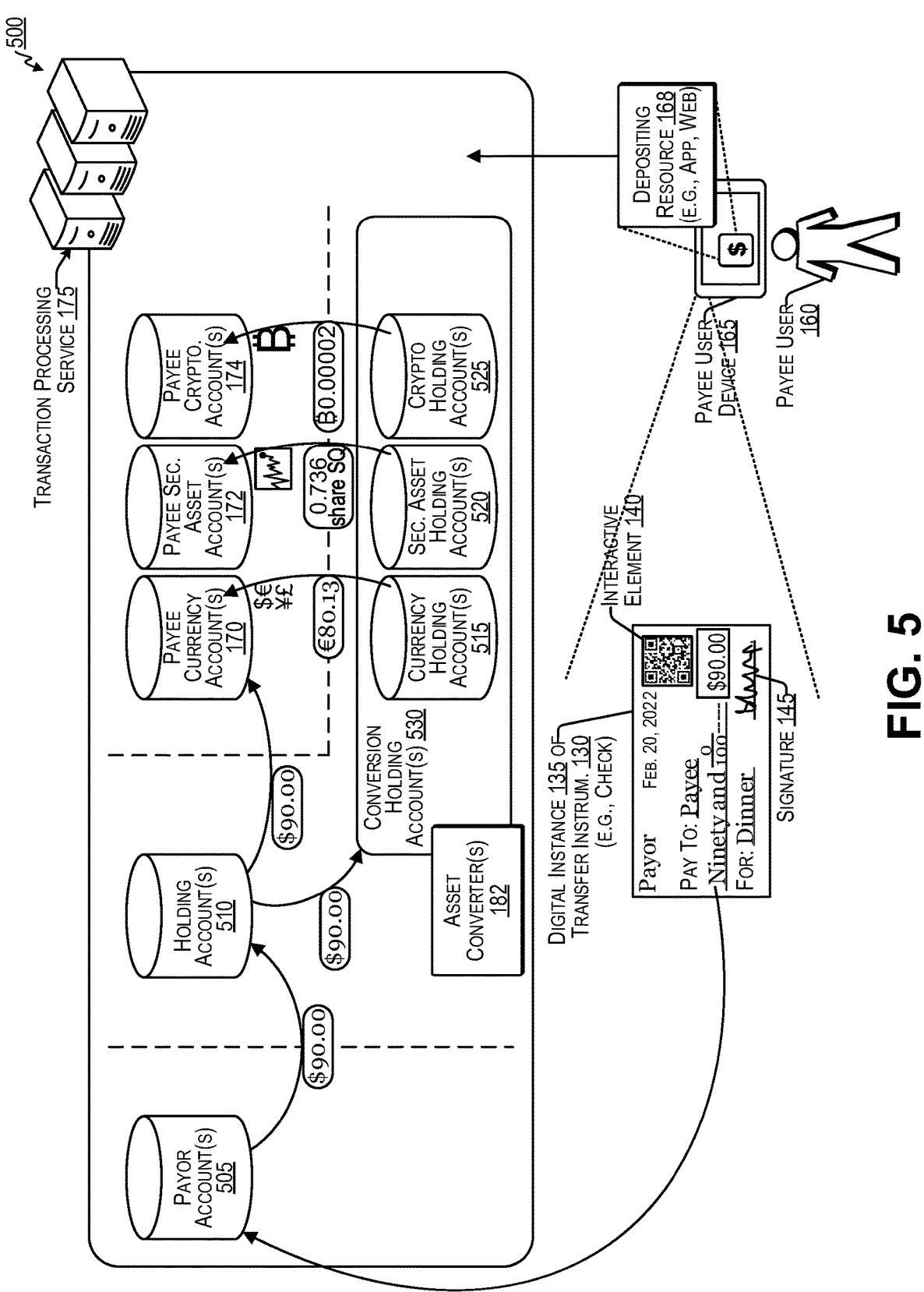
FIG. 5 is a block diagram illustrating depositing of funds associated with the transfer instrument as one or more assets of one or more asset types in one or more asset accounts associated with the payee user, in accordance with some examples.

FIG. 5 is a block diagram 500 illustrating depositing of funds associated with the transfer instrument as one or more assets of one or more asset types in one or more asset accounts associated with the payee user 160. The payee user device 165 is illustrated interacting with the interactive element 140 of the digital instance 135 of the transfer instrument 130, causing the payee user device 165 to access the transfer instrument depositing resource 168. The payee user device 165 accesses the transaction processing service 175 through the transfer instrument depositing resource 168. To deposit the transfer instrument 130, the transaction processing service 175 withdraws asset(s) from one or more payor accounts 505 associated with the payor user 110. The payor account(s) 505 may be any type of account described herein, with any type of institution described herein, storing asset(s) of any asset type(s) described herein. As an illustrative example, the asset(s) are illustrated in FIG. 5 as being 90 U.S. Dollars ($90) as indicated on the transfer instrument 130.

The transaction processing service 175 transfers asset(s) (e.g., the $90) from the payor account(s) 505 to one or more holding accounts 510 associated with the transaction processing service 175. The transaction processing service 175 can hold the asset(s) (e.g., the $90) in the holding account(s) 510 until the transaction processing service 175 determines an allocation of payee account(s) to deposit the asset(s) into, and/or an allocation of asset type(s) to deposit the asset(s) as. Such allocation(s) can be determined based on selection(s) by the payee user 160, for instance as in user interfaces 335-345 of FIG. 3. Such allocation(s) can be determined automatically by the payee user device 165 and/or the transaction processing service 175, for instance using the trained ML model(s) 190 as discussed with respect to FIG. 1. Once such allocation(s) are determined, the transaction processing service 175 can deposit the transfer instrument 130 in accordance with these allocation(s). For instance, if the asset(s) are to be deposited in U.S. Dollars into the payee currency account(s) 170, the transaction processing service 175 can transfer to asset(s) (e.g., the $90) to the payee currency account(s) 170 as-is, without any conversions and/or without use of the conversion holding account(s) 530 of the asset converter(s) 182. In this way, the one or more transfer amounts that deposited to the account(s) associated with the payee user 160 can match on the amount of the at least one asset type indicated by the transfer instrument 130.

In some examples, the one or more transfer amounts to be deposited to the account(s) associated with the payee user 160 are different from, but are based on, the amount of the at least one asset type indicated by the transfer instrument 130. For instance, if the allocation(s) indicate that the asset(s) are to be deposited as other asset type(s) than the original asset type(s) indicated on the transfer instrument 130 (here as any other asset type(s) than U.S. Dollars), the asset converter(s) 182 can deposit one or more transfer amount to the account(s) associated with the payee user 160 that may be equivalent to the amount of the at least one asset type indicated by the transfer instrument 130 if the amount of the at least one asset type is converted into one or more different asset types, and in some examples if one or more fees (e.g., conversion fees, taxes, tariffs, etc.) are deducted. These transfer amounts can be withdrawn from the conversion holding account(s) 530, which may already hold instances of the asset type(s) desired to be transferred, to the account(s) associated with the payee user 160 in amounts based on the amount indicated on the transfer instrument 130. For instance, the conversion holding account(s) 530 include currency holding account(s) 515, which can store various fiat currencies and/or cryptocurrencies, and which can in an illustrative example transfer the $90 indicated on the transfer instrument 130 as €80.13. The conversion holding account(s) 530 include security asset holding account(s) 520, which can store various security assets, and which can in an illustrative example transfer the $90 indicated on the transfer instrument 130 as 0.736 shares of Block, Inc. (SQ). The conversion holding account(s) 530 include crypto asset holding account(s) 525, which can store various cryptocurrencies and/or NFTs, and which can in an illustrative example transfer the $90 indicated on the transfer instrument 130 as 0.00002 Bitcoin (₿). In some examples, the transaction processing service 175 transfers funds from the holding account(s) 510 to the conversion holding account(s) 530 to reimburse the conversion holding account(s) 530. In some examples, the transaction processing service 175 keeps the funds in the holding account(s) 510 and the conversion holding account(s) 530 separate, but keeps track of corresponding transfers using one or more internal ledgers and/or one or more data structures. Additional details associated with the ledgers and/or data structures are described below.

While the paragraphs above describe assets being withdrawn and deposited into the holding account(s) at the time of transfer instrument generation, in some examples, the assets, or a portion thereof, can remain in the payor account(s) 505 until the transfer instrument is deposited. In some examples, the transaction processing service 175 can perform a risk analysis to determine when and/or an amount of assets that are to be transferred to holding account(s). In some examples, higher risk payors (e.g., payors with a risk metric output via the risk analysis that satisfies a threshold) may have assets withdrawn at the time of transfer instrument generation, whereas lower risk payors (e.g., payors with a risk metric output via the risk analysis that does not satisfy the threshold) may have assets withdrawn at a later time (e.g., upon transfer instrument deposit, when exchange rates are favorable or more favorable, etc.). In some examples, the transaction processing service 175 performs the risk analysis prior to accepting request for a mobile deposit from the payee device 165 and/or payor user 160 using the transfer instrument. Furthermore, in some examples, funds associated with the transfer instrument can be held in the payor account(s) 505 until it is determined which resource(s) are to be used for facilitating the transfer. For example, if the Lightning Network is to be used to facilitate the transfer, the funds can remain in a wallet or other payor account until the time of the transfer (e.g., as initiated by an interaction with the interactive element associated with the transfer instrument).

As illustrated in FIGS. 2-4, a payor user 110 can generate a transfer instrument associated with a first asset or asset type and the payee user 160 can deposit the transfer instrument 130 wherein the deposit is associated with the first asset or asset type or a second, different asset or asset type. In some examples, the assets or asset types can be selected by the payor user 110 or the payee user 160. In some examples, the assets or asset types can be determined by the transfer instrument generation service 125 or the transaction processing service 175 intelligently and/or dynamically, as described above. That is, techniques described herein enable a transfer instrument such as a check to be represent different assets and/or asset types based on a payee user 110, payor user 160, transfer instrument depositing resource 168, or other context data.

Figure 6:
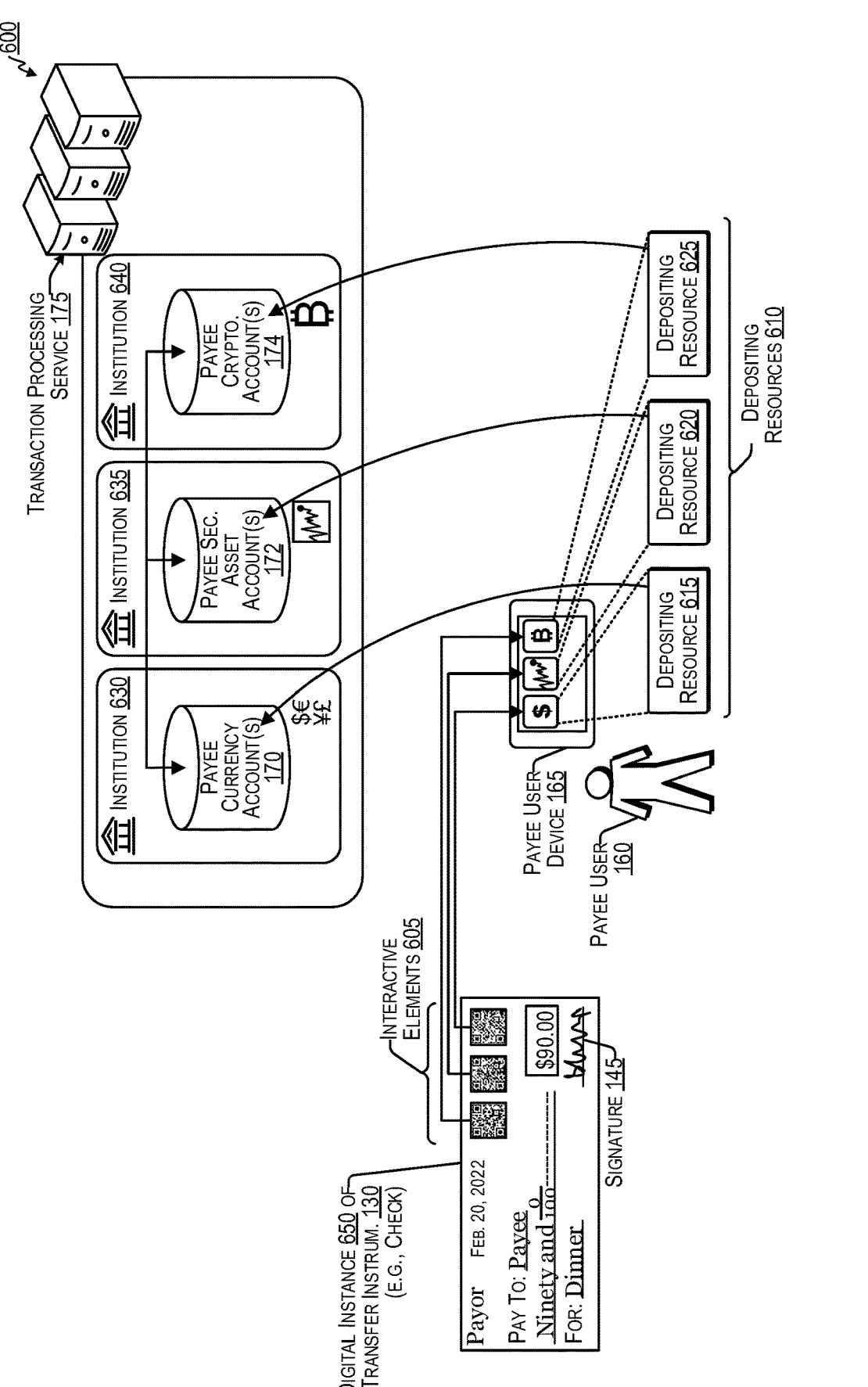
FIG. 6 is a block diagram illustrating a transfer instrument with multiple interactive elements that each encode resource indicators for at least one of different depositing resources associated with different institutions or different asset accounts associated with the payee user, in accordance with some examples.

FIG. 6 is a block diagram illustrating a transfer instrument 130 with multiple interactive elements 605 that each encode resource indicators for different transfer instrument depositing resources 610 associated with different institutions (e.g., institution 630, institution 635, and institution 640)

and different asset accounts (e.g., payee currency account(s) 170, payee security asset account(s) 172, and payee cryptocurrency account(s) 174) associated with the payee user 160. A digital instance 650 of the transfer instrument 130 is illustrated with three interactive elements 605, each illustrated as separate QR codes. The payee user device 165 can separately choose to interact with one of the interactive elements 605 without interacting with the other ones of the interactive elements 605. Examples of the different institutions (e.g., institution 630, institution 635, and institution 640) include banks, credit unions, merchants (for store credit), stockbrokers, stock exchanges, stock trading platforms, cryptocurrency exchange platforms, cryptocurrency transfer platforms, currency exchange platforms, retirement account institutions, payment processors, financial institutions, lending institutions, credit institutions, securities institutions, or combinations thereof. In some examples, such institutions can be centralized, decentralized, or the like.

The payee user device 165 interacting with a first interactive element of the interactive elements 605 causes the payee user device 165 to receive a resource locator for a first transfer instrument depositing resource 615, and therefore causes the payee user device 165 to access (e.g., to download from an application repository, install, launch, run, start, execute, transition from running as a background process to running as a foreground process, and/or otherwise access) the first transfer instrument depositing resource 615. The payee user device 165 interacting with a second interactive element of the interactive elements 605 causes the payee user device 165 to receive a resource locator for a second transfer instrument depositing resource 620, and therefore causes the payee user device 165 to access the second transfer instrument depositing resource 620. The payee user device 165 interacting with a third interactive element of the interactive elements 605 causes the payee user device 165 to receive a resource locator for a third transfer instrument depositing resource 625, and therefore causes the payee user device 165 to access the third transfer instrument depositing resource 625. In some examples, the asset(s) can be moved, and/or can be set up to automatically move, between different institution(s) and/or accounts after the deposit(s) via the depositing resource(s).

In some examples, the first interactive element of the interactive elements 605, the second interactive element of the interactive elements 605, and the third interactive element of the interactive elements 605 can each be associated with different institutions (e.g., institution 630, institution 635, and institution 640), different payment services, different accounts to deposit the transfer instrument 130 into (e.g., payee currency account(s) 170, payee security asset account(s) 172, and payee cryptocurrency account(s) 174), different asset types to deposit the transfer instrument 130 as, or a combination thereof. In some examples, the first transfer instrument depositing resource 615, the second transfer instrument depositing resource 620, and the third transfer instrument depositing resource 625 can each be associated with different institutions (e.g., institution 630, institution 635, and institution 640), different payment services, different accounts to deposit the transfer instrument 130 into (e.g., payee currency account(s) 170, payee security asset account(s) 172, and payee cryptocurrency account(s) 174), different asset types to deposit the transfer instrument 130 as, or a combination thereof.

In an illustrative example, the payee user device 165 can interact with the first interactive element of the interactive elements 605 to cause the payee user device 165 to access the first transfer instrument depositing resource 615 associated with the institution 630, contextually determine which institution(s) or currencies are invoked via the transfer instrument depositing resource 615, and automatically deposit the transfer instrument 130 as one or more currencies into the payee currency account(s) 170 associated with the institution(s) 630. In a second illustrative example, the payee user device 165 can interact with the second interactive element of the interactive elements 605 to cause the payee user device 165 to access the second transfer instrument depositing resource 620 associated with the institution 635 and automatically deposit the transfer instrument 130 as one or more security assets into the payee security asset account(s) 172 associated with the institution 635. In a third illustrative example, the payee user device 165 can interact with the third interactive element of the interactive elements 605 to cause the payee user device 165 to access the third transfer instrument depositing resource 625 associated with the institution 640 and automatically deposit the transfer instrument 130 as one or more cryptocurrencies and/or NFT(s) into the payee cryptocurrency account(s) 174 associated with the institution 640. In some examples, once assets are deposited into one or more accounts of the payee user 160, the payee user 160 can utilize a payment application or the like to move assets between accounts at the same or different payment service.

In some examples, a single interactive element can encode data that can avail different transfer instrument depositing resources 610. In some examples, context data can be used to determine which transfer instrument depositing resource to initialize and/or an allocation of assets for deposit.

While FIGS. 1-6 have illustrated examples of an interactive element that can initiate a deposit of funds in one or more asset types, into one or more accounts of a user, using one or more institutions, and so on, in some examples, interactive elements can be encoded with data that can determine which asset types, accounts, institutions or the like to use for withdrawing money from the payor. That is, in some examples, an interactive element can be encoded with data such that one or more "fallback" resources can be used to facilitate transfers. In some examples, techniques described herein can be used to determine which asset type, account, institution, or the like to use as a source of funds to facilitate transfers. In some examples, context data, as described above, can be used in making such determinations intelligently. In some examples, such determinations can be made at the time of the transfer instrument generation request.

In some examples, the transaction processing service 175 can monitor in real-time or near-real-time deposits into payee accounts. Such deposits can be using techniques described herein with respect to transfer instruments. In some examples, such deposits can be made via direct deposit, Automated Clearing House (ACH) deposits, or the like. In examples where an interactive element does not trigger the intelligent and dynamic currency, account, institution decisioning described herein, the transaction processing service 175 can analyze individual deposits (e.g., data associated therewith) to determine whether such deposits are associated with characteristics indicating how they should be deposited. In some examples, the transaction processing service 175 can utilize one or more ML models to analyzing data associated with incoming deposits to determine how associated funds should be deposited. In some examples, the transaction processing service 175 can apply stored rules to such deposits. In some examples, the transaction processing service 175 can utilize context data, as described above. In some examples, received deposits can be deposited into one or more accounts. For example, a paycheck or tax refund can be allocated into one or more accounts of the payee. That is, in some examples, a portion of a deposit, such as a paycheck or tax refund, can be converted into different currency types for deposit into different accounts. For instance, a payee can receive a paycheck or tax refund which can be converted, at least in part, into cryptocurrency, security assets, or the like.

Figure 7:
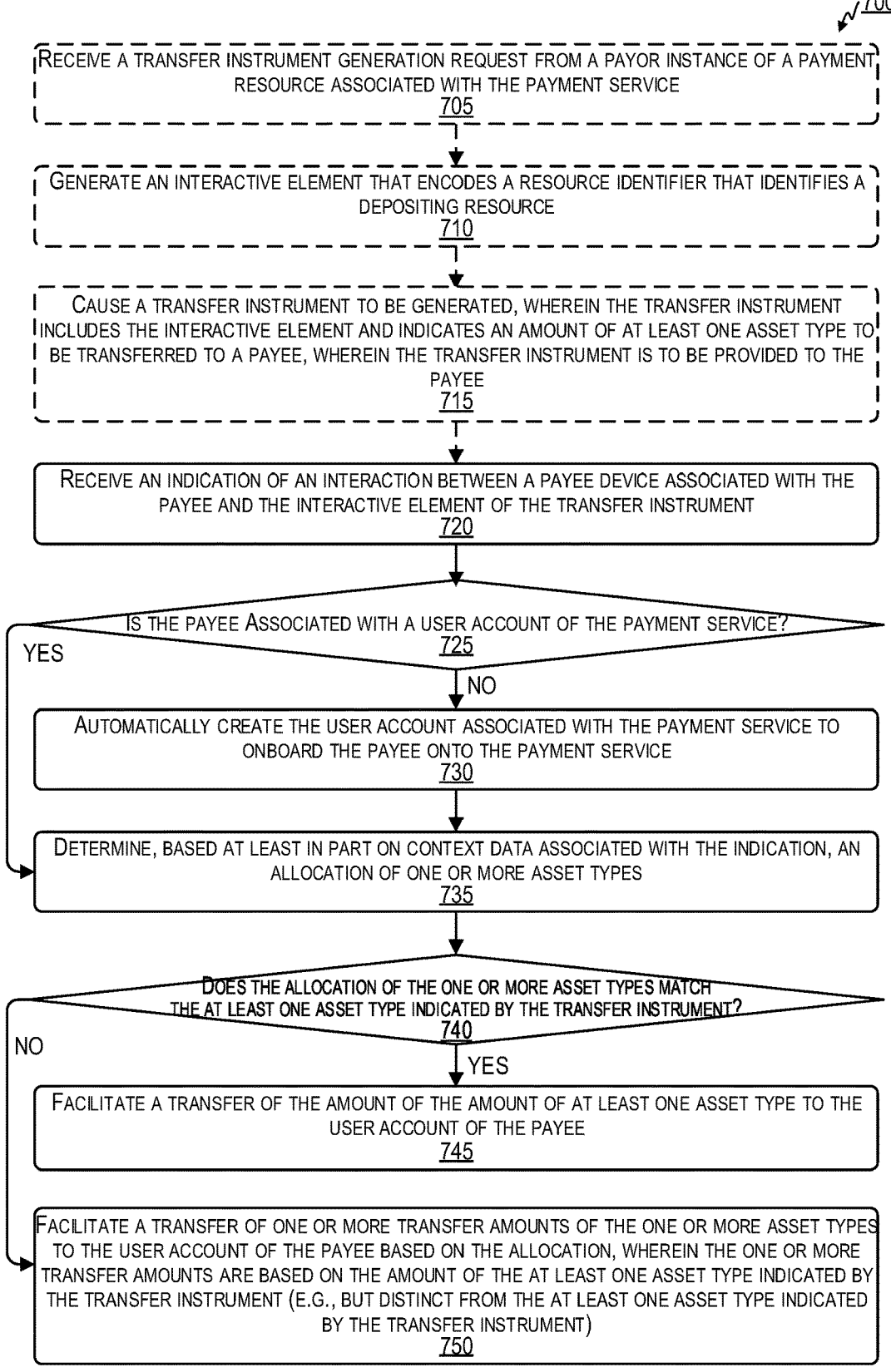
FIG. 7 is a flow diagram illustrating a process for transfer instrument generation and asset transfer, in accordance with some examples.

FIG. 7 is a flow diagram illustrating a process 700 for transfer instrument generation and asset transfer, according to an embodiment of the present subject matter. In one example, the process 700 is performed by a payment service system. The payment service system can include, for instance, the transfer instrument generation and processing system 100, the network(s) 105, the payor user device 115, the payment resource 118, the transfer instrument generation service 125, the printer 150, the payee user device 165, the transfer instrument depositing resource 168, the transaction processing service 175, the multi-factor authenticator 184, the security verification dataset authenticator 430, the signature authenticator 435, the additional data authenticator 437, the server(s) 802, the network(s) 804, the user devices 806, the merchant device(s) 808(A)-808(N), the server(s) 810, the POS application 818, the reader device 822, the POS system 824, the server(s) 902, the network(s) 904, the user devices 906, the user device(s) 908(A)-808(N), the server(s) 910, the payment application 918, the data store(s) 1000, the asset storage 1002, the user account(s) 1004, the private blockchain 1019, the application programming interfaces (APIs) 1104, the network(s) 1102, the user device 1202, the server(s) 1204, the reader device(s) 1226, the datastore 1244, a computing system, an apparatus, a processor executing instructions stored in a non-transitory computer-readable storage medium, one or more components or subsets of any of the previously-listed systems, or a combination thereof. The order in which the operations of the process 700 are described is not intended to be construed as a limitation, and any number of the described blocks can be combined in any order and/or in parallel to implement the processes. In some embodiments, one or more blocks of the process 700 can be omitted entirely. Moreover, the process 700 can be combined in whole or in part with other processes, methods, actions, and/or operations described herein.

At operation 705, the payment service system is configured to, and can, receive a transfer instrument generation request from a payor instance of a payment resource 118 associated with the payment service. Examples of the transfer instrument generation request include the transfer instrument generation request 120, a request that includes any of the information provided using any of the user interfaces 230-255 of FIG. 2, a request triggered by an interaction between a payor user device 115 and an interactive element 210 as in FIG. 2, a request triggered by a user interface within an instance of the payment resource 118 running on the payor user device 115, a request triggered by a recurring and/or periodic payment (e.g., bills, rent, mortgage, lease, loan repayment, stock purchase plan, retirement account funding, health savings account funding, etc.), or a combination thereof.

In some examples, the transfer instrument generation request is received by the payment service system in response to an interaction between a payor device and a second interactive element associated with at least one of a bill, an invoice, or a receipt. The interactive element 210 of FIG. 2 represents an example of the second interactive element. The bill 220 of FIG. 2 represents an example of the bill, invoice, or receipt.

In some examples, the payment resource 118 is a software application associated with a payment service (e.g., with the transfer instrument generation service 125 and/or the transaction processing service 175), as in the POS application 818, the payment application 918, the user interface 1220, or a combination thereof. The payor user device 115 may access (e.g., download from an application repository, install, launch, run, start, execute, transition from running as a background process to running as a foreground process, and/or otherwise access) the payor instance of the payment resource 118. In some examples, the payment resource 118 is a website or other online portal associated with a payment service (e.g., with the transfer instrument generation service 125 and/or the transaction processing service 175) and accessible to the payor user device 115 through a browser software application running on the payor user device 115, as in the user interface 1220. In some examples, the payment resource 118 is a payor instance of the transfer instrument depositing resource 168.

At operation 710, the payment service system is configured to, and can, generate an interactive element that encodes a resource identifier that identifies a transfer instrument depositing resource. Examples of the interactive element include the interactive element 140 and/or any of the interactive elements 605. Examples of the transfer instrument depositing resource include the transfer instrument depositing resource 168, the transfer instrument depositing resource 615, the transfer instrument depositing resource 620, and the transfer instrument depositing resource 625. In some examples, the interactive element can encode any of the types of information 420, any other information discussed herein as being encoded in an interactive element, any information discussed herein as being included in a transfer instrument, any information discussed herein as being context information, and/or any information discussed herein as being input information to trained ML model(s).

The interactive element can include a glyph that optically, or otherwise, encodes at least the resource identifier (and/or other information 420). The glyph can include at least one of a quick response (QR) code, a bar code, a data matrix, an Aztec code, Maxicode, a CodaBlock-F code, a Maxicode, a MicroPDF417 code, a PDF417 code, a Han Xin code, a DotCode, a snaptag, a color variant of any of the previously-listed glyph types (increasing storage capacity by using color as an additional dimension), or a combination thereof. The interactive element can include an NFC tag, a RFID tag, and/or a PAN beacon, and can encode at least the resource identifier (and/or other information 420) in memory for transmission by a transmitter of the NFC tag, RFID tag, and/or PAN beacon.

The resource identifier can direct the payee user device 165 to access the transfer instrument depositing resource 168, and may include, for example, a uniform resource identifier (URI), a uniform resource locator (URL), a hyperlink, and/or a different type of identifier associated with access to the transfer instrument depositing resource 168. In some examples, the transfer instrument depositing resource 168 is a software application associated with a payment service (e.g., with the transfer instrument generation service 125 and/or the transaction processing service 175), as in the POS application 818, the payment application 918, the user interface 1220, or a combination thereof. The payee user device 165 may access (e.g., download from an application repository, install, launch, run, start, execute, transition from running as a background process to running as a foreground process, and/or otherwise access) the transfer instrument depositing resource 168 in response to accessing the resource identifier by interacting with the interactive element 140. In some examples, the transfer instrument depositing resource 168 is a website or other online portal associated with a payment service (e.g., with the transfer instrument generation service 125 and/or the transaction processing service 175) and accessible to the payee user device 165 through a browser software application running on the payee user device 165, as in the user interface 1220. In some examples, the transfer instrument depositing resource 168 is a payee instance of the payment resource 118.

At operation 715, the payment service system is configured to, and can, cause a transfer instrument to be generated. The transfer instrument includes the interactive element and indicates an amount of at least one asset type to be transferred to a payee. The transfer instrument is to be provided to the payee. Examples of the transfer instrument include the transfer instrument 130, the digital instance 135 of the transfer instrument 130, the printed instance 155 of the transfer instrument 130, and/or the digital instance 650 of the transfer instrument 130. Examples of the at least one asset type includes fiat currencies, security assets (e.g., stocks, bonds, investments, debt, equity, warrants, futures, shorts), cryptocurrencies, non-fungible tokens (NFTs), or combinations thereof. In some examples, the transfer instrument can be generated to include various information written or otherwise indicated on the transfer instrument itself separately from the interactive element, such as text and/or graphics that identify and/or are indicative of any of the types of information 420, any other information discussed herein as being encoded in an interactive element, any information discussed herein as being included in a transfer instrument, any information discussed herein as being context information, and/or any information discussed herein as being input information to trained ML model(s). In some examples, the transfer instrument is at least one of a check, a promissory note, a bill of exchange, an invoice, a smart contract with payment terms, or a combination thereof.

In some examples, the payment service system is configured to, and can, extract information from the transfer instrument generation request that defines at least the payor, the payee, the amount of the at least one asset type to be transferred from the payor to the payee, or a combination thereof. In some examples, the payment service system is configured to, and can, cause the transfer instrument to be generated at operation 715 so that the transfer instrument includes the information extracted from the transfer instrument generation request. In some examples, the payment service system is configured to, and can, cause the interactive element to be generated at operation 710 so that the interactive element includes the information extracted from the transfer instrument generation request.

In some examples, to provide the transfer instrument to the payee, the payment service system is configured to, and can, cause a printing device (e.g., the printer 150) to print a printed instance of the transfer instrument (e.g., the printed instance 155 of the transfer instrument 130) at least in part by sending a printing request to the printing device. The printing device may be associated with the payor (e.g., collocated with the payor and/or the payor device), in which case the payment service system can provide the transfer instrument to the payee by allowing the payor to hand the printed instance of the transfer instrument to the payor. The printing device may be associated with the payee (e.g., collocated with the payee and/or the payee device), in which case the payment service system can provide the transfer instrument to the payee by printing the printed instance of the transfer instrument for the payor. The printing device may be associated with a mail service, in which case the payment service system can provide the transfer instrument to the payee by mailing the printed instance of the transfer instrument to the payor using the mailing service.

In some examples, to provide the transfer instrument to the payee, the payment service system is configured to, and can, cause a display device to display the transfer instrument (e.g., a digital instance 135 of the transfer instrument 130) at least in part by sending the transfer instrument to the display device. The display device can be at least one of the payor device (e.g., payor user device 115) associated with the payor, the payee device (e.g., payee user device 165) associated with the payee, a point of sale (POS) device (e.g., payee user device 165, POS system 824).

At operation 720, the payment service system is configured to, and can, receive an indication of an interaction between a payee device associated with the payee and the interactive element.

In some examples, the payment service system is configured to, and can, withdraw or transfer funds from a stored balance associated with the user account of the payor based on the amount of the at least one asset type indicated by the transfer instrument. The funds are transferred to an account associated with the payment service system. The one or more transfer amounts of the one or more asset types to the user account of the payee are transferred (e.g., at operations 745-750) from the funds in the account associated with the payment service. Examples of the account associated with the payment service system include the holding account(s) 510, the currency holding account(s) 515, the security asset holding account(s) 520, the crypto holding account(s) 525, the conversion holding account(s) 530, or a combination thereof.

At operation 725, the payment service system is configured to, and can, determine, based at least in part on an identifier received in association with the indication, if a user account of the payee is associated with the payment service. Examples of the user account of the payee include the payee currency account(s) 170, the payee security asset account(s) 172, and/or the payee cryptocurrency account(s) 174. If the payment service system determines that there is no user account of the payee associated with the payment service, then the payment service system is configured to, and can, proceed with operation 730. If the payment service system determines that there is a user account of the payee associated with the payment service, then the payment service system is configured to, and can, proceed with operation 735.

At operation 730, the payment service system is configured to, and can, automatically create the user account associated with the payment service to onboard the payee onto the payment service. Information read from the interactive element via the interaction, and/or information read from other portions of the transfer instrument itself (e.g., via OCR), can be automatically filled in at the payment service so that the user does not need to manually fill in information to create the user account associated with the payment service. In this way, user interface interactions associated with onboarding onto the payment service can be sped up and made more efficient.

In some examples, the identifier is indicative of at least one of the payee, a username associated with the payee, an email address associated with the payee, the payee device, the transfer instrument depositing resource, or a payee instance of the payment resource associated with the payment service.

At operation 735, the payment service system is configured to, and can, intelligently and/or dynamically determine, based at least in part on context data associated with the indication, an allocation of one or more asset types. Examples of the one or more asset types include fiat currencies, security assets (e.g., stocks, bonds, investments, debt, equity, warrants, futures, shorts), cryptocurrencies, non-fungible tokens (NFTs), or combinations thereof.

In some examples, the context data identifies at least one of an identity of a payor associated with the transfer instrument, an identity of the payee, a device type of a payor device associated with the payor, a device type of a payee device associated with the payee, data stored on the payor device, data stored on the payee device, a relationship between the payor and the payee, information to be encoded into the interactive element, information to be included as part of the transfer instrument, information to be included as part of a transfer instrument generation request, information included in the transfer instrument generation request, information read from the interactive element, information read from the transfer instrument, a signature of the payor, a signature of the payee, accounts associated with the payor, available assets associated with the payor, available accounts associated with the payor, available assets associated with the payee, available accounts associated with the payee, one or more records of which accounts the payor has withdrawn funds for one or more previous transfer instruments from, one or more records of which assets types the payor has withdrawn funds for one or more previous transfer instruments as, one or more records of which accounts the payee has deposited one or more previous transfer instruments into, one or more records of which asset types the payee has deposited one or more previous transfer instruments as, a location of the payor when the transfer instrument is generated, a location of the payor device when the transfer instrument is generated, a location of the payee when the transfer instrument is received by the payee, a location of the payee device when the transfer instrument is received by the payee, a location of the payee when the transfer instrument is deposited, a location of the payee device when the transfer instrument is deposited, a transfer history of the payor, a transfer history of the payee, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, transaction activity involving one or more social contacts associated with the payee, any information discussed herein as possible input(s) to the trained machine learning model(s) 190 or other trained machine learning model(s) described herein, or a combination thereof.

In some examples, the payment service system is configured to, and can, requests, using the payor instance of the payment resource, a signature input associated with the transfer instrument and/or authorizing the transfer. The payment service system can receive (e.g., using the payment resource) the signature input from at least one of the payor and/or the payee. The signature input can be generated using at least one of a touch-sensitive signature input device (e.g., as in the user interface 245 of FIG. 2 and/or the user interface 350 of FIG. 3) or a digital signature application. The payment service system can associate the signature input with the transfer instrument. In some examples, the payment service system cause the transfer instrument to be generated so that the transfer instrument includes the signature input. For instance, in some examples, the signature 145 that is input by the payor user 110 using the user interface 245 of FIG. 2 is included as part of the transfer instrument 130. In some examples, the signature that is input by the payee user 160 using the user interface 350 of FIG. 3 is included as part of the transfer instrument 130. In some examples, the payment service system is configured to, and can, verify an authenticity of the transfer instrument at least in part by verifying an authenticity of the signature input associated with the transfer instrument. The verification of the authenticity of the signature input associated with the transfer instrument can be performed using the multi-factor authenticator 184 and/or by the signature authenticator 435 in particular. The verification of the authenticity of the signature input associated with the transfer instrument can be performed by comparing the signature input to a pre-stored reference instance of the signature, for instance that may be stored in the reference data structure 480.

In some examples, the payment service system is configured to, and can, extract information (e.g., the information 420) encoded in the interactive element (e.g., interactive element 140) from the indication of the interaction between the payee device associated with the payee and the interactive element. The payment service system can verify an authenticity of the transfer instrument at least in part by verifying the information encoded in the interactive element, for instance as discussed with respect to the multi-factor authenticator 184, the security verification dataset authenticator 430, and/or the additional data authenticator 437. In some examples, the payment service system is configured to, and can, generate an encrypted security verification dataset (e.g., encrypted security verification dataset 410) by encrypting a security verification dataset (e.g., security verification dataset 405) using one or more cryptographic keys (e.g., cryptographic key(s) 415). The information (e.g., information 420) encoded in the interactive element (e.g., interactive element 140) includes the encrypted security verification dataset. To verify the authenticity of the transfer instrument at least in part by verifying the information encoded in the interactive element the payment service system can: extract the encrypted security verification dataset from the information encoded in the interactive element, generate a decrypted instance of the encrypted security verification dataset (e.g., decrypted security verification dataset 425) by decrypting the encrypted security verification dataset that is extracted from the information encoded in the interactive element using the one or more cryptographic keys, and verify a correspondence (e.g., match or disparity) between the decrypted instance of the encrypted security verification dataset and the security verification dataset. This authentication may be performed using the multi-factor authenticator 184 and/or the security verification dataset authenticator 430.

At operation 740, the payment service system is configured to, and can, check whether the allocation of the one or more asset types (determined in operation 735) matches the at least one asset type indicated by the transfer instrument (see operation 715). If the payment service system determines that the allocation of the one or more asset types matches the at least one asset type indicated by the transfer instrument, then the payment service system is configured to, and can, proceed with operation 745. If the payment service system determines that the allocation of the one or more asset types does not matches the at least one asset type indicated by the transfer instrument, then the payment service system is configured to, and can, proceed with operation 750.

At operation 745, the payment service system is configured to, and can, facilitate a transfer of the amount of the at least one asset type (indicated on the transfer instrument per operation 715) to the user account of the payee. In some examples, the amount of the at least one asset type (e.g., funds) is spendable by the payee instantly after the indication is received and/or after the transfer is facilitated.

At operation 750, the payment service system is configured to, and can, facilitate a transfer of one or more transfer amounts of the one or more asset types to the user account of the payee based on the allocation. The one or more transfer amounts are based on the amount of the at least one asset type indicated by the transfer instrument.

In some examples, the one or more transfer amounts being based on the amount of the at least one asset type indicated by the transfer instrument can mean that the one or more transfer amounts match the amount of the at least one asset type indicated by the transfer instrument, for instance to make operation 750 behave like operation 745 (e.g., if the allocation of the one or more asset types matches the at least one asset type indicated by the transfer instrument). In some examples, (e.g., if the allocation of the one or more asset types does not match the at least one asset type indicated by the transfer instrument), the one or more transfer amounts are based on the amount of the at least one asset type indicated by the transfer instrument but are distinct from the amount of the at least one asset type indicated by the transfer instrument. In some examples, the one or more transfer amounts of the one or more asset types (e.g., funds) are spendable by the payee instantly after the indication is received and/or after the transfer is facilitated.

In some examples, the payment service system is configured to, and can, use one or more trained machine learning models automatically request transfer instrument generation (e.g., based on cash flows, deadlines, due dates, and so forth) and/or to pre-fill information (e.g., payee, amount to be transferred, and/or asset type) on the transfer instrument.

In some examples, the payment service system is configured to, and can, use one or more trained machine learning models automatically identify the one or more transfer amounts to deposit, the one or more asset type(s) to deposit as, and/or the one or more accounts associated with the payee to deposit into, for instance based on the context data, the indicator, the identifier, or a combination thereof.

In some examples, the payment service system is configured to, and can, use one or more trained machine learning models, such as the trained ML model(s) 190, to generate the transfer instrument generation request of operation 705, to generate the interactive element in operation 710, to generate the transfer instrument in operation 715, to create the user account in operation 730, to determine the allocation of the one or more asset types based on the context data in operation 735, and/or to facilitate the transfer as in operations 745-750. The trained ML model(s) can include, for instance, or more NNs, one or more CNNs, one or more TDNNs, one or more deep networks, one or more autoencoders, one or more DBNs, one or more RNNs, one or more GANs, one or more trained SVMs, one or more RFs, one or more encoders, one or more decoders, one or more deep learning systems, or combinations thereof. The trained ML model(s) can be trained using the training data using supervised learning, unsupervised learning, or a combination thereof. The training data can include selections made in various situations, along with corresponding information (e.g., see examples of input information to the trained ML model(s) and/or context information described herein) about the situations. The trained ML model(s) can be personalized to a specific user (e.g., the payor or the payee) or can be are generalized for multiple users based on the training as discussed with respect to the trained ML model(s) 190 of FIG. 1.

In some examples, the payment service system is configured to, and can, use the trained ML model(s) to generate the transfer instrument generation request of operation 705, for instance based on input of input information about the payor, the payee, the payor device of the payee, the payee device of the payor, and/or other types of input information discussed with respect to use of the trained ML model(s) 190 to generate the transfer instrument generation request 120 as discussed with respect to FIG. 1. In some examples, the payment service system is configured to, and can, use the trained ML model(s) to generate the interactive element in operation 710 for instance based on input of input information about the payor, the payee, the payor device of the payee, the payee device of the payor, the transfer instrument generation request, and/or other types of input information discussed with respect to use of the trained ML model(s) 190 to generate the interactive element 140 as discussed with respect to FIG. 1. In some examples, the payment service system is configured to, and can, use the trained ML model(s) to generate the transfer instrument in operation 715, for instance based on input of input information about the payor, the payee, the payor device of the payee, the payee device of the payor, the transfer instrument generation request, the interactive element, and/or other types of input information discussed with respect to use of the trained ML model(s) 190 to generate the transfer instrument 130 as discussed with respect to FIG. 1.

In some examples, the payment service system is configured to, and can, use the trained ML model(s) to create the user account in operation 730, for instance based on input of input information about the payor, the payee, the payor device of the payee, the payee device of the payor, the transfer instrument generation request, the interactive element, the transfer instrument, and/or other types of input information discussed with respect to use of the trained ML model(s) 190 with respect to FIG. 1. In some examples, the payment service system is configured to, and can, use the trained ML model(s) to determine the allocation of the one or more asset types based on the context data in operation 735 and/or to facilitate the transfer as in operations 745-750, for instance based on input of input information about the payor, the payee, the payor device of the payee, the payee device of the payor, the transfer instrument generation request, the interactive element, the transfer instrument, the user account, and/or other types of input information discussed with respect to use of the trained ML model(s) 190 to generate the transfer instrument 130, to make selection(s) for the interactive element 140 and/or the transfer instrument 130 such as those in the user interfaces 230-250 of FIG. 2, to make selection(s) for depositing the transfer instrument 130 such as those in the user interfaces 330-350 of FIG. 3, to make selection(s) associated with how to deposit the transfer instrument 130, or a combination thereof, with respect to FIG. 1.

In some examples, the payment service system is configured to, and can, create or activate specific or customized payment rails in real-time (or near real-time) based on the payment resource, the resource identifier for the depositing resource, the depositing resource itself, the indication of the interaction, the context data, or a combination thereof. The different payment rails can include, for example, a credit card rail, a debit card rail, a cryptocurrency payment rail or network, a rail for payment made in the United States, a rail for payment made in Europe, a rail for payment made in Asia, and so forth. The different payment rails can be based on aspects such as financial institution, currency type, country or region, location, relationship between payee and payor, any of the types of information 420, any other information discussed herein as being encoded in an interactive element, any information discussed herein as being included in a transfer instrument, any information discussed herein as being context information, any information discussed herein as being input information to trained ML model(s), or a combination thereof.

In some examples, transactions and/or transfers related to multiple transfer instruments, accounts, and/or asset types may be batched to increase efficiency. These batched transactions and/or transfers may be related or unrelated to each other, but may be batched based on use of the same payment rails. Processing of these batched transactions and/or transfers together may provide further increases to transaction processing efficiency, reductions in bandwidth usage (e.g., due to less repetition of redundant information that is consistent across transactions under the same payment rail), increase in throughput related to how may transactions can be processed at a time, or a combination thereof. For instance, all transfer instruments for which a deposit is requested (e.g., in response to interaction with the corresponding interactive element of the respective transfer instrument) in a specific geographic territory or location (e.g., continent, country, state, county, city, zip code, and/or area code) can be batched at the end of the day and processed via a shared payment rail.

Figure 8:
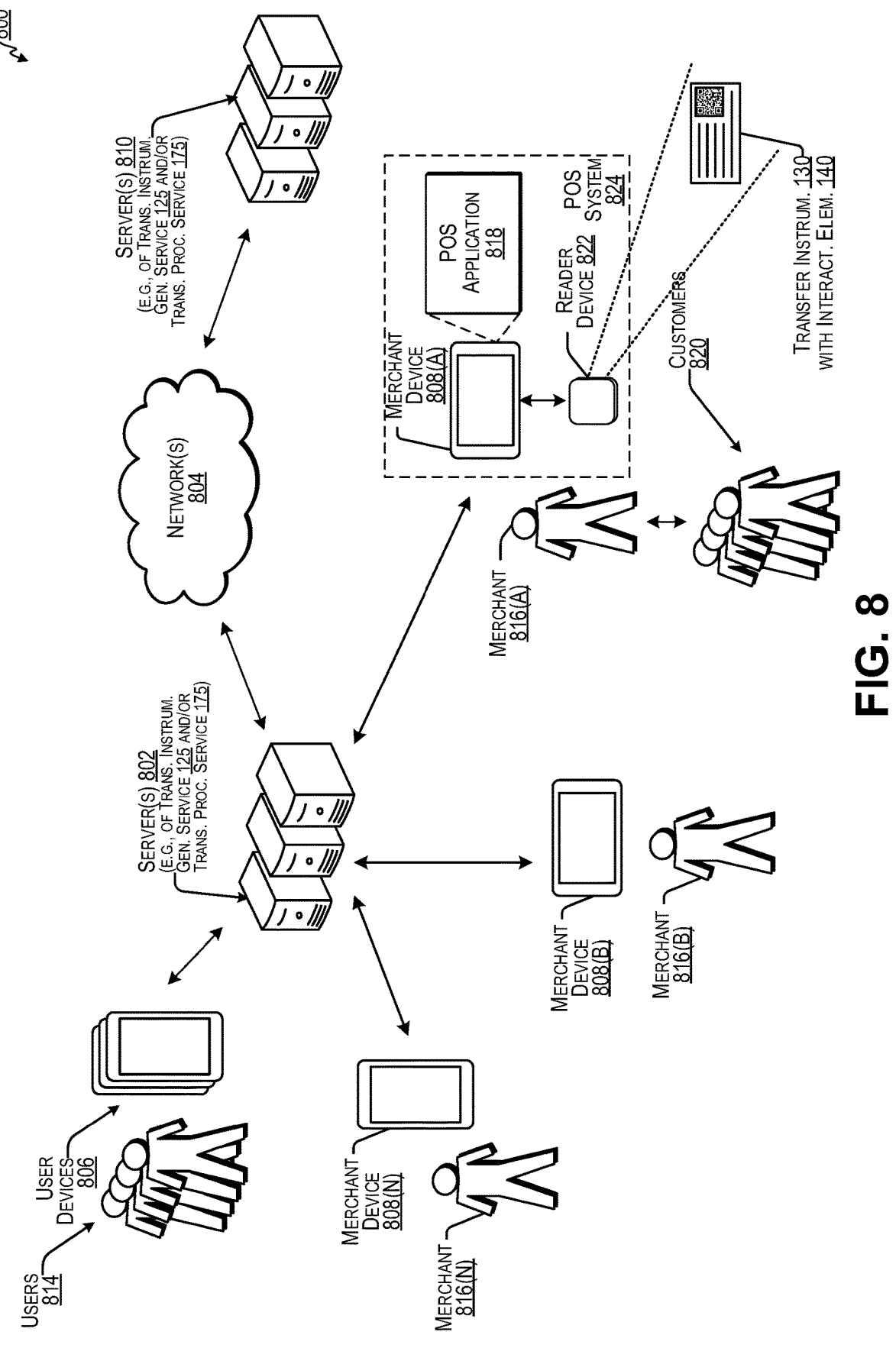
FIG. 8 is a block diagram illustrating an environment that includes various devices associated with one or more merchants, in accordance with some examples.

FIG. 8 is a block diagram illustrating an environment 800 that includes various devices associated with one or more merchants. The environment 800 includes server(s) 802 that can communicate over a network 804 with user devices 806 (which, in some examples can be merchant devices 808 (individually, 808(A)-808(N))) and/or server(s) 810 associated with third-party service provider(s). The server(s) 802 can be associated with a service provider that can provide one or more services for the benefit of users 814, as described below. Actions attributed to the service provider can be performed by the server(s) 802.

The payor user 110 may be an example of one of the users 814 and/or the customers 820. The payor user device 115 may be an example of one of the user devices 806. The payee user 160 may be an example of one of the merchants 816(A)-816(N)). The payee user device 165 may be an example of one of the merchant devices 808(A)-808(N), the reader device 822, and/or the POS system 824. For instance, the interactive element 140 of the transaction instrument 130 can be interacted with, and the corresponding information read by, one of the merchant devices 808(A)-808(N), the reader device 822, and/or the POS system 824. The information can include a resource identifier that causes the merchant devices 808(A)-808(N), the reader device 822, and/or the POS system 824 to access a depositing resource of the POS application 818. The payment resource 118, the transfer instrument depositing resource 168, and/or the transfer instrument depositing resources 610 may be examples of the POS application 818, any software or websites running on the user devices 806, or a combination thereof. The printer 150 may be an example of one of the user devices 806, one of the merchant devices 808(A)-808 (N), and/or the POS system 824. The network(s) 105 may be example(s) of the network(s) 804. The server(s) associated with the transfer instrument generation service 125 may be examples of the server(s) 802, the server(s) 810, or a combination thereof. The server(s) associated with the transaction processing service 175 may be examples of the server(s) 802, the server(s) 810, or a combination thereof.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

As described above, in at least one example, the users 814 can include merchants 816 (individually, 816(A)-816(N)). In an example, the merchants 816 can operate respective merchant devices 808, which can be user devices 806 configured for use by merchants 816. For the purpose of this discussion, a "merchant" can be any entity that offers items (e.g., goods or services) for purchase or other means of acquisition (e.g., rent, borrow, barter, etc.). The merchants 816 can offer items for purchase or other means of acquisition via brick-and-mortar stores, mobile stores (e.g., pop-up shops, food trucks, etc.), online stores, combinations of the foregoing, and so forth. In some examples, at least some of the merchants 816 can be associated with a same entity but can have different merchant locations and/or can have franchise/franchisee relationships. In additional or alternative examples, the merchants 816 can be different merchants. That is, in at least one example, the merchant 816(A) is a different merchant than the merchant 816(B) and/or the merchant 816(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 808 can have an instance of a POS application 818 stored thereon. The POS application 818 can configure the merchant device 808 as a POS terminal, which enables the merchant 816(A) to interact with one or more customers 820. As described above, the users 814 can include customers, such as the customers 820 shown as interacting with the merchant 816(A). For the purpose of this discussion, a "customer" can be any entity that acquires items from merchants. While only two customers 820 are illustrated in FIG. 8, any number of customers 820 can interact with the merchants 816. Further, while FIG. 8 illustrates the customers 820 interacting with the merchant 816(A), the customers 820 can interact with any of the merchants 816.

In at least one example, interactions between the customers 820 and the merchants 816 that involve the exchange of funds (from the customers 820) for items (from the merchants 816) can be referred to as "transactions." In at least one example, the POS application 818 can determine transaction data associated with the POS transactions. Transaction data can include payment information, which can be obtained from a reader device 822 associated with the merchant device 808(A), user authentication data, purchase amount information, point-of-purchase information (e.g., item(s) purchased, date of purchase, time of purchase, etc.), etc. The POS application 818 can send transaction data to the server(s) 802 such that the server(s) 802 can track transactions of the customers 820, merchants 816, and/or any of the users 814 over time. Furthermore, the POS application 818 can present a UI to enable the merchant 816(A) to interact with the POS application 818 and/or the service provider via the POS application 818.

In at least one example, the merchant device 808(A) can be a special-purpose computing device configured as a POS terminal (via the execution of the POS application 818). In at least one example, the POS terminal may be connected to a reader device 822, which is capable of accepting a variety of payment instruments, such as credit cards, debit cards, gift cards, short-range communication based payment instruments, and the like, as described below. In at least one example, the reader device 822 can plug in to a port in the merchant device 808(A), such as a microphone port, a headphone port, an audio-jack, a data port, or other suitable port. In additional or alternative examples, the reader device 822 can be coupled to the merchant device 808(A) via another wired or wireless connection, such as via a Bluetooth®, BLE, and so on. Additional details are described below with reference to FIG. 11. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 822, and communicate with the server(s) 802, which can provide, among other services, a payment processing service. The server(s) 802 associated with the service provider can communicate with server(s) 810, as described below. In this manner, the POS terminal and reader device 822 may collectively process transaction(s) between the merchants 816 and customers 820. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to the customers 820. In additional or alternative examples, the POS terminal can have a display integrated therein for presenting information to the customers 820. POS systems, such as the POS system 824, may be mobile, such that POS terminals and reader devices may process transactions in disparate locations across the world. POS systems can be used for processing card-present transactions and card-not-present (CNP) transactions, as described below.

A card-present transaction is a transaction where both a customer 820 and his or her payment instrument are physically present at the time of the transaction. Card-present transactions may be processed by swipes, dips, taps, or any other interaction between a physical payment instrument (e.g., a card), or otherwise present payment instrument, and a reader device 822 whereby the reader device 822 is able to obtain payment data from the payment instrument. A swipe is a card-present transaction where a customer 820 slides a card, or other payment instrument, having a magnetic strip through a reader device 822 that captures payment data contained in the magnetic strip. A dip is a card-present transaction where a customer 820 inserts a payment instrument having an embedded microchip (i.e., chip) into a reader device 822 first. The dipped payment instrument remains in the payment reader until the reader device 822 prompts the customer 820 to remove the card, or other payment instrument. While the payment instrument is in the reader device 822, the microchip can create a one-time code which is sent from the POS system 824 to the server(s) 810 (which can be associated with third-party service providers that provide payment services, including but not limited to, an acquirer bank, an issuer, and/or a card payment network (e.g., Mastercard®, VISAR, etc.)) to be matched with an identical one-time code. A tap is a card-present transaction where a customer 820 may tap or hover his or her payment instrument (e.g., card, electronic device such as a smart phone running a payment application, etc.) over a reader device 822 to complete a transaction via short-range communication (e.g., NFC, RFID, Bluetooth®, BLE, etc.). Short-range communication enables the payment instrument to exchange information with the reader device 822. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 824, the server(s) 802, and/or the server(s) 810 may exchange payment information and transaction data to determine whether transactions are authorized. For example, the POS system 824 may provide encrypted payment data, user authentication data, purchase amount information, point-of-purchase information, etc. (collectively, transaction data) to server(s) 802 over the network(s) 804. The server(s) 802 may send the transaction data to the server(s) 810. As described above, in at least one example, the server(s) 810 can be associated with third-party service providers that provide payment services, including but not limited to, an acquirer bank, an issuer, and/or a card payment network (e.g., Mastercard®, VISAR, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 810 associated therewith) can send a fund transfer request to a server computing device of a card payment network (e.g., Mastercard®, VISAR, etc.) to determine whether the transaction is authorized or deficient. In at least one example, the service provider can serve as an acquirer and connect directly with the card payment network.

The card payment network (e.g., the server(s) 810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 810 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 810 associated therewith), and a payment authorization message is communicated from the issuer to the POS device via a path opposite of that described above, or via an alternate path.

As described above, the server(s) 810, which can be associated with payment service provider(s), may determine whether the transaction is authorized based on the transaction data, as well as information relating to parties to the transaction (e.g., the customer 820 and/or the merchant 816(A)). The server(s) 810 may send an authorization notification over the network(s) 804 to the server(s) 802, which may send the authorization notification to the POS system 824 over the network(s) 804 to indicate whether the transaction is authorized. The server(s) 802 may also transmit additional information such as transaction identifiers to the POS system 824. In one example, the server(s) 802 may include a merchant application and/or other functional components for communicating with the POS system 824 and/or the server(s) 810 to authorize or decline transactions.

Based on the authentication notification that is received by the POS system 824 from server(s) 802, the merchant 816(A) may indicate to the customer 820 whether the transaction has been approved. In some examples, approval may be indicated at the POS system 824, for example, at a display of the POS system 824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 814 can access all of the services of the service provider. In other examples, the users 814 can have gradated access to the services, which can be based on risk tolerance, IDV outputs, subscriptions, and so on. In at least one example, access to such services can be availed to the merchants 816 via the POS application 818. In additional or alternative examples, each service can be associated with its own access point (e.g., application, web browser, etc.).

The service provider can offer payment processing services for processing payments on behalf of the merchants 816, as described above. For example, the service provider can provision payment processing software, payment processing hardware and/or payment processing services to merchants 816, as described above, to enable the merchants 816 to receive payments from the customers 820 when conducting POS transactions with the customers 820. For instance, the service provider can enable the merchants 816 to receive cash payments, payment card payments, and/or electronic payments from customers 820 for POS transactions and the service provider can process transactions on behalf of the merchants 816.

As the service provider processes transactions on behalf of the merchants 816, the service provider can maintain accounts or balances for the merchants 816 in one or more ledgers. For example, the service provider can analyze transaction data received for a transaction to determine an amount of funds owed to a merchant 816(A) for the transaction. In at least one example, such an amount can be a total purchase price less fees charged by the service provider for providing the payment processing services. Based on determining the amount of funds owed to the merchant 816(A), the service provider can deposit funds into an account of the merchant 816(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 816(A) to a bank account of the merchant 816(A) that is held at a bank or other financial institution (e.g., associated with the server(s) 810). Scheduled deposits can occur at a prearranged time after a POS transaction is funded, which can be a business day after the POS transaction occurred, or sooner or later. In some examples, the merchant 816(A) can access funds prior to a scheduled deposit. For instance, the merchant 816(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 816(A) can have a payment instrument that is linked to the stored balance that enables the merchant to access the funds without first transferring the funds from the account managed by the service provider to the bank account of the merchant 816(A).

In at least one example, the service provider may provide inventory management services. That is, the service provider may provide inventory tracking and reporting. Inventory management services may enable the merchant 816(A) to access and manage a database storing data associated with a quantity of each item that the merchant 816(A) has available (i.e., an inventory). Furthermore, in at least one example, the service provider can provide catalog management services to enable the merchant 816(A) to maintain a catalog, which can be a database storing data associated with items that the merchant 816(A) has available for acquisition (i.e., catalog management services). In at least one example, the catalog may include a plurality of data items and a data item of the plurality of data items may represent an item that the merchant 8121(A) has available for acquisition. The service provider can offer recommendations related to pricing of the items, placement of items on the catalog, and multi-party fulfilment of the inventory.

In at least one example, the service provider can provide business banking services, which allow the merchant 816(A) to track deposits (from payment processing and/or other sources of funds) into an account of the merchant 816(A), payroll payments from the account (e.g., payments to employees of the merchant 816(A)), payments to other merchants (e.g., business-to-business) directly from the account or from a linked debit card, withdrawals made via scheduled deposit and/or instant deposit, etc. Furthermore, the business banking services can enable the merchant 816(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 816 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 816. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 812 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 816. In at least one example, the service provider can recommend and/or generate content items to supplement omni-channel presences of the merchants 816. That is, if a merchant of the merchants 816 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 814 to set schedules for scheduling appointments and/or users 814 to schedule appointments.

In some examples, the service provider can provide restaurant management services to enable users 814 to make and/or manage reservations, to monitor front-of-house and/or back-of-house operations, and so on. In such examples, the merchant device(s) 808 and/or server(s) 802 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 814 who can travel between locations to perform services for a requesting user 814 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein.

In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 806.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 814, voice inputs into a virtual assistant or the like, to determine intents of user(s) 814. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 814 may be new to the service provider such that the user 814 that has not registered (e.g., subscribed to receive access to one or more services offered by the service provider) with the service provider. The service provider can offer onboarding services for registering a potential user 814 with the service provider. In some examples, onboarding can involve presenting various questions, prompts, and the like to a potential user 814 to obtain information that can be used to generate a profile for the potential user 814. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 814 providing all necessary information, the potential user 814 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 810). That is, the service provider can offer IDV services to verify the identity of users 814 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 814 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 810 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 802) and/or the server(s) 810 via the network(s) 804. In some examples, the merchant device(s) 808 are not capable of connecting with the service provider (e.g., the server(s) 802) and/or the server(s) 810, due to a network connectivity issue, for example. In additional or alternative examples, the server(s) 802 are not capable of communicating with the server(s) 810 due to network connectivity issue, for example. In such examples, devices may operate in "offline" mode where at least some payment data is stored (e.g., on the merchant device(s) 808) and/or the server(s) 802 until connectivity is restored and the payment data can be transmitted to the server(s) 802 and/or the server(s) 810 for processing.

In at least one example, the service provider can be associated with a hub, such as an order hub, an inventory hub, a fulfillment hub and so on, which can enable integration with one or more additional service providers (e.g., associated with the additional server(s) 810). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 806 that are in communication with one or more server computing devices 802 of the service provider. That is, techniques described herein are directed to a specific implementation—or, a practical application—of utilizing a distributed system of user devices 806 that are in communication with one or more server computing devices 802 of the service provider to perform a variety of services, as described above. The unconventional configuration of the distributed system described herein enables the server(s) 802 that are remotely-located from end-users (e.g., users 814) to intelligently offer services based on aggregated data associated with the end-users, such as the users 814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 814 and user devices 806. Furthermore, such features are changed dynamically based on the profiles of the users involved interacting with the GUIs. As such, techniques described herein are directed to improvements to computing systems.

Figure 9:
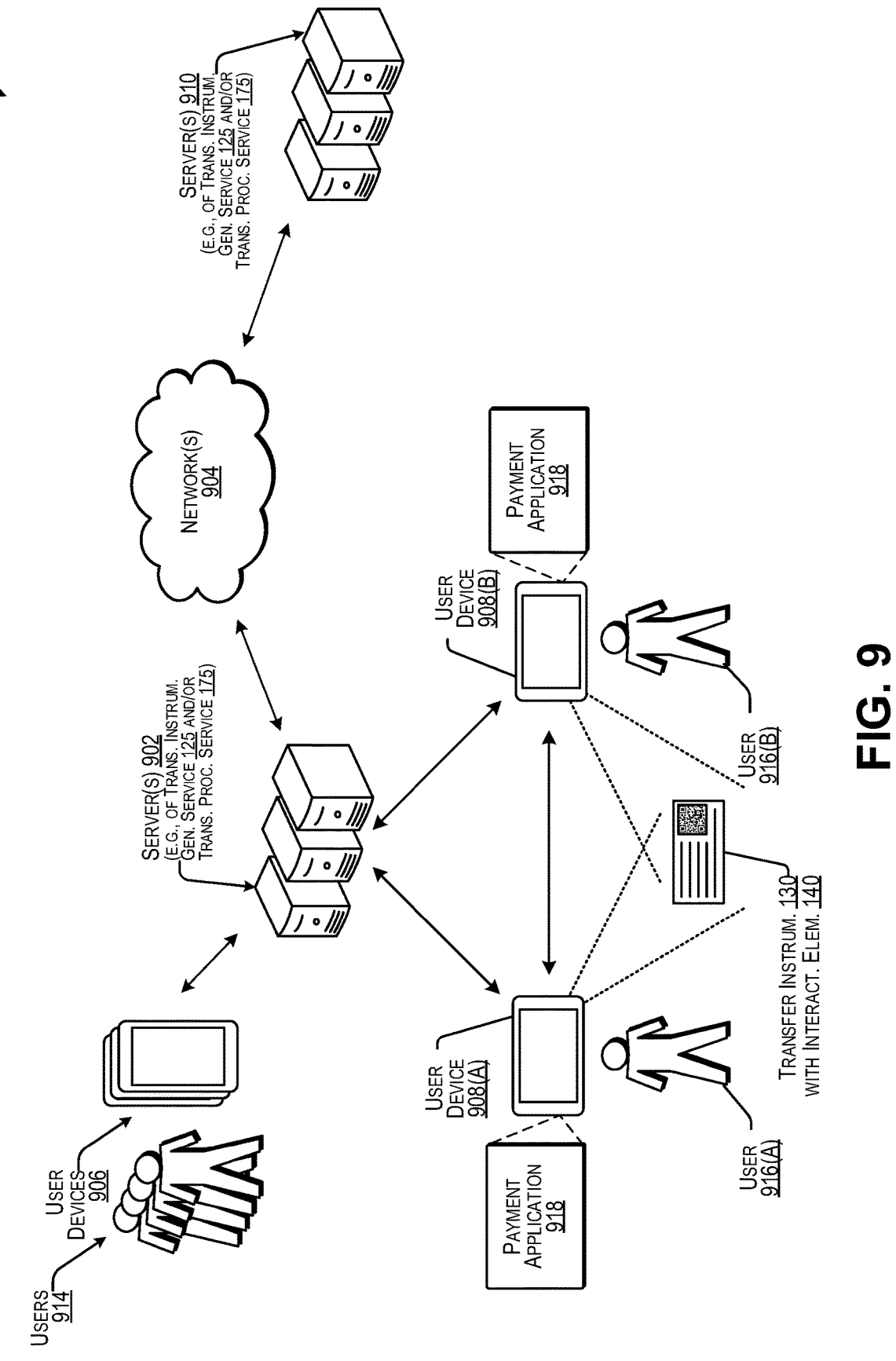
FIG. 9 is a block diagram illustrating an environment that includes various device associated with one or more payment services, in accordance with some examples.

FIG. 9 is a block diagram illustrating an environment 900 that includes various devices associated with one or more payment services. The environment 900 includes server(s) 902 that can communicate over a network 904 with user devices 906 (which, in some examples can be user devices 908 (individually, 908(A), 908(B)) and/or server(s) 910 associated with third-party service provider(s). The server(s) 902 can be associated with a service provider that can provide one or more services for the benefit of users 914, as described below. Actions attributed to the service provider can be performed by the server(s) 902. In some examples, the service provider referenced in FIG. 8 can be the same or different than the service provider referenced in FIG. 9.

The payor user 110 may be an example of one of the users 914 and/or the users 916(A)-916(B). The payor user device 115 may be an example of one of the user devices 906 and/or one of the one of the user devices 908(A)-908(B). The payee user 160 may be an example of one of the users 914 and/or the users 916(A)-916(B). The payee user device 165 may be an example of one of the user devices 906 and/or one of the one of the user devices 908(A)-908(B). The printer 150 may be an example of one of the user devices 906 and/or one of the one of the user devices 908(A)-908(B). The payment resource 118, the transfer instrument depositing resource 168, and/or the transfer instrument depositing resources 610 may be examples of the payment application 918. For instance, the payor instance of the payment resource 118 may be an example of the instance of the payment application 918 running on the user device 908(A), while the payee instance of the transfer instrument depositing resource 168 and/or the payment resource 118 and/or the transfer instrument depositing resources 610 may be an example of the instance of the payment application 918 running on the user device 908(B). For instance, the interactive element 140 of the transaction instrument 130 can be interacted with, and the corresponding information read by, the user device 908(A) or the user device 908(B), and can include a resource identifier that causes the user device 908(A) or the user device 908(B) to access a depositing resource of the payment application 918. The network(s) 105 may be example(s) of the network(s) 904. The server(s) associated with the transfer instrument generation service 125 may be examples of the server(s) 902, the server(s) 910, or a combination thereof. The server(s) associated with the transaction processing service 175 may be examples of the server(s) 902, the server(s) 910, or a combination thereof.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

In at least one example, the service provider can provide a peer-to-peer payment service that enables peer-to-peer payments between two or more users 914. Two users, user 916(A) and user 916(B) are illustrated in FIG. 9 as "peers" in a peer-to-peer payment. In at least one example, the service provider can communicate with instances of a payment application 918 (or other access point) installed on devices 906 configured for operation by users 914. In an example, an instance of the payment application 918 executing on a first device 908(A) operated by a payor (e.g., user 916(A)) can send a request to the service provider to transfer an asset (e.g., fiat currency, non-fiat currency, cryptocurrency, securities, gift cards, and/or related assets) from the payor to a payee (e.g., user 916(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 906.

Figure 10:
FIG. 10 is a block diagram illustrating a ledger system, in accordance with some examples.
Figure 10:
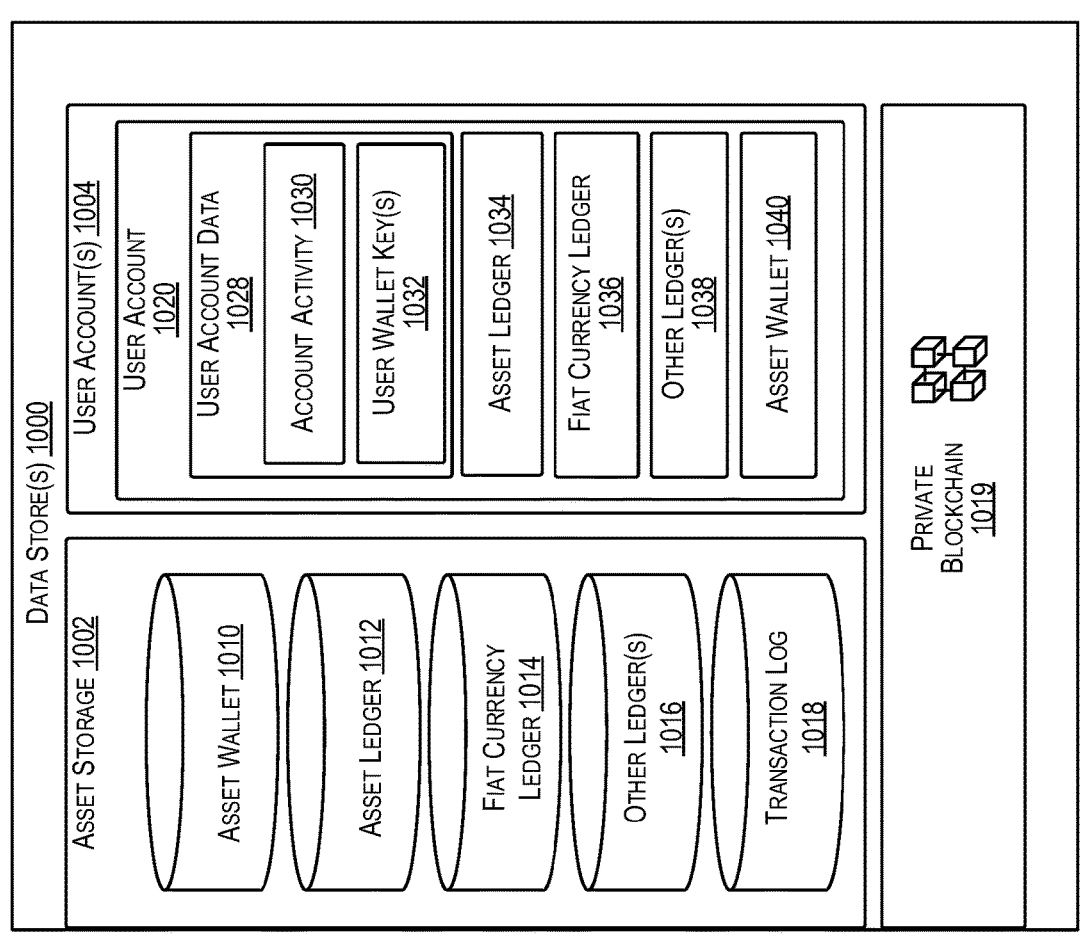
Figure 10:
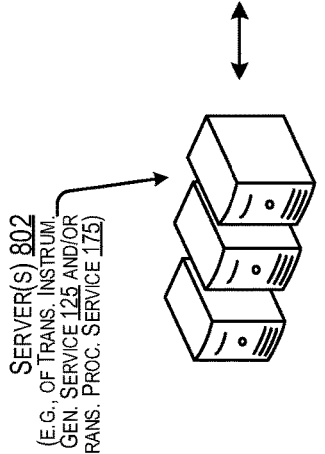

FIG. 10 is a block diagram illustrating a ledger system. The ledger system of FIG. 10 may provide additional details associated with a ledger system that may be used with the systems of FIG. 8 and/or FIG. 9. The ledger system can enable users 906 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 918 executing on user device(s) of payee(s). As an example, the service provider can transfer assets from an account of user 916(A) to an account of the user 916(B) and can send a notification to the user device 908(B) of the user 916(B) for presentation via a user interface. The notification can indicate that a transfer is in process, a transfer is complete, or the like. In some examples, the service provider can send additional or alternative information to the instances of the payment application 918 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 902 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 918 executing on the user devices 906. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 9 or a third-party service provider associated with the server(s) 910. In examples where the content provider is a third-party service provider, the server(s) 910 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 9. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 906 (e.g., mobile device or conventional personal computer (PC)) based on instructions transmitted to and from the server(s) 902 (which, in such an example can be called a "messaging server"). In some instances, the messaging application can include a payment application with messaging capability that enables users of the payment application to communicate with one another. In such instances, the payment application can be executed on a user device 906 based on instructions transmitted to and from the server(s) 902 (e.g., the payment service discussed in this description or another payment service that supports payment transactions). In some examples, the messaging application can be provided by a third-party service provider associated with the server(s) 910. In examples where the messaging application is a third-party service provider, the server(s) 910 can be accessible via one or more APIs or other integrations.

As described above, the service provider can facilitate peer-to-peer transactions, which can enable users 906 to transfer fiat currency, non-fiat currency, cryptocurrency, securities, or other assets, or portions thereof, to other users 906. In at least one example, individual users can be associated with user accounts. Additional details associated with user accounts and the transfer of assets between users 906 are described below with reference to FIG. 10.

Furthermore, the service provider of FIG. 9 can enable users 906 to perform banking transactions via instances of the payment application 918. For example, users can configure direct deposits or other deposits for adding assets to their various ledgers/balances. Further, users 906 can configure bill pay, recurring payments, and/or the like using assets associated with their accounts. In addition to sending and/or receiving assets via peer-to-peer transactions, users 906 buy and/or sell assets via asset networks such as cryptocurrency networks, securities networks, and/or the like.

FIG. 10 illustrates example data store(s) 1000 that can be associated with the server(s) 902.

In at least one example, the data store(s) 1000 can store assets in an asset storage 1002, as well as data in user account(s) 1004, merchant account(s) 1006, and/or customer account(s) 1008. In at least one example, the asset storage 1002 can be used to store assets managed by the service provider of FIG. 9. In at least one example, the asset storage 1002 can be used to record whether individual of the assets are registered to users. For example, the asset storage 1002 can include an asset wallet 1010 for storing records of assets owned by the service provider of FIG. 9, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 910 can be associated therewith. In some examples, the asset wallet 1010 can communication with the asset network via one or more components associated with the server(s) 902.

The payee currency account(s) 170, the savings account of the user interface 235, the checking account of the user interface 235, the savings account of the user interface 335, the checking account of the user interface 335, the payor account(s) 505, the holding account(s) 510, and/or the currency holding account(s) 515 may be examples of the user account 1020, and/or may be associated with the fiat currency ledger 1014 and/or the fiat currency ledger 1036.

The payee security asset account(s) 172, the trading account of the user interface 235, the trading account of the user interface 335, the payor account(s) 505, the holding account(s) 510, and/or the security asset holding account(s) 520 may be examples of the user account 1020, the asset wallet 1040, and/or the asset wallet 1010, and/or may be associated with the asset ledger 1012 and/or the asset ledger 1034.

The payee cryptocurrency account(s) 174, the crypto wallet of the user interface 235, the crypto wallet of the user interface 335, the payor account(s) 505, the holding account(s) 510, and/or the crypto holding account(s) 525 may be examples of the user account 1020, the asset wallet 1040, and/or the asset wallet 1010, and/or may be associated with the asset ledger 1012, the asset ledger 1034, and/or the private blockchain 1019.

The asset wallet 1010 can be associated with one or more addresses and can vary addresses used to acquire assets (e.g., from the asset network(s)) so that its holdings are represented under a variety of addresses on the asset network. In examples where the service provider of FIG. 9 has its own holdings of cryptocurrency (e.g., in the asset wallet 1010), a user can acquire cryptocurrency directly from the service provider of FIG. 9. In some examples, the service provider of FIG. 9 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1002 may contain ledgers that store records of assignments of assets to users 906. Specifically, the asset storage 1002 may include asset wallet 1010 (e.g., asset ledger), fiat currency ledger 1014, and other ledger(s) 1016, which can be used to record transfers of assets between users 906 of the service provider and/or one or more third-parties (e.g., merchant network(s), payment card network(s), ACH network(s), equities network(s), the asset network, securities networks, etc.). In doing so, the asset storage 1002 can maintain a running balance of assets managed by the service provider of FIG. 9. The ledger(s) of the asset storage 1002 can further indicate some of the running balance for each of the ledger(s) stored in the asset storage 1002 is assigned or registered to one or more user account(s) 1004.

In at least one example, the asset storage 1002 can include transaction logs 1018, which can include records of past transactions involving the service provider of FIG. 9. In at least one example, transaction data, as described herein, can be stored in association with the transaction logs 1018.

In some examples, the data store(s) 1000 can store a private blockchain 1019. A private blockchain 1019 can function to record sender addresses, recipient addresses, public keys, values of cryptocurrency transferred, and/or can be used to verify ownership of cryptocurrency tokens to be transferred. In some examples, the service provider of FIG. 9 can record transactions taking place within the service provider of FIG. 9 involving cryptocurrency until the number of transactions has exceeded a determined limit (e.g., number of transactions, storage space allocation, etc.). Based at least in part on determining that the limit has been reached, the service provider of FIG. 9 can publish the transactions in the private blockchain 1019 to a public blockchain (e.g., associated with the asset network), where miners can verify the transactions and record the transactions to blocks on the public blockchain. In at least one example, the service provider of FIG. 9 can participate as miner(s) at least for its transactions to be posted to the public blockchain.

In at least one example, the data store(s) 1000 can store and/or manage accounts, such as user account(s) 1004, merchant account(s) 1006, and/or customer account(s) 1008. In at least one example, the user account(s) 1004 may store records of user accounts associated with the users 906. In at least one example, the user account(s) 1004 can include a user account 1020, which can be associated with a user (of the users 906). Other user accounts of the user account(s) 1004 can be similarly structured to the user account 1020, according to some examples. In other examples, other user accounts may include more or less data and/or account information than that provided by the user account 1020. In at least one example, the user account 1020 can include user account data 1028, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1028 can include account activity 1030 and user wallet key(s) 1032. The account activity 1030 may include a transaction log for recording transactions associated with the user account 1020. In some examples, the user wallet key(s) 1032 can include a public-private key-pair and a respective address associated with the asset network or other asset networks. In some examples, the user wallet key(s) 1032 may include one or more key pairs, which can be unique to the asset network or other asset networks.

In addition to the user account data 1028, the user account 1020 can include ledger(s) for account(s) managed by the service provider of FIG. 9, for the user. For example, the user account 1020 may include an asset ledger 1034, a fiat currency ledger 1036, and/or one or more other ledgers 1038. The ledger(s) can indicate that a corresponding user utilizes the service provider of FIG. 9 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 9.

In some examples, the asset ledger 1034 can store a balance for each of one or more cryptocurrencies (e.g., Bitcoin, Ethereum, Litecoin, etc.) registered to the user account 1020. In at least one example, the asset ledger 1034 can further record transactions of cryptocurrency assets associated with the user account 1020. For example, the user account 1020 can receive cryptocurrency from the asset network using the user wallet key(s) 1032. In some examples, the user wallet key(s) 1032 may be generated for the user upon request. User wallet key(s) 1032 can be requested by the user in order to send, exchange, or otherwise control the balance of cryptocurrency held by the service provider of FIG. 9 (e.g., in the asset wallet 1010) and registered to the user. In some examples, the user wallet key(s) 1032 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 9 and the value is credited as a balance in asset ledger 1034), by purchasing currency in the form associated with the account using currency in a different form (e.g., buying a value of cryptocurrency from the service provider of FIG. 9 using a value of fiat currency reflected in fiat currency ledger 206, and crediting the value of cryptocurrency in asset ledger 1034), or by conducting a transaction with another user (customer or merchant) of the service provider of FIG. 9 wherein the account receives incoming currency (which can be in the form associated with the account or a different form, in which the incoming currency may be converted to the form associated with the account). In some examples, the user account data 1028 can include preferences for maintaining balances of individual of the ledgers. For example, the service provider of FIG. 9 can automatically debit the fiat currency ledger 1036 to increase the asset ledger 1034, or another account associated with the user whenever the cryptocurrency balance (e.g., of the asset ledger 1034) falls below a stated level (e.g., a threshold). Conversely, in some embodiments, the service provider of FIG. 9 can automatically credit the fiat currency ledger 1036 to decrease the asset ledger 1034 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with third-party server(s)) unrelated to the service provider of FIG. 9 (i.e., an external account). In at least one example, the user can transfer all or a portion of a balance of the cryptocurrency stored in the third-party cryptocurrency wallet to the service provider of FIG. 9. Such a transaction can require the user to transfer an amount of the cryptocurrency in a message signed by user's private key to an address provided by the service provider of FIG. 9. In at least one example, the transaction can be sent to miners to bundle the transaction into a block of transactions and to verify the authenticity of the transactions in the block. Once a miner has verified the block, the block is written to a public, distributed blockchain where the service provider of FIG. 9 can then verify that the transaction has been confirmed and can credit the user's asset ledger 1034 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 9. As described above, in some examples, the service provider of FIG. 9 can acquire cryptocurrency from a third-party source (e.g., associated with third-party server(s)). In such examples, the asset wallet 1010 can be associated with different addresses and can vary addresses used to acquire cryptocurrency so that its holdings are represented under a variety of addresses on a blockchain. When the service provider of FIG. 9 has their own holdings of cryptocurrency, users can acquire cryptocurrency directly from the service provider of FIG. 9. In some examples, the service provider of FIG. 9 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 9 has its own cryptocurrency assets, cryptocurrency transferred in a transaction (e.g., data with address provided for receipt of transaction and a balance of cryptocurrency transferred in the transaction) can be stored in the asset wallet 1010. In at least one example, the service provider of FIG. 9 can credit the asset ledger 1034 of the user. Additionally, while the service provider of FIG. 9 recognizes that the user retains the value of the transferred cryptocurrency through crediting the asset ledger 1034, any person that inspects the blockchain will see the cryptocurrency as having been transferred to the service provider of FIG. 9. In some examples, the asset wallet 1010 can be associated with many different addresses. In such examples, any person that inspects the blockchain may not easily associate all cryptocurrency stored in asset wallet 1010 as belonging to the same entity. It is this presence of a private ledger that is used for real-time transactions and maintained by the service provider of FIG. 9, combined with updates to the public ledger at other times, that allows for extremely fast transactions using cryptocurrency to be achieved. In some examples, the "private ledger" can refer to the asset wallet 1010 (e.g., asset ledger), which in some examples, can utilize the private blockchain 1019, as described herein. The "public ledger" can correspond to a public blockchain associated with the asset network.

In at least one example, a user's asset ledger 1034, fiat currency ledger 1036, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1034. In some examples, a user can receive fiat currency or another currency in the form of payment for a transaction with another user. In at least one example, at least a portion of such funds can be converted into cryptocurrency by the service provider of FIG. 9 and used to fund the asset ledger 1034 of the user.

As addressed above, in some examples, users can also have other accounts maintained by the service provider of FIG. 9. For example, a user can also have an account in U.S. dollars, which can be tracked, for example, via the fiat currency ledger 1036. Such an account can be funded by transferring money from a bank account at a third-party bank to an account maintained by the service provider of FIG. 9 as is conventionally known. In some examples, a user can receive fiat currency in the form of payment for a transaction with another user. In such examples, at least a portion of such funds can be used to fund the fiat currency ledger 1036.

In some examples, a user can have one or more internal payment cards registered with the service provider of FIG. 9. Internal payment cards can be linked to one or more of the accounts associated with the user account 1020. In some embodiments, options with respect to internal payment cards can be adjusted and managed using an application (e.g., the payment application 918).

In at least one example, as described above, each ledger can correspond to an account of the user that is managed by the service provider of FIG. 9. In at least one example, individual of the accounts can be associated with a wallet or a stored balance for use in payment transactions, peer-to-peer transactions, payroll payments, etc.

In at least one example, the user account 1020 can be associated with a asset wallet 1040. The asset wallet 1040 of the user can be associated with account information that can be stored in the user account data 1028 and, in some examples, can be associated with the user wallet key(s) 1032. In at least one example, the asset wallet 1040 can store data indicating an address provided for receipt of a cryptocurrency transaction. In at least one example, the balance of the asset wallet 1040 can be based at least in part on a balance of the asset ledger 1034. In at least one example, funds availed via the asset wallet 1040 can be stored in the asset wallet 1040 or the asset wallet 1010. Funds availed via the asset wallet 1010 can be tracked via the asset ledger 1034. The asset wallet 1040, however, can be associated with additional cryptocurrency funds.

In at least one example, when the service provider of FIG. 9 includes a private blockchain 1019 for recording and validating cryptocurrency transactions, the asset wallet 1040 can be used instead of, or in addition to, the asset ledger 1034. For example, at least one example, a merchant can provide the address of the asset wallet 1040 for receiving payments. In an example where a customer is paying in cryptocurrency and the customer has their own cryptocurrency wallet account associated with the service provider of FIG. 9, the customer can send a message signed by its private key including its wallet address (i.e., of the customer) and identifying the cryptocurrency and value to be transferred to the merchant's asset wallet 1040. The service provider of FIG. 9 can complete the transaction by reducing the cryptocurrency balance in the customer's cryptocurrency wallet and increasing the cryptocurrency balance in the merchant's asset wallet 1040. In addition to recording the transaction in the respective cryptocurrency wallets, the transaction can be recorded in the private blockchain 1019 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1034 and/or asset wallet 1040 are each described above with reference to cryptocurrency, the asset ledger 1034 and/or asset wallet 1040 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 9 is an aspect of the technology disclosed that enables technical advantages of increased processing speed and improved security.

Figure 11:
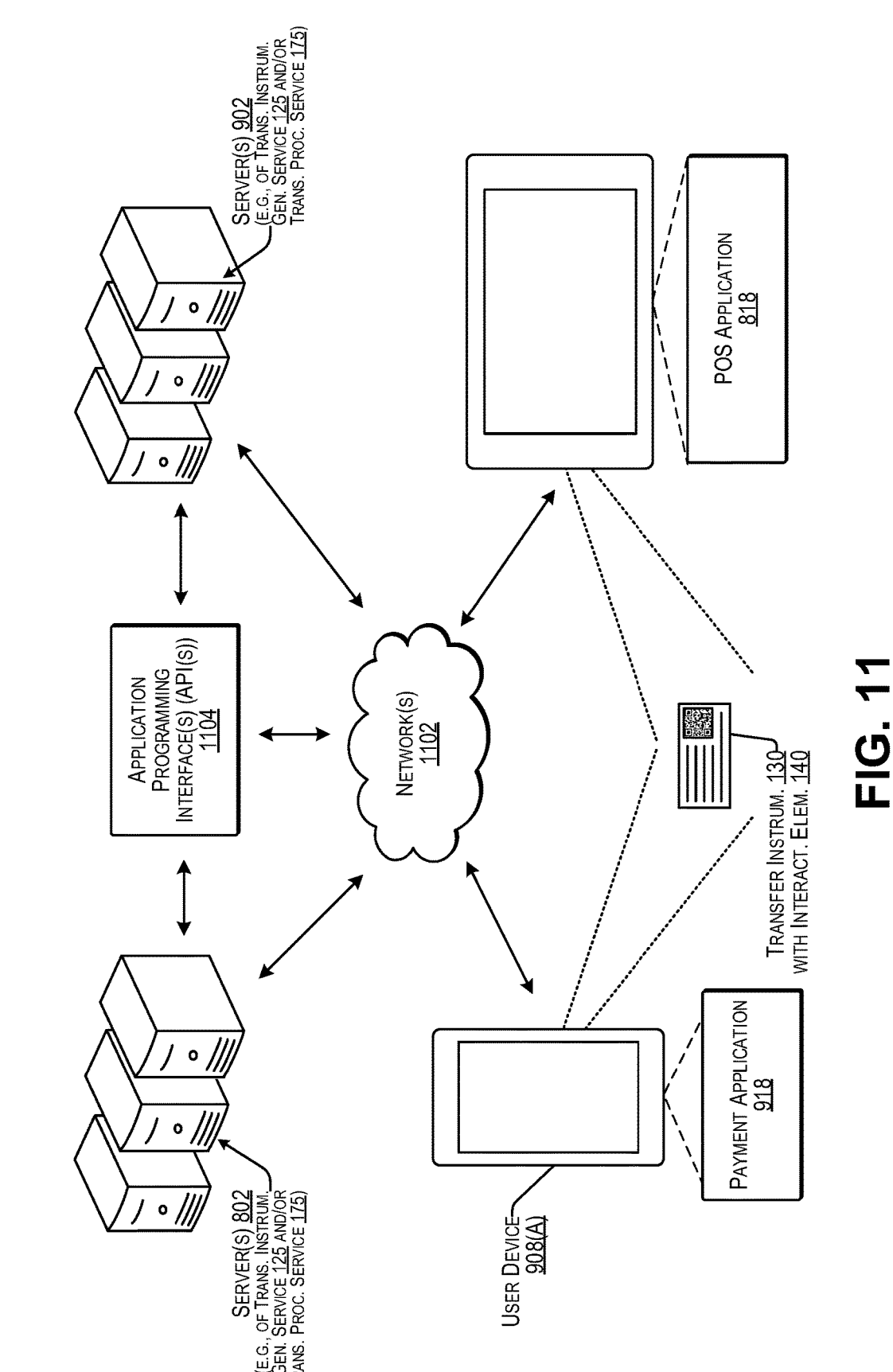
FIG. 11 is a block diagram illustrating an example environment wherein the environment of FIG. 8 and the environment of FIG. 9 can be integrated to enable payments at the point-of-sale using assets associated with user accounts in the peer-to-peer environment of FIG. 9, in accordance with some examples.

FIG. 11 illustrates an example environment 1100 wherein the environment 800 of FIG. 8 and the environment 900 of FIG. 9 can be integrated to enable payments at the point-of-sale using assets associated with user accounts in the peer-to-peer environment 900 of FIG. 9. As illustrated, each of the components can communicate with one another via one or more networks 1102. In some examples, one or more APIs 1104 or other functional components can be used to facilitate such communication.

In at least one example, the example environment 1100 can enable contactless payments, via integration of peer-to-peer payment, or other payment making, platform(s) and payment processing platform(s), are described herein. For the purpose of FIG. 11, the environment 800 can refer to a payment processing platform and the environment 900 can refer to a peer-to-peer payment, or payment making, platform. In an example, such an integration can enable a customer to participate in a transaction via their own computing device instead of interacting with a merchant device of a merchant, such as the merchant device 808(A). In such an example, the POS application 818, associated with a payment processing platform and executable by the merchant device 808(A) of the merchant, can present a Quick Response (QR) code, or other code that can be used to identify a transaction (e.g., a transaction code), in association with a transaction between the customer and the merchant. The QR code, or other transaction code, can be provided to the POS application 818 via an API associated with the peer-to-peer payment platform. In an example, the customer can utilize their own computing device, such as the user device 908(A), to capture the QR code, or the other transaction code, and to provide an indication of the captured QR code, or other transaction code, to server(s) 802 and/or server(s) 902.

Based at least in part on the integration of the peer-to-peer payment platform and the payment processing platform (e.g., via the API), the server(s) 802 and/or 902 associated with each can exchange communications with each other—and with a payment application 918 associated with the peer-to-peer payment platform and/or the POS application 818—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 908(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 908(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 818 and the payment application 918, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 908(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 818, associated with a payment processing platform, on the merchant device 808(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 808(A) can present a QR code, or other transaction code, that can be associated with a peer-to-peer payment platform. The customer can use a camera associated with the user device 908(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 818, associated with a payment processing platform, on the merchant device 808(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 818 can cause a text message with a resource locator (e.g., uniform resource locator (URL)) that can be associated with a peer-to-peer payment platform to be sent to the user device 908(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 908(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 818 of a merchant device 808(A) at a brick-and-mortar store of a merchant to a payment application 918 of a user device 908(A) of a customer to enable the customer to participate in a transaction via their own computing device. For instance, in a "scan to pay" example as described above, based at least in part on capturing the QR code, or other transaction code, via the user device 908(A), the payment processing platform can provide transaction data to the peer-to-peer payment platform for presentation via the payment application 918 on the user device 908(A). In some examples, the customer can watch items being added to their cart (e.g., via a user interface presented via the payment application). As an item is added to a virtual cart by the merchant-via the POS application 818 on the merchant device 808(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 918 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 908(A) during or after payment of the transaction.

In some examples, based at least in part on capturing the QR code, or other transaction code, the payment processing platform can provide transaction data to the peer-to-peer payment platform for presentation via the payment application 918 on the computing device of the customer, such as the user device 908(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 918 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below-techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 818, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 918 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

In some examples, the interactive element 140, the interactive element 210, and/or the interactive elements 605 may include at least one QR code and/or other transaction code as described with respect to FIG. 11. In some examples, the transfer instrument 130 (e.g., the digital instance 135 of the transfer instrument 130 and/or the printed instance 155 of the transfer instrument 130) and/or the interactive element 140 may be used as payment instruments as described in FIG. 11.

Figure 12:
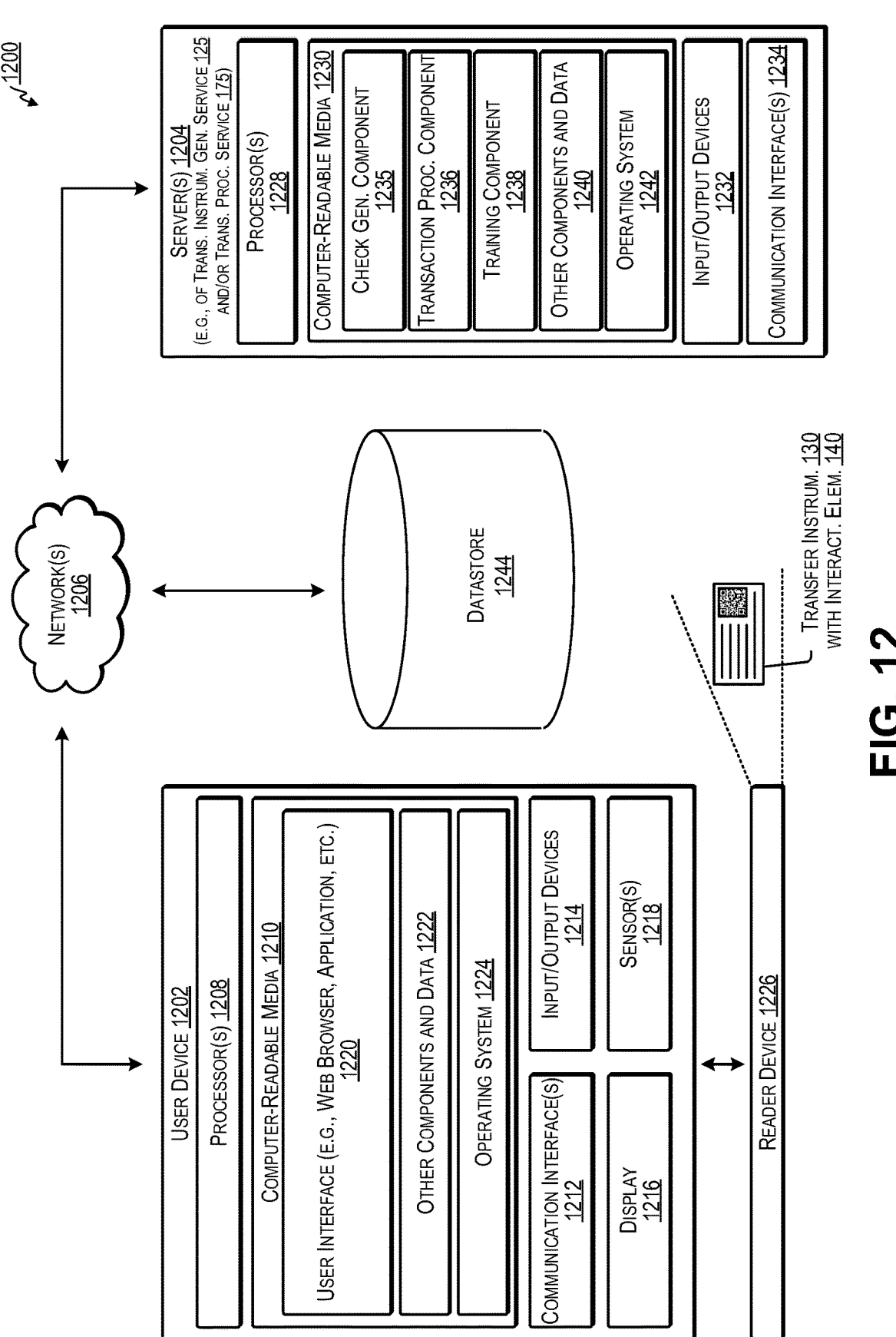
FIG. 12 is a block diagram illustrating a system for performing techniques described herein, in accordance with some examples.

FIG. 12 block diagram illustrating a system 1200 for performing techniques described herein. The system 1200 includes a user device 1202, that communicates with server computing device(s) (e.g., server(s) 1204) via network(s) 1206 (e.g., the Internet, cable network(s), cellular network (s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1200 can have multiple user devices, as described above with reference to FIG. 6.

The payor user device 115, the payee user device 165, and/or the printer 150 may be examples of the user device 1202. The payment resource 118, the transfer instrument depositing resource 168, and/or the transfer instrument depositing resources 610 may be examples of the user interface 1220. The server(s) associated with the transfer instrument generation service 125 and/or the server(s) associated with the transaction processing service 175 may be examples of the server(s) 1204. Examples of the datastore 1244 include the payee currency account(s) 170, the payee security asset account(s) 172, payee cryptocurrency account(s) 174, the savings account of the user interface 235, the checking account of the user interface 235, the trading account of the user interface 235, the crypto wallet of the user interface 235, the savings account of the user interface 335, the checking account of the user interface 335, the trading account of the user interface 335, the crypto wallet of the user interface 335, the reference data structure 480, data structure(s) storing the security verification dataset 405, data structure(s) storing the encrypted security verification dataset 410, data structure(s) storing the decrypted security verification dataset 425, data structure(s) storing the cryptographic key(s) 415, data structure(s) storing the information 420, the payor account(s) 505, the holding account(s) 510, the currency holding account(s) 515, or the security asset holding account(s) 520, the crypto holding account(s) 525, the data store(s) 1000, the asset storage 1002, the user account(s) 1004, the private blockchain 1019, or a combination thereof. In some examples, the reader device 1226 can include a camera, optical scanner sensor, NFC reader, RFID reader, PAN receiver, or other device that can be used by the payee user device 165 (and/or the payor user device 115) to interact with the interactive element 140, the interactive element 210, and/or the interactive elements 605.

In at least one example, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. That is, the user device 1202 can be any computing device capable of sending communications and performing the functions according to the techniques described herein. The user device 1202 can include devices, e.g., payment card readers, or components capable of accepting payments, as described below.

In the illustrated example, the user device 1202 includes one or more processors 1208, one or more computer-readable media 1210, one or more communication interface(s) 1212, one or more input/output (I/O) devices 1214, a display 1216, and sensor(s) 1218.

In at least one example, each processor 1208 can itself comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In at least one example, the user interface 1220 can be presented via a web browser, or the like. In other examples, the user interface 1220 can be presented via an application, such as a mobile application or desktop application, which can be provided by a service provider 612 associated with the server(s) 1204, or which can be an otherwise dedicated application. In some examples, the user interface 1220 can be the user interfaces 230-255 of FIG. 2, the user interfaces 330-355 of FIG. 3, user interface(s) associated with the payment resource 118, user interface(s) associated with transfer instrument depositing resource 168, or combinations thereof. In at least one example, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In at least one example, the computer-readable media 1210 can include additional functional components, such as an operating system 1224 for controlling and managing various functions of the user device 1202 and for enabling basic user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C, Bluetooth, etc.) to connect with the user device 1202.

In at least one example, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In at least one example, the display 1216 can be an augmented reality display, a virtually reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. Alternatively, in some examples, the user device 1202 may not include the display 1216, and information can be presented by other means, such as aurally, haptically, etc.

In addition, the user device 1202 can include sensor(s) 1218. The sensor(s) 1218 can include a GPS device able to indicate location information. Further, the sensor(s) 1218 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 612, described above, to provide one or more services. That is, in some examples, the service provider 612 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 614 and/or for sending users 614 notifications regarding available appointments with merchant(s) located proximate to the users 614. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1202 can include various other components that are not shown, examples of which include removable storage, a power source, such as a battery and power control unit, a barcode scanner, a printer, a cash drawer, and so forth.

In addition, in some examples, the user device 1202 can include, be connectable to, or otherwise be coupled to a reader device 1226, for reading payment instruments and/or identifiers associated with payment objects. In some examples, as described above, the reader device 1226 can plug in to a port in the user device 1202, such as a microphone port, a headphone port, an audio-jack, a data port, or other suitable port. In additional or alternative examples, the reader device 1226 can be coupled to the user device 1202 via another wired or wireless connection, such as via a Bluetooth®, BLE, and so on. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1226 may also include a biometric sensor to receive and process biometric characteristics and process them as payment instruments, given that such biometric characteristics are registered with the payment service system 100 and connected to a financial account with a bank server.

The reader device 1226 may include processing unit(s), computer-readable media, a reader chip, a transaction chip, a timer, a clock, a network interface, a power supply, and so on. The processing unit(s) of the reader device 1226 may execute one or more components and/or processes to cause the reader device 1226 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1226, the computer-readable media may include volatile memory (such as RAM), non-volatile memory (such as ROM, flash memory, miniature hard drive, memory card, or the like), or some combination thereof. In at least one example, the computer-readable media of the reader device 1226 may include at least one component for performing various functions as described herein.

The reader chip may perform functionalities to control the operations and processing of the reader device 1226. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1202, which can be a POS terminal, and the reader device 1226 are shown as separate devices, in additional or alternative examples, the user device 1202 and the reader device 1226 can be part of a single device, which may be a battery-operated device. In such an example, components of both the user device 1202 and the reader device 1226 may be associated with the single device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the service provider 612 and/or payment processing service. Functional components stored in the computer-readable media 1230 can optionally include a transfer instrument generation component 1235, a transaction processing component 1236, a training component 1238, and one or more other components and data 1240.

The transfer instrument generation component 1235 can be configured to generate a transfer instrument (e.g., the transfer instrument 130) as described with respect to the transfer instrument generation service 125. The transfer instrument generation component 1235 can be configured to generate an interactive element 140 for the transfer instrument 130. The interactive element 140 and/or the transfer instrument 130 may encode information 420 as described in FIG. 4.

The transaction processing component 1236 can be configured to process a transfer instrument (e.g., a check) as described with respect to the transaction processing service 175. The transaction processing component 1236 can be configured to receive transaction data from POS systems and/or user devices, such as the payor user device 115, the payee user device 165, and/or the POS system 824 described above with reference to FIG. 8. The transaction processing component 1236 can perform asset conversion between different asset types as discussed with respect to the asset converter(s) 182 and/or as illustrated in FIG. 5. The transaction processing component 1236 can transmit requests (e.g., authorization, capture, settlement, etc.) to payment service server computing device(s) to facilitate transactions between merchants and customers, and/or between peer users. The transaction processing component 1236 can communicate the successes or failures of the transactions to the user devices and/or POS systems. The transfer instrument generation component 1235 and/or the transaction processing component 1236 can be configured to perform authentication of the transfer instrument 130 using the multi-factor authenticator 184, the security verification dataset authenticator 430, the signature authenticator 435, and/or the additional data authenticator 437.

The training component 1238 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1202 and/or the server(s) 1204 for use at a time after the data models have been trained (e.g., at runtime).

The one or more other components and data 1240 can include components and/or data associated with the transfer instrument generation component 1235, the transfer instrument generation service 125, the transaction processing component 1236, the transaction processing service 175, the payment resource 118, the transfer instrument depositing resource 168, the asset converter(s) 182, the printer 150, the multi-factor authenticator 184, the security verification dataset authenticator 430, the signature authenticator 435, and/or the additional data authenticator 437, the functionality of which is described, at least partially, above. Further, the one or more other components and data 1240 can include programs, drivers, etc., and the data used or generated by the functional components. Further, the server(s) 1204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1230 can additionally include an operating system 1242 for controlling and managing various functions of the server(s) 1204.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In at least one example, the system 1200 can include a datastore 1244 that can be configured to store data that is accessible, manageable, and updatable. In some examples, the datastore 1244 can be integrated with the user device 1202 and/or the server(s) 1204. In other examples, as shown in FIG. 12, the datastore 1244 can be located remotely from the server(s) 1204 and can be accessible to the server(s) 1204. The datastore 1244 can comprise multiple databases and/or servers connected locally and/or remotely via the network(s) 1206.

In at least one example, the datastore 1244 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the payee currency account(s) 170, the payee security asset account(s) 172, and the payee cryptocurrency account(s) 174, described above with reference to FIG. 1, can include or be associated with the merchant profiles and/or customer profiles described above.

Furthermore, in at least one example, the datastore 1244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1244 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example Aspects of the Disclosure Include

Aspect 1. A method implemented by at least one computing device of a payment service, the method comprising: receiving, by the at least one computing device, a check generation request from a payor instance of a payment application associated with the payment service; generating, by the at least one computing device, an interactive element that encodes a resource identifier that identifies a check depositing resource, a user account of a payor, and an amount to be transferred from the payor to a payee; causing, by the at least one computing device, a check to be generated, wherein the check is provided to the payee, and wherein the check includes the interactive element; withdrawing, by the at least one computing device, funds based on the amount from a stored balance associated with the user account of the payor, and wherein the funds withdrawn are transferred to an account associated with the payment service; receiving, by the at least one computing device, an indication of an interaction between the interactive element and a payee device associated with the payee; determining, by the at least one computing device and based at least in part on an identifier received in association with the indication, a user account of the payee associated with the payment service; determining, by the at least one computing device and based at least in part on context data associated with the indication, at least one of an asset type or an allocation among one or more particular stored balances for associating the funds with the user account of the payee; and facilitating, by the at least one computing device, a transfer of the funds from the account associated with the payment service to the user account of the payee, wherein the funds are associated with the user account of the payee according to at least one of the asset type or the allocation, and wherein the funds are spendable by the payee instantly after the indication is received.

Aspect 2. The method of Aspect 1, wherein the identifier is indicative of at least one of the payee, a username associated with the payee, an email address associated with the payee, the payee device, the check depositing resource, or a payee instance of the payment application associated with the payment service.

Aspect 3. The method of any of Aspects 1 to 2, wherein the context data identifies at least one of an identity of the payor, an identity of the payee, a device type of a payor device associated with the payor, a device type of a payee device associated with the payee, data stored on the payor device, data stored on the payee device, a relationship between the payor and the payee, information to be encoded into the interactive element, information to be included as part of the check, information to be included as part of the check generation request, information included in the check generation request, information read from the interactive element, information read from the check, a signature of the payor, a signature of the payee, accounts associated with the payor, available assets associated with the payor, available accounts associated with the payor, available assets associated with the payee, available accounts associated with the payee, one or more records of which accounts the payor has withdrawn funds for one or more previous transfer instruments from, one or more records of which assets types the payor has withdrawn funds for one or more previous transfer instruments as, one or more records of which accounts the payee has deposited one or more previous transfer instruments into, one or more records of which asset types the payee has deposited one or more previous transfer instruments as, a location of the payor when the check is generated, a location of the payor device when the check is generated, a location of the payee when the check is received by the payee, a location of the payee device when the check is received by the payee, a location of the payee when the check is deposited, a location of the payee device when the check is deposited, a transfer history of the payor, a transfer history of the payee, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, or transaction activity involving one or more social contacts associated with the payee.

Aspect 4. A method implemented by at least one computing device of a payment service, the method comprising: receiving, by the at least one computing device, an indication of an interaction between a payee device associated with a payee and an interactive element of a transfer instrument; determining, by the at least one computing device and based at least in part on an identifier received in association with the indication, a user account of the payee associated with the payment service; determining, by the at least one computing device and based at least in part on context data associated with the indication, an allocation of one or more asset types; and facilitating, by the at least one computing device, a transfer of one or more transfer amounts of the one or more asset types to the user account of the payee based on the allocation, wherein the one or more transfer amounts are based on an amount of at least one asset type indicated by the transfer instrument.

Aspect 5. The method of Aspect 4, further comprising: receiving, by the at least one computing device, a transfer instrument generation request from a payor instance of a payment resource associated with the payment service; generating, by the at least one computing device, an interactive element that encodes a resource identifier that identifies a depositing resource associated with the transfer; and causing, by the at least one computing device, a transfer instrument to be generated, wherein the transfer instrument includes the interactive element and indicates the amount of the at least one asset type to be transferred from a payor to a payee, wherein the transfer instrument is to be provided to the payee.

Aspect 6. The method of any of Aspects 4 to 5, further comprising: extracting information from the transfer instrument generation request defining at least the payor, the payee, and the amount of the at least one asset type to be transferred from the payor to the payee, wherein the information extracted from the transfer instrument generation request is included in at least one of the interactive element or the transfer instrument.

Aspect 7. The method of any of Aspects 4 to 6, wherein the transfer instrument generation request is received by the at least one computing device of the payment service in response to an interaction between a payor device and a second interactive element associated with at least one of a bill, an invoice, or a receipt.

Aspect 8. The method of any of Aspects 4 to 7, wherein the payment resource is one of a payment website or at least a portion of a payment application, and wherein the depositing resource is one of a depositing website or at least a portion of a depositing application.

Aspect 9. The method of any of Aspects 4 to 8, further comprising: transferring, by the at least one computing device, funds from a stored balance associated with the user account of a payor based on the amount of the at least one asset type indicated by the transfer instrument to an account associated with the payment service, wherein the one or more transfer amounts of the one or more asset types are transferred to the user account of the payee from the account associated with the payment service.

Aspect 10. The method of any of Aspects 4 to 9, further comprising: requesting, using a payment resource associated with the payment service, a signature input associated with the transfer instrument and authorizing the transfer; receiving, using the payment resource, the signature input from at least one of a payor or the payee, wherein the signature input is generated using at least one of a touch-sensitive signature input device or a digital signature application; associating the signature input with the transfer instrument; and verifying an authenticity of the transfer instrument at least in part by verifying an authenticity of the signature input associated with the transfer instrument.

Aspect 11. The method of any of Aspects 4 to 10, further comprising: extracting information encoded in the interactive element from the indication of the interaction between the payee device associated with the payee and the interactive element; and verifying an authenticity of the transfer instrument at least in part by verifying the information encoded in the interactive element.

Aspect 12. The method of any of Aspects 4 to 11, further comprising: generating an encrypted security verification dataset by encrypting a security verification dataset using one or more cryptographic keys, wherein the information encoded in the interactive element includes the encrypted security verification dataset; wherein verifying the authenticity of the transfer instrument at least in part by verifying the information encoded in the interactive element includes: extracting the encrypted security verification dataset from the information encoded in the interactive element; generating a decrypted instance of the encrypted security verification dataset by decrypting, using the one or more cryptographic keys, the encrypted security verification dataset that is extracted from the information encoded in the interactive element; and verifying a correspondence between the decrypted instance of the encrypted security verification dataset and the security verification dataset.

Aspect 13. The method of any of Aspects 4 to 12, wherein the interactive element includes an optical glyph, wherein the interaction between the payee device and the interactive element includes the payee device optically decoding the optical glyph, wherein the optical glyph includes at least one of a quick response (QR) code, a bar code, a data matrix, an Aztec code, Maxicode, a CodaBlock-F code, a Maxicode, a MicroPDF417 code, a PDF417 code, a Han Xin code, a DotCode, or a snaptag.

Aspect 14. The method of any of Aspects 4 to 13, further comprising: causing, by the at least one computing device, a printing device to print a printed instance of the transfer instrument at least in part by sending a printing request to the printing device.

Aspect 15. The method of any of Aspects 4 to 14, further comprising: causing, by the at least one computing device, a display device to display the transfer instrument at least in part by sending the transfer instrument to the display device, wherein the display device is at least one of a payor device associated with a payor associated with the transfer instrument, the payee device, or a point of sale (POS) device.

Aspect 16. The method of any of Aspects 4 to 15, wherein the one or more asset types include at least one of a fiat currency, a security asset, a cryptocurrency, or a non-fungible token (NFT).

Aspect 17. The method of any of Aspects 4 to 16, wherein the identifier is indicative of at least one of the payee, a username associated with the payee, an email address associated with the payee, the payee device, a depositing resource associated with the transfer, or a payee instance of a payment resource associated with the payment service.

Aspect 18. The method of any of Aspects 4 to 17, wherein the context data identifies at least one of an identity of a payor associated with the transfer instrument, an identity of the payee, a device type of a payor device associated with the payor, a device type of a payee device associated with the payee, data stored on the payor device, data stored on the payee device, a relationship between the payor and the payee, information to be encoded into the interactive element, information to be included as part of the transfer instrument, information to be included as part of a transfer instrument generation request, information included in the transfer instrument generation request, information read from the interactive element, information read from the transfer instrument, a signature of the payor, a signature of the payee, accounts associated with the payor, available assets associated with the payor, available accounts associated with the payor, available assets associated with the payee, available accounts associated with the payee, one or more records of which accounts the payor has withdrawn funds for one or more previous transfer instruments from, one or more records of which assets types the payor has withdrawn funds for one or more previous transfer instruments as, one or more records of which accounts the payee has deposited one or more previous transfer instruments into, one or more records of which asset types the payee has deposited one or more previous transfer instruments as, a location of the payor when the transfer instrument is generated, a location of the payor device when the transfer instrument is generated, a location of the payee when the transfer instrument is received by the payee, a location of the payee device when the transfer instrument is received by the payee, a location of the payee when the transfer instrument is deposited, a location of the payee device when the transfer instrument is deposited, a transfer history of the payor, a transfer history of the payee, recent transaction activity involving the payee, frequent transaction activity involving the payee, one or more account balances of the payee, one or more explicit preferences set by the payee, one or more implicit preferences determined based on transaction activity involving the payee, one or more savings goals associated with the payee, one or more spending goals associated with the payee, one or more exchange rates, or transaction activity involving one or more social contacts associated with the payee.

Aspect 19. An apparatus associated with a payment service, the apparatus comprising: one or more memory units storing instructions; and one or more processors, wherein execution of the instructions by the one or more processors causes the one or more processors to: receive an indication of an interaction between a payee device associated with a payee and an interactive element of a transfer instrument; determine, based at least in part on an identifier received in association with the indication, a user account of the payee associated with the payment service; determine, based at least in part on context data associated with the indication, an allocation of one or more asset types; and facilitate a transfer of one or more transfer amounts of the one or more asset types to the user account of the payee based on the allocation, wherein the one or more transfer amounts are based on an amount of at least one asset type indicated by the transfer instrument.

Aspect 20. The apparatus of Aspect 19, wherein execution of the instructions by the one or more processors causes the one or more processors to further: receive, a transfer instrument generation request from a payor instance of a payment resource associated with the payment service; generate an interactive element that encodes a resource identifier that identifies a depositing resource; and cause a transfer instrument to be generated, wherein the transfer instrument includes the interactive element and indicates the amount of the at least one asset type to be transferred from a payor to a payee, wherein the transfer instrument is to be provided to the payee.

Aspect 22. The apparatus of Aspect 19, wherein the apparatus performs further operations according to any of claims 1-3 and/or 6-18.

Aspect 23. A non-transitory computer-readable medium having stored thereon instructions that, when executed by one or more processors, cause the one or more processors to: perform a method according to any of Aspects 1 to 18.

Aspect 24. An apparatus comprising: means for operations according to any of Aspects 1 to 18.

What is claimed is:

1. A method implemented by at least one computing device of a payment service, the method comprising:
   receiving, by the at least one computing device, an indication of a payee device associated with a payee optically scanning a glyph of a transfer instrument to decode an identifier that is encoded in the glyph, wherein the indication includes the identifier, wherein the transfer instrument indicates an amount of funds to be transferred to the payee, and wherein the transfer instrument comprises at least one of a check, a promissory note, a bill of exchange, an invoice, a receipt of transaction, or a smart contract with payment terms;
   determining, by the at least one computing device and based at least in part on the identifier, multiple user accounts of the payee associated with the payment service;
   determining, by the at least one computing device and based at least in part on a transfer history of the payee, an allocation that matches a previous allocation previously selected by the payee, as indicated in the transfer history of the payee, the allocation indicating respective amounts of the funds that are to be apportioned to respective asset types of multiple asset types comprising a first asset type and a second asset type, wherein the first asset type comprises at least one of a fiat currency, a security asset, a cryptocurrency, or a non-fungible token (NFT), and wherein the second asset type comprises at least one of a fiat currency, a security asset, a cryptocurrency, or a NFT; and
   causing, by the at least one computing device, a transfer of the respective amounts of the respective asset types to respective ones of the multiple user accounts of the payee.

2. The method of claim 1, further comprising:
   receiving, by the at least one computing device, a transfer instrument generation request from a payor instance of a payment resource associated with the payment service;
   generating, by the at least one computing device, the glyph that encodes the identifier; and
   causing, by the at least one computing device, the transfer instrument to be generated, wherein the transfer instrument includes the glyph and indicates the amount of the funds to be transferred from a payor to the payee, wherein the transfer instrument is to be provided to the payee.

3. The method of claim 2, further comprising:
extracting information from the transfer instrument generation request defining at least the payor, the payee, and the amount of the funds to be transferred from the payor to the payee,
wherein the information extracted from the transfer instrument generation request is included in at least one of the glyph or the transfer instrument.

4. The method of claim 2, wherein the transfer instrument generation request is received by the at least one computing device of the payment service in response to an interaction between a payor device and an interactive element associated with an object.

5. The method of claim 2, wherein the payment resource is one of a payment website or at least a portion of a payment application.

6. The method of claim 1, further comprising:
requesting, using a payment resource associated with the payment service, a signature input associated with the transfer instrument and authorizing the transfer;
receiving, using the payment resource, the signature input from at least one of a payor or the payee, wherein the signature input is generated using at least one of a touch-sensitive signature input device or a digital signature application;
associating the signature input with the transfer instrument; and
verifying an authenticity of the transfer instrument at least in part by verifying an authenticity of the signature input associated with the transfer instrument.

7. The method of claim 1, further comprising:
extracting information encoded in the glyph from the indication of the payee device optically scanning the glyph; and
verifying an authenticity of the transfer instrument at least in part by verifying the information encoded in the glyph.

8. The method of claim 7, further comprising:
generating an encrypted security verification dataset by encrypting a security verification dataset using one or more cryptographic keys, wherein the information encoded in the glyph includes the encrypted security verification dataset;
wherein verifying the authenticity of the transfer instrument at least in part by verifying the information encoded in the glyph includes:
extracting the encrypted security verification dataset from the information encoded in the glyph;
generating a decrypted instance of the encrypted security verification dataset by decrypting, using the one or more cryptographic keys, the encrypted security verification dataset that is extracted from the information encoded in the glyph; and
verifying a correspondence between the decrypted instance of the encrypted security verification dataset and the security verification dataset.

9. The method of claim 1, wherein the glyph includes at least one of a quick response (QR) code, a bar code, a data matrix, an Aztec code, a CodaBlock-F code, a Maxicode, a MicroPDF417 code, a PDF417 code, a Han Xin code, a DotCode, or a snaptag.

10. The method of claim 1, further comprising:
causing, by the at least one computing device, a printing device to print a printed instance of the transfer instrument at least in part by sending a printing request to the printing device.

11. The method of claim 1, further comprising:
causing, by the at least one computing device, a display device to display the transfer instrument at least in part by sending the transfer instrument to the display device, wherein the display device is at least one of a payor device associated with a payor associated with the transfer instrument, the payee device, or a point of sale (POS) device.

12. An apparatus associated with a payment service, the apparatus comprising:
one or more memory units storing instructions; and
one or more processors, wherein execution of the instructions by the one or more processors causes the one or more processors to:
receive an indication of a payee device associated with a payee optically scanning a glyph of a transfer instrument to decode an identifier that is encoded in the glyph, wherein the indication includes the identifier, wherein the transfer instrument indicates an amount of funds to be transferred to the payee, and wherein the transfer instrument comprises at least one of a check, a promissory note, a bill of exchange, an invoice, a receipt of transaction, or a smart contract with payment terms;
determine, based at least in part on the identifier, multiple user accounts of the payee associated with the payment service;
determine, based at least in part on a transfer history of the payee, an allocation that matches a previous allocation previously selected by the payee, as indicated in the transfer history of the payee, the allocation indicating respective amounts of the funds that are to be apportioned to respective asset types of multiple asset types comprising a first asset type and a second asset type, wherein the first asset type comprises at least one of a fiat currency, a security asset, a cryptocurrency, or a non-fungible token (NFT), and wherein the second asset type comprises at least one of a fiat currency, a security asset, a cryptocurrency, or a NFT; and
cause a transfer of the respective amounts of the respective asset types to respective ones of the multiple user accounts of the payee.

13. The apparatus of claim 12, wherein execution of the instructions by the one or more processors causes the one or more processors to further:
receive, a transfer instrument generation request from a payor instance of a payment resource associated with the payment service;
generate the glyph that encodes the identifier; and
cause the transfer instrument to be generated, wherein the transfer instrument includes the glyph and indicates the amount of the funds to be transferred from a payor to the payee, wherein the transfer instrument is to be provided to the payee.

14. The apparatus of claim 12, wherein execution of the instructions by the one or more processors causes the one or more processors to further:
request, using a payment resource associated with the payment service, a signature input associated with the transfer instrument and authorizing the transfer;

receive, using the payment resource, the signature input from at least one of a payor or the payee, wherein the signature input is generated using at least one of a touch-sensitive signature input device or a digital signature application;

associate the signature input with the transfer instrument; and verify an authenticity of the transfer instrument at least in part by verifying an authenticity of the signature input associated with the transfer instrument.

15. The apparatus of claim 12, wherein execution of the instructions by the one or more processors causes the one or more processors to further:

extract information encoded in the glyph from the indication of the payee device optically scanning the glyph; and verify an authenticity of the transfer instrument at least in part by verifying the information encoded in the glyph.

16. The apparatus of claim 15, wherein execution of the instructions by the one or more processors causes the one or more processors to further:

generate an encrypted security verification dataset by encrypting a security verification dataset using one or more cryptographic keys, wherein the information encoded in the glyph includes the encrypted security verification dataset;

wherein verifying the authenticity of the transfer instrument at least in part by verifying the information encoded in the glyph includes:

extracting the encrypted security verification dataset from the information encoded in the glyph;

generating a decrypted instance of the encrypted security verification dataset by decrypting, using the one or more cryptographic keys, the encrypted security verification dataset that is extracted from the information encoded in the glyph; and verifying a correspondence between the decrypted instance of the encrypted security verification dataset and the security verification dataset.

17. The apparatus of claim 12, wherein the glyph includes at least one of a quick response (QR) code, a bar code, a data matrix, an Aztec code, a CodaBlock-F code, a Maxicode, a MicroPDF417 code, a PDF417 code, a Han Xin code, a DotCode, or a snaptag.

18. One or more non-transitory computer-readable media comprising computer-readable instructions, which when executed by one or more processors of a payment service, cause the payment service to:

receive an indication of a payee device associated with a payee optically scanning a glyph of a transfer instrument to decode an identifier that is encoded in the glyph, wherein the indication includes the identifier, wherein the transfer instrument indicates an amount of funds to be transferred to the payee, and wherein the transfer instrument comprises at least one of a check, a promissory note, a bill of exchange, an invoice, a receipt of transaction, or a smart contract with payment terms;

determine, based at least in part on the identifier, multiple user accounts of the payee associated with the payment service;

determine, based at least in part on a transfer history of the payee, an allocation that matches a previous allocation previously selected by the payee, as indicated in the transfer history of the payee, the allocation indicating respective amounts of the funds that are to be apportioned to respective asset types of multiple asset types comprising a first asset type and a second asset type, wherein the first asset type comprises at least one of a fiat currency, a security asset, a cryptocurrency, or a non-fungible token (NFT), and wherein the second asset type comprises at least one of a fiat currency, a security asset, a cryptocurrency, or a NFT; and cause a transfer of the respective amounts of the respective asset types to respective ones of the multiple user accounts of the payee.

19. The one or more non-transitory computer-readable media of claim 18, wherein the computer-readable instructions, which when executed by the one or more processors of the payment service, further cause the payment service to:

receive a transfer instrument generation request from a payor instance of a payment resource associated with the payment service;

generate the glyph that encodes the identifier; and cause the transfer instrument to be generated, wherein the transfer instrument includes the glyph and indicates the amount of the funds to be transferred from a payor to the payee, wherein the transfer instrument is to be provided to the payee.

20. The one or more non-transitory computer-readable media of claim 19, wherein the transfer instrument generation request is received by at least one computing device of the payment service in response to an interaction between a payor device and an interactive element associated with an object.

* * * * *